(12) United States Patent
Nassar et al.

(10) Patent No.: US 10,883,060 B2
(45) Date of Patent: Jan. 5, 2021

(54) DEMINERALIZATION AND UPGRADING OF PETROLEUM COKES

(71) Applicant: UTI Limited Partnership, Calgary (CA)

(72) Inventors: Nashaat N. Nassar, Calgary (CA); Abdallah Darweesh Manasrah, Calgary (CA); Gerardo Vitale, Calgary (CA)

(73) Assignee: UTI Limited Partnership, Calgary (CA)

( * ) Notice: Subject to any disclaimer, the term of this patent is extended or adjusted under 35 U.S.C. 154(b) by 21 days.

(21) Appl. No.: 16/521,119

(22) Filed: Jul. 24, 2019

(65) Prior Publication Data

US 2020/0032155 A1 Jan. 30, 2020

Related U.S. Application Data

(60) Provisional application No. 62/711,225, filed on Jul. 27, 2018.

(51) Int. Cl.
*C10L 9/06* (2006.01)
*C10L 5/04* (2006.01)
*C10B 57/00* (2006.01)
*B01D 11/02* (2006.01)

(52) U.S. Cl.
CPC ............ *C10L 9/06* (2013.01); *B01D 11/0203* (2013.01); *C10B 57/005* (2013.01); *C10L 5/04* (2013.01); *C10L 2290/544* (2013.01)

(58) Field of Classification Search
None
See application file for complete search history.

(56) References Cited

U.S. PATENT DOCUMENTS 4,022,569 A 5/1977 Farago et al.

OTHER PUBLICATIONS

A. Manasrah, A. El-Qanni, I. Badran, L. Carbognani Ortega, M. J. Perez-Zurita and N. N. Nassar, React. Chem. Eng., 2017, DOI: 10.1039/C7RE00048K.
Ashtari et al., New pathways for Asphaltenes Upgrading Using Oxy-Cracking Process, Energy & Fuels 2016, 30, 6, 4596-4608.
(Continued)

*Primary Examiner* — Tam M Nguyen
(74) *Attorney, Agent, or Firm* — Casimir Jones S.C.; J. Mitchell Jones

(57) ABSTRACT

Processes are provided for the oxidative solubilization of metal-containing petroleum cokes in a basic aqueous solution, so as to segregate a solid metal-containing residue from a solubilized and demineralized organics fraction. Oxidation conditions are provided that optimize the yield of soluble partial oxidation products and minimize the generation of $CO_2$. In some embodiments, a nanocrystalline copper tetrasilicate oxidation catalyst belonging to the Gillespite group of minerals may be used (Cuprorivaite ($CaCuSi_4O_{10}$), Wesselsite ($SrCuSi_4O_{10}$), Effenbergerite ($BaCuSi_4O_{10}$), or combinations thereof). The pH of the solubilized organics fraction may be reduced, under conditions that precipitate an upgraded carbonaceous material, in some embodiments comprising humic acid analogs, yielding a barren leachate solution.

36 Claims, 24 Drawing Sheets
(23 of 24 Drawing Sheet(s) Filed in Color)

(56) References Cited

OTHER PUBLICATIONS

Birghila et al., "Study on physical-chemical properties of petroleum cokes", Romanian Journal of Physics 56(7-8) (2011) 976-82.
Caruso et al., "Petroleum coke in the urban environment: A review of potential health effects", International journal of environmental research and public health 12(6) (2015) 6218-6231.
Cordero et al., Fuel, 80 (2001) 1567-1571.
Dutta et al., Thermal cracking of Athabasca bitumen: influence of steam on reaction chemistry, Energy & fuels 14(3) (2000) 671-676.
Fitzer et al, Pure & Appl. Chem., vol. 67, No. 3, pp. 473-506, 1995.
Küçükbayrak et al., Fuel, 70 (1991) 979-981.
Lv et al., "Characterization of condensed aromatics and heteroatomic species in Yanshan petroleum coke through ruthenium ion-catalyzed oxidation using three mass spectrometers", RSC Advances 6(66) (2016) 61758-61770.
Majumder et al., Fuel, 87 (2008) 3077-3081.
Manasrah, et al., An Innovative Technique for Oxy-Cracking of Quinolin-65 as a Model Heavy Hydrocarbon compound, 2016 AIChE Annual Meeting, Nov. 13-18, 2016, San Francisco, California.
Manasrah, et al., An Innovative Technique for Oxy-Cracking of Quinolin-65 as a Model Heavy Hydrocarbon Compound, 2016 AIChE Annual Meeting, Nov. 8-13, 2015.
Parikh et al., Fuel, 84 (2005) 487-494.
Rana et al., A review of recent advances on process technologies for upgrading of heavy oils and residua, Fuel 86(9) (2007) 1216-1231.
Schuster et al., Brennst Chem, 32 (1951) 19-20.
Small et al., Adsorption of acid extractable oil sands tailings organics onto raw and activated oil sands coke, Journal of Environmental Engineering 138(8) (2012) 833-840.
Wang et al., Clean and efficient use of petroleum coke for combustion and power generation, Fuel 83(10) (2004) 1341-1348.
Yoon et al., Thermogravimetric study of coal and petroleum coke for co-gasification, Korean Journal of Chemical Engineering 24(3) (2007) 512-517.
Petroleum Coke CAD Revised Aug. 22, 2008 Consortium Registration #1100997 i Petroleum Coke Category Analysis and Hazard Characterization Submitted to the US EPA by The American Petroleum Institute Petroleum HPV Testing Group Consortium Registration # 1100997 Revised Aug. 22, 2008.

DEMINERALIZATION AND UPGRADING OF PETROLEUM COKES

FIELD

The invention is in the field of chemical engineering, particularly oxidative processes for aqueous treatment of heavy hydrocarbon and metal-containing solids, such as petroleum cokes.

BACKGROUND

In accordance with the IUPAC definition, "petroleum coke" is a carbonization product of high-boiling hydrocarbon fractions obtained in petroleum processing ("petcoke"). It is the general term for all special petroleum coke products such as calcined and green petroleum coke (Fitzer et al., Pure & Appl. Chem., Vol. 67, No. 3, pp. 473-506, 1995). "Calcined coke" is generally defined as a petroleum coke obtained by heat treatment of green coke, for example to about 1600° K (or between 1200° C. and 1350° C.), normally having a hydrogen content of less than 0.1 wt. % (see U.S. Pat. No. 4,022,569). "Green coke" (or raw coke) is defined as the primary solid carbonization product from high boiling hydrocarbon fractions, obtained at temperatures below 900 K. It contains a fraction of matter that can be released as volatiles during subsequent heat treatment at temperatures up to approximately 1600 K. This mass fraction, the so-called volatile matter, is in the case of green coke between 4 and 15 wt. %, depending in part on the heating rate.

In bitumen upgrading, coking processes involve thermal cracking, in which the hydrogen to carbon (H/C) atomic ratio of the product is increased by a carbon rejection mechanism (Rana et al., A review of recent advances on process technologies for upgrading of heavy oils and residua, Fuel 86(9) (2007) 1216-1231), which involves cracking and polymerization reactions (Dutta et al., Thermal cracking of Athabasca bitumen: influence of steam on reaction chemistry, Energy & fuels 14(3) (2000) 671-676). Cracking reactions typically produce gas and liquid products, while radical polymerization reactions produce petroleum coke (Yoon et al., Thermogravimetric study of coal and petroleum coke for co-gasification, Korean Journal of Chemical Engineering 24(3) (2007) 512-517).

In petroleum refining, the residue from crude oil distillation processes may be further processed by what are termed "delayed coking" or "fluid coking" processes, which both provide lighter liquids from the residual oil. Delayed coking commonly occurs at a temperature range of 415-450° C., while fluid coking generally uses higher temperatures ranging from 480 to 565° C. (Wang et al., Clean and efficient use of petroleum coke for combustion and power generation, Fuel 83(10) (2004) 1341-1348). In a typical delayed coking process, coke drum reactors are used to hold, or delay, a heated feedstock while thermal cracking takes place. In fluid coking, a portion of the coke formed in thermal cracking reactions is burned as a fluidized solid to provide heat for the cracking process. Delayed coke can be classified, based on its morphological characteristics, as shot, sponge or needle coke. Shot coke is a hard, spherical solid; sponge coke is generally dull and black with porous and amorphous structure; and needle coke is generally silver-gray, having a crystalline structure (Birghila et al., "Study on physical-chemical properties of petroleum cokes", Romanian Journal of Physics 56(7-8) (2011) 976-82; Under, "Everything you always wanted to know about petroleum coke: a handbook", Allis Mineral Systems-Kenndy Van Saun, 1993; Small et al., Adsorption of acid extractable oil sands tailings organics onto raw and activated oil sands coke", Journal of Environmental Engineering 138(8) (2012) 833-840).

Generally, petcoke has a high carbon content (80-85 wt %) consisting of polycyclic aromatic hydrocarbons with heteroatoms, such as sulfur, nitrogen, and oxygen, and some metals present (Lv et al., "Characterization of condensed aromatics and heteroatomic species in Yanshan petroleum coke through ruthenium ion-catalyzed oxidation using three mass spectrometers", RSC Advances 6(66) (2016) 61758-61770). Disadvantageously, petcoke typically has relatively high amounts of sulfur (4-8 wt %), vanadium (~700 ppm) and has the potential to impact human and animal health (Caruso et al., "Petroleum coke in the urban environment: A review of potential health effects", International journal of environmental research and public health 12(6) (2015) 6218-6231).

SUMMARY

Processes are provided for the oxidative solubilization of metal-containing petroleum cokes in a basic aqueous solution, so as to segregate a solid metal-containing residue from a solubilized and demineralized organics fraction. Oxidation conditions are provided that optimize the yield of soluble partial oxidation products and minimize the generation of $CO_2$. In some embodiments, an oxidation catalyst may be used. The pH of the solubilized organics fraction may be reduced, under conditions that precipitate an upgraded carbonaceous material, in some embodiments comprising humic acid analogs, yielding a barren leachate solution.

Methods are accordingly provided for processing petroleum cokes, such as solid green petroleum cokes comprising a carbonaceous component and a transition metal component. The carbonaceous component may for example include polycyclic aromatic hydrocarbons, and the petroleum coke may be characterized by one or more of the elemental compositions set out in Table 1, such as (in wt %): ≥80 carbon ≤98; ≥1 hydrogen ≤8; ≥2.5 oxygen ≤10; nitrogen ≥0.5; ≥1 sulfur ≤10; ≥0.001 vanadium ≤0.8; ≥0.001 iron ≤0.5; ≥0.001 nickel ≤0.5; ≥0.001 molybdenum ≤0.1; and, ≥0.01 cobalt ≤1.

A soluble portion of the solid green petroleum coke may be solubilized in a basic subcritical aqueous solubilization liquid under solubilization conditions that, for example, involve a solubilization pressure of at least 500 psi (or ≤1000 psi, or from 500 psi to 1000 psi). The solubilization temperature may for example be from 220° C. to 240° C. (or ≥220 or 225 or 230 or 235° C. and/or ≤225 or 230 or 235 or 240° C.). A solubilization base may be added, for example at a concentration effective to maintain a desired solubilization pH such as pH ≥8, 9, 10, 11 or 12 and/or is ≤9, 10, 11, 12 or 13. The added solubilization base may for example be a hydroxide, such as an alkali metal hydroxide, such as KOH or NaOH (the mass ratio of solid green petroleum coke to KOH may for example be from about 0.5:1 to about 5:1, such as about 1:1). The effective solubilization time, meaning the period during which a recite degree of solubilization takes place, may for example be not more than 1 or 2 hours. Solubilization may take place wholly or partially in the presence of an oxidizing atmosphere, such as an atmosphere enriched in oxygen, for example comprising more than 21%, 25%, 30%, 35%, 40%, 45%, 50%, 55%, 60%, 65%, 70%, 75%, 80%, 85%, 90% or 95% oxygen. Agitation may take place during the effective solubilization time, for example to generate a stirred reaction region in the solubilization liquid having a desired Reynolds number, for example of ≥10,000. This may for example involve stirring, for example at ≥500 rpm (or from 500 rpm to 1000 rpm).

The solubilization conditions and effective solubilization time may be arranged so as to solubilize a desired proportion of the petcoke, for example at least 60%, 65%, 70% or 75% of the solid green petroleum coke. Dissolution leaves a leached solid residue and produces a pregnant solubilization solution that includes a solubilized organics fraction. The solubilization conditions and effective solubilization time may be selected so that the solubilization reaction has a selectivity for production of the solubilized organics fraction over a carbon dioxide gas fraction, for example of at least 50%, 60%, 70% to 80%. Similarly, conditions may be provided so that at least some proportion, such as 10%, 15%, 20% or 25% of the sulfur in the solid green petroleum coke reports to the leached solid residue. Similarly, conditions may be provided to limit the proportion of the transition metal component of the solid petcoke that reports to the pregnant solubilization solution as a dissolved transition metallic component, for example being no more than 40%, 50% or 60% of the transition metal component of the solid green petroleum coke.

A recovered solids fraction may be precipitated from the pregnant solubilization solution by lowering the pH, for example to a pH of ≤4, 5 or 6. The recovered solids fraction may for example include a desired proportion of the total organic carbon (TOC) present in the pregnant solubilization solution as the solubilized organics fraction comprises, for example ≥60%, 70%, 80% or 90%. The recovered solids fraction may include an acid precipitated transition metal component, for example making up a smaller weight percent fraction of the recovered solids fraction than the weight percent fraction of the transition metal component in the solid green petroleum coke. In select embodiments, the precipitated transition metal component may for example make up 51% by weight of the recovered solids fraction.

The recovered solids fraction may for example have an ignition temperature of not more than 450 or 420° C., and/or a volatile material content of more than 15 or 20 wt %, and/or a volatile material to fixed carbon ratio of at least 0.2 or 0.25, and/or a heating value of at least 25 or 30 MJ/kg.

Catalytic methods of processing petroleum cokes are also provided, for example involving the use of a copper tetrasilicate catalyst. For example using a solubilization temperature of from 150° C. to 230° C., and an added solubilization base concentration effective to maintain a solubilization pH≥8, for an effective solubilization time of less than 6, 5, 4, 3, 2 or 1 hour(s), in the presence of an oxidizing atmosphere comprising more than 21% oxygen, and in the presence of with agitation to generate a stirred reaction region in the solubilization liquid, so as to solubilize at least 90% of the solid green petroleum coke leaving a leached solid residue and producing a pregnant solubilization solution comprising a solubilized organics fraction. The solubilization conditions and effective solubilization time using a catalyst may for example be selected so that the solubilization reaction has a selectivity for production of the solubilized organics fraction over a carbon dioxide gas fraction of at least 80%, 85%, 90 or 95%. The copper-tetrasilicate catalyst may for example be a nanocrystalline material, for example a Gillespite group-type solid catalyst, belonging for example to the Gillespite group of minerals (cuprorivaite $(CaCuSi_4O_{10})$; wesselsite $(SrCuSi_4O_{10})$ and effenbergerite $(BaCuSi_4O_{10})$ or combinations thereof).

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
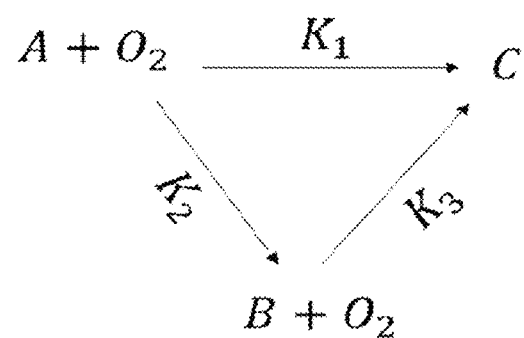
FIG. 1 is a schematic illustration of a triangular reaction scheme of petcoke oxy-cracking, where A is the petcoke, B is the intermediates (desired products, TOC), and C: $CO_2$ in the gas phase (CG)+$CO_2$ in the liquid phase (carbonates IC).

In one aspect, an approach for petcoke conversion into valuable products is disclosed herein, using oxy-cracking reactions under relatively mild operating conditions of temperature and pressure in an aqueous alkaline medium. The reaction conditions are exemplified in a batch reactor, with examples of optimization for high conversion rates and selectivity for water-solubilized products, with minimal amounts of $CO_2$ emission. In select embodiments, the optimal reaction temperature and time were 230° C. and 2 h, respectively. Reaction kinetics are disclosed, at residence times ranging between 0 and 2 h, and at different reaction temperatures: 200, 215, and 230° C. The kinetics results illustrate that the petcoke is oxy-cracked simultaneously into water-soluble species and $CO_2$, with the consecutive reaction of soluble species into $CO_2$. The concentration of the oxy-cracked petcoke in the liquid phase was measured as a lumped TOC, while $CO_2$ was determined in gas products at the end of reaction using gas chromatography (GC) and inorganic carbon (IC). The oxygenated hydrocarbons (desired products) and the residual solids were characterized using FTIR, NMR and XPS techniques. The results indicate that the main species solubilized in water were oxygenated hydrocarbons and some organic acids, such as carboxylic and sulfonic acids and their salts. The residual solids remaining after the reaction showed structures and functional groups similar to the original petcoke. Surprisingly, most of the metals contents reported to the residual petcoke, compared with the metals in the liquid phase. In accordance with the disclosed embodiments, the present oxy-cracking technique can be used for upgrading conversion and demineralization/desulfurization of petroleum cokes.

In an alternative aspect, aspects of which are described in Example 2, a copper-silicate nanocrystalline material belonging to the Gillespite group of minerals (cuprorivaite ($CaCuSi_4O_{10}$); wesselsite ($SrCuSi_4O_{10}$) and effenbergerite ($BaCuSi_4O_{10}$) or combinations thereof) was synthesized and used as a catalyst for petcoke oxy-cracking. In addition to the exemplified results using cuprorivaite, a cuprorivaite-wesselsite (50%-50%) solid solution was prepared by a hydrothermal method, and was tested with bituminous material, confirming efficacy of the relevant catalytic activity across the Gillespite group of minerals, which share the same structural configuration of the copper-silicate active site for the oxidation reaction (differing only to the extent dictated by the distinct Ca, Sr or Ba cations).

The catalyst activity and selectivity were illustrated in a batch reactor under a range of reaction conditions. A high reaction conversion rate and high selectivity for water solubilized products, with almost zero emission of $CO_2$, were exemplified even at high reaction temperatures. A triangular lumped kinetics model successfully describes the oxy-cracking reaction, based on the hydroxyl radical mechanism. In this model, the petcoke is oxy-cracked simultaneously into water soluble species and $CO_2$ with the consecutive reaction of soluble species into $CO_2$. Surprisingly, the catalyst was found to be very stable enough in the aqueous dissolution medium, with the leaching percentage being less than 3 wt % of the whole Cu, even at elevated temperatures. After being reused three times, the $CaCuSi_4O_{10}$ catalyst retained its catalytic activity. The oxy-cracked compounds solubilized in water during the reaction were characterized using FTIR and the main species were carboxylic, carbonyl, phenolic, and sulfonic functions—which are humic acid analog compounds. The excellent catalytic activity, selectivity, stability and environmentally benign nature of copper-silicates, under mild operating conditions, provides an optimized oxy-cracking process.

In a further illustration of aspects of the oxy-cracking process, as described in Example 3, the use of oxy-cracked petcoke solids as a fuel is exemplified. Characterizations are provided of the oxidation and combustion properties of this fuel, as well as measuring calorific values. Thermogravimetric analysis was used to illustrate the thermal degradation behavior of the virgin and oxy-cracked petcoke. In the exemplified embodiments, the oxidation of oxy-cracked petcoke occurs at 475° C. (which is lower than that of virgin petcoke where the oxidation is occurred at 540° C.). The heating values were estimated by proximate analysis using different correlations. The results indicate that oxy-cracked products contain a high proportion of volatile compounds and significantly high calorific heating value (~30 MJ/kg). These embodiments illustrate that the oxy-cracked petcoke exhibits high reactivity, comparable to other fuels. The disclosed oxy-cracking processes may accordingly be used to transform petcoke into a fuel for thermal applications, taking advantage not only of its combustion behavior, but also a low content of sulfur, nitrogen and metals.

For purposes of the present disclosure, green petcoke may be defined by compositional characteristics, for example in contrast to calcined petcoke, as for example set out in Table 1.

TABLE 1

Composition of Petroleum cokes

| Composition | wt % | | |
|---|---|---|---|
| | Green Petcoke | Exemplary Green Petcoke | Calcined Petcoke |
| Carbon | ≥80 or ≥85 and/or ≤95 or ≤98 | 84.48 | 98 |
| Hydrogen | ≥1, ≥2, or ≥3, and/or ≤6, ≤7 or ≤8 | 3.81 | 0.14 |
| Oxygen | ≥2.5, ≥3, ≥4 or ≥5 and/or ≤6, ≤7, ≤8, ≤9, or ≤10 | 5.37* | 0.02 |
| Nitrogen | ≥0.5 | 1.55 | 0.22 |
| Sulfur | ≥1 or ≥2 or ≥3 or ≥4 and/or ≤4.5 or ≤5 or ≤10 | 4.46 | 1.2 |
| Vanadium | ≥0.001 or ≥0.01 and/or ≤0.1 or ≤0.5 | 0.08 | |
| Iron | ≥0.001 or ≥0.01 and/or ≤0.1 or ≤0.5 | 0.06 | |
| Nickel | ≥0.001 or ≥0.01 and/or ≤0.1 or ≤0.5 | 0.03 | |
| Molybdenum | ≥0.001 or ≥0.005 and/or ≤0.2 or ≤0.1 | 0.01 | |
| Cobalt | ≥0.01 or ≥0.05 and/or ≤0.2 or ≤0.5 or ≤1 | 0.15 | |
| Ash | 0.05-0.5 | 0.19-0.35 | 0.35 |
| C/H | 10:1-50:1 | 18:1-24:1 | 910:1 |

*Estimated by difference

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Terms such as "exemplary" or "exemplified" are used herein to mean "serving as an example, instance, or illustration." Any implementation described herein as "exemplary" or "exemplified" is accordingly not to be construed as necessarily preferred or advantageous over other implementations, all such implementations being independent embodiments. Unless otherwise stated, numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. The invention includes all embodiments and variations substantially as hereinbefore described and with reference to the examples and drawings.

EXAMPLES

Example 1: Conversion of Petroleum Coke into Valuable Products Using Oxy-Cracking Materials and Setup A sample of exemplary green petcoke was obtained from a commercial source. This black-solid sample was characteristic of green petcoke, comprising complex hydrocarbons in a structure which includes polycyclic aromatic hydrocarbons (3-7 rings), such as benzopyrene. The sample was ground and sieved to a particle size ranging between 53 and 710 μm. Elemental analysis of the petcoke sample was carried out using a PerkinElmer 2400 CHN analyzer (Waltham, Mass., USA) for C, H, N contents and a Thermo Intrepid inductively coupled plasma-atomic emission spectroscopy (ICP-AES) for sulfur and metal contents. The chemical composition of the selected petcoke sample is listed in Table 1, as the Exemplary Green Petcoke.

KOH (ACS reagent, ≥85%, pellets) purchased from Sigma-Aldrich (Ontario, Canada) was used to adjust the pH of the reaction medium (deionized water) and solubilize the petcoke in the aqueous basic medium. Oxygen 99.9% ultra-high purity purchased from Praxair (Calgary, Canada) was used as the oxidant gas.

The experimental setup made use of a 100 mL reactor vessel (model number 4598, Parr Instrumental Company, Moline, Ill., USA), made of stainless steel SS-316 with 12 cm in length and 3.25 cm in diameter. The vessel was equipped with a heating oven connected to a temperature control loop, a pressure gauge and a mechanical stirrer with a speed controller. The reactor vessel was capable of handling pressures up to 1700 psi and temperatures up to 270° C. The oxy-cracking experiments were carried out at temperatures from 150 to 250° C. and pressures up to 1000 psi. In a typical experiment, 1.0 g of solid petcoke sample was charged into the reactor vessel containing 20 g of deionized water and a specified amount of KOH. The pH of the reaction medium was kept above 8.0 by adding 1.0 g KOH to assist in solubilizing the petcoke and to ameliorate corrosion. Leak tests were performed by pressurizing the reactor with $O_2$ up to 1200 psi prior to fixing the operating pressure. Then, the mixer was set to 1000 rpm to minimize the interfacial mass resistance between the gas and liquid phase and to ensure uniform temperature and concentration profiles in the liquid phase. The reactor was then heated to the desired temperature. Once the desired pressure and temperature are attained, the zero-reaction time was set. The reaction was carried out at different residence times, namely 15, 30, 45, 60, 120, 180 and 240 min. Several operating parameters were varied to illustrate optimization of the oxy-cracking reaction, including temperature, reaction time, oxygen pressure, mixing speed, particle size and amount of KOH. At the end of the reaction, the reactor was cooled to room temperature. Then, the gas phase was analyzed using gas chromatography, GC (SRI 8610C, SRI Instruments). Afterwards, the liquid effluents were discharged and filtered for total organic carbon (TOC) analysis. A small amount of unreacted solid residue was collected at the bottom of the reactor vessel. The oxy-cracked and insoluble (residual) petcoke fractions were recovered using an evaporator (vacuum oven) for further analysis by Fourier transformed infrared spectroscopy (FTIR), nuclear magnetic resonance (NMR) spectroscopy and X-ray photoelectron spectroscopy (XPS) to illustrate the nature of the fractions. Elemental analysis was also performed on the dried recovered solids.

FTIR Analysis

The functional groups within the chemical structure of the virgin petcoke sample, oxy-cracked (solubilized) and insoluble solid (residue) were characterized with a Shimadzu IRAffinity-1S FTIR (Mandel, USA), provided with a smart diffuse reflectance attachment to carry out diffuse reflectance infrared Fourier transform spectroscopy (DRIFTS) analysis. Initially, the background was defined by analyzing about 500 mg of pure potassium bromide (KBr) powder; then, approximately 5 mg of the petcoke sample dispersed in the 500 mg of KBr was analyzed. The IR spectra were obtained in the wave number ranging from 400 to 4000 $cm^{-1}$; all the spectra were acquired as averages of 50 scans with a resolution of 4 $cm^{-1}$. In the case of the oxy-cracked (solubilized) sample, the solidified organic species were collected by drying the solubilized petcoke in water overnight at 65° C. in a vacuum oven.

Total Organic Carbon (TOC) Analysis

A Shimadzu total organic carbon analyzer (TOC-L CPH/CPN) was used to determine the carbon content of the solubilized organic and inorganic species present in the water. The TOC samples were prepared by centrifuging the solubilized species (Eppendorf centrifuge 5804) at 5000 rpm and 15 min to separate the remaining solid (i.e., unreacted and insoluble species). The total carbon (TC), total organic carbon (TOC), and inorganic carbon (IC) of the aqueous phase were measured. Both TC and IC measurements were calibrated using standard solutions of potassium hydrogen phthalate and sodium hydrogen carbonate. Fifteen milliliters of the centrifuged solutions were placed in standard TOC vails. Using the TOC software to control the system, the TC was automatically measured. After that, an acid was added to evolve $CO_2$ from the sample to measure the remaining organic compounds, which were considered as TOC. All the measurements were taken three times, and the average was used for the calculations with a 5% relative standard deviation.

$^1$H Nuclear Magnetic Resonance (NMR) Spectroscopy

The NMR spectrum of the oxy-cracked sample was determined with a Bruker 600 MHz spectrometer (4 mm BL4 liquid probe, cross-polarization program, and spin rate of 8 k). The 1H NMR spectrum was taken at 298 K using a $D_2O$ solvent with a pulse sequence zg30, a relaxation time of 2 s, and averaging 160 scans/run. The NMR spectrum was analyzed using the commercial NMR simulator software (Mnova NMR) helping the assignment of most structure types available at different frequencies.

Gas Chromatography (GC) Analysis

Compositional analysis of produced gases was carried out with a GC (SRI 8610C Multiple Gas #3 gas chromatograph SRI Instruments, Torrance, Calif.). The GC was provided with a thermal conductivity detector (TCD) and two packed columns connected in parallel (3' molecular sieve/6' Hayesep-D columns). The molecular sieve column is used for permanent gases, while the Hayesep-D column allows analysis for hydrocarbons up to C5. The gas analysis was carried out after the oxy-cracking reaction is completed and cooled down to room temperature. The GC measurements were repeated 5 times for each sample, and the average relative error was lower than 3%.

X-Ray Photoelectron Spectroscopy (XPS)

The XPS analysis was conducted on the petcoke sample before and after reaction using an XPS PHI VersaProbe 5000 spectrometer to provide information about the distribution of different atoms on the sample surface based on their binding energy. The oxy-cracked sample was collected after drying it in a vacuum oven at 65° C. overnight. The spectra were taken using a monochromatic Al source (1486.6 eV) at 50 W and a beam diameter of 200.0 μm with a take-off angle of 45°. The samples were pressed on double-sided tape and the spectra were taken with double neutralization. The sample sputtering protocol involved 20 min of Argon sputtering at 45°, 2 kV, 1.5 μA 2×2 (less than 10.5 nm/min). Calibration was performed with a $SiO_2$/Si wafer having a $SiO_2$ layer of 100 nm.

Elemental Analysis

A combustion method using a PerkinElmer 2400 CHN analyzer (Waltham, Mass., USA) was used for analyzing carbon, hydrogen, and nitrogen contents after and before oxy-cracking reaction. Both sulfur and nitrogen contents for organic materials were determined with an Antek 9000 system (Houston, Tex., USA) by running toluene solutions (10 wt %/vol.). Calibration was performed with Accustandard IS-17368 (N) and Accustandard SCO-500× (S) standards. For metal analysis (Fe, Ni, Co, Mo and V), the microwave assisted acid digestion procedure was used in a commercial unit model MARS 6 from CEM Corporation (Matthews, N.C., USA) for digesting the solid residual samples. The system is provided with UltraPrep vessels of 100 mL capacity and a MARSXpress DuoTemp controller which was operated at a frequency of 2.45 GHz at 100% of full power (maximum of 1600 W). Sulfur and metal concentrations in the oxy-cracked and residual samples were determined by ICP-AES.

Reaction Kinetics

While not being bound to a particular mechanism, the oxy-cracking mechanism of petcoke may be conceptualized as a triangular reaction pathway, as depicted in FIG. 1, where petcoke solubilized in water with small quantities of produced $CO_2$ at early stages of the reaction. Under certain reaction conditions, longer residence time and higher temperature, the solubilized petcoke in water starts reacting with oxygen to produce $CO_2$.

Petcoke has a complex structure, and many soluble and insoluble intermediates were accordingly produced during the reaction. The concentration of the intermediates (desired products) in the liquid phase was calculated based on carbon mass as the lumped total organic carbon (TOC) concentrations. However, the carbon content of initial feedstock was calculated using elemental analysis; carbon content before reaction (feedstock)=(mass of petcoke)×(carbon % in feed). The produced gas, primarily $CO_2$, was analyzed online using GC. Other determined gas concentrations were very small. The reaction conversion based on carbon mass was calculated based on the following equation:

$$\text{Conversion, } X = \frac{C_{AO} - C_R}{C_{AO}} \quad (1)$$

where $C_{AO}$ is the carbon concentration of virgin petcoke before the reaction, $C_R$ is the residual carbon concentration (unreacted petcoke) that remains after the reaction. The numerator term ($C_{AO}-C_R$) in Eq (1) represents the amount of carbon in the liquid phase as total carbon (TC=TOC+IC) and the amount of carbon in the gas phase $CO_2$ (CG). Hence, $$C_{AO}-C_R=(TOC)+(IC)+C_G \quad (2)$$

considering $CO_2$ gas as obeying ideal gas behavior, then the carbon content in the gas phase (CG) may be calculated as follows:

$$CG = 12 \times \frac{PV}{RT} \quad (3)$$

where, P and T are the pressure and temperature at the end of reaction, respectively. V is the volume of the gas phase in the reactor vessel and R is the ideal gas constant.

The selectivity for production of the desired products (B) and $CO_2$ (C) may be calculated as follows:

$$\text{Selectivity to product } B = \frac{(TOC)}{(TOC) + IC + C_G} \quad (4)$$

$$\text{Selectivity to product } C = \frac{(IC + C_G)}{(TOC) + IC + C_G} \quad (5)$$

The kinetic rate equations for the oxy-cracking reaction in a batch reactor can be expressed by the set of the following three differential equations:

$$\frac{dC_A}{dt} = -r_A = (K_1 + K_2)C_A^{n1} \quad (6)$$

$$\frac{dC_B}{dt} = +r_B = K_2 C_A^{n1} - K_3 C_B^{n2} \quad (7)$$

$$\frac{dC_C}{dt} = +r_C = K_1 C_A^{n1} + K_3 C_B^{n2} \quad (8)$$

where, $$K_1 = k'_1 e^{-E_1/RT} C_{O_2}^m \quad (9)$$

$$K_2 = k'_2 e^{-E_2/RT} C_{O_2}^m \quad (10)$$

$$K_3 = k'_3 e^{-E_3/RT} C_{O_2}^m \quad (11)$$

where $C_A$, $C_B$, and $C_C$ are the carbon concentrations of original petcoke, desired products, and $CO_2$, respectively. $CO_2$ is the concentration of oxygen, n1, n2 and m are the reaction order of A, B and $O_2$, respectively. t is the reaction time, and $K_1$, $K_2$, and $K_3$ are the reaction rate constants. The reaction orders are experimentally determined to be first order for A and B, i.e., n1=n2=1. Typically, the order of oxygen is either near zero (m=0) or excess oxygen is used to reduce its effect on the reaction kinetics and enable hydrocarbon species (A and B) to be the limiting reactant. Therefore, the oxygen terms will be considered as a constant, hence, Equations 6 to 8 can be expressed as follows:

$$\frac{dC_A}{dt} = -(K_1 + K_2)C_A \quad (12)$$

$$\frac{dC_B}{dt} = K_2 C_A - K_3 C_B \quad (13)$$

$$\frac{dC_C}{dt} = K_1 C_A + K_3 C_B \quad (14)$$

The kinetic parameters, i.e., $K_1$, $K_2$, and $K_3$ were estimated using the Mathematica software (V10.2) by fitting the experimental data to the differential equations (3.12-3.14) under the following initial conditions: at t=0, $C_A$=$C_{A0}$, and $C_B$=$C_C$=0. The proportional weighed sum-of-squares was minimized using the Mathematica until all values of the correlation coefficient ($R^2$) were very close to 1.0. The kinetics data were collected at three different temperatures of 200, 215, and 230° C. and reaction times varying from 0 to 1 h. However, other important parameters, such as the operating partial pressure (750 psi), the mass ratio of petcoke to KOH, and the impeller speed (1000 rpm) were all kept fixed. At these temperatures and reaction times, an optimized range of conditions was selected to make the reaction favorable to the desired products. Indeed, at high temperatures (>250° C.) and residence times (>2 h), combustion reaction becomes more favorable than oxy-cracking and more $CO_2$ was produced. However, low reaction conversions were obtained at low temperatures (<180° C.). The oxy-cracking reaction was not significantly affected by the oxygen partial pressure beyond 750 psi. Also, the oxy-cracking reaction rate was found to be independent of the impeller speed above 500 rpm, indicating there is no mass transfer limitation beyond this speed limit. The estimated reaction constants of the petcoke oxy-cracking are presented in Table 2.

TABLE 2

Determined values of non-catalyzed oxy-cracking reaction constants.

| T (° C.) | $K_1$ (s$^{-1}$) | $K_2$ (s$^{-1}$) | $K_3$ (s$^{-1}$) |
|---|---|---|---|
| 200 | 2.27 × 10$^{-5}$ | 1.84 × 10$^{-4}$ | 1.71 × 10$^{-5}$ |
| 215 | 6.99 × 10$^{-5}$ | 3.46 × 10$^{-4}$ | 2.42 × 10$^{-5}$ |
| 230 | 2.43 × 10$^{-4}$ | 87.37 × 10$^{-4}$ | 3.67 × 10$^{-5}$ |

Consequently, the activation energies and frequency factors were estimated using Arrhenius equation based on the temperature and reaction constants as follows:

$$K_i = k'_i e^{\frac{-E_i}{RT}} \quad (15)$$

where k'$_i$ is the frequency factor for each step of the reaction, $E_i$ is the activation energy, i is the reaction step pathway (1, 2, and 3), R is the ideal gas constant, and T is the temperature.

Figure 2:
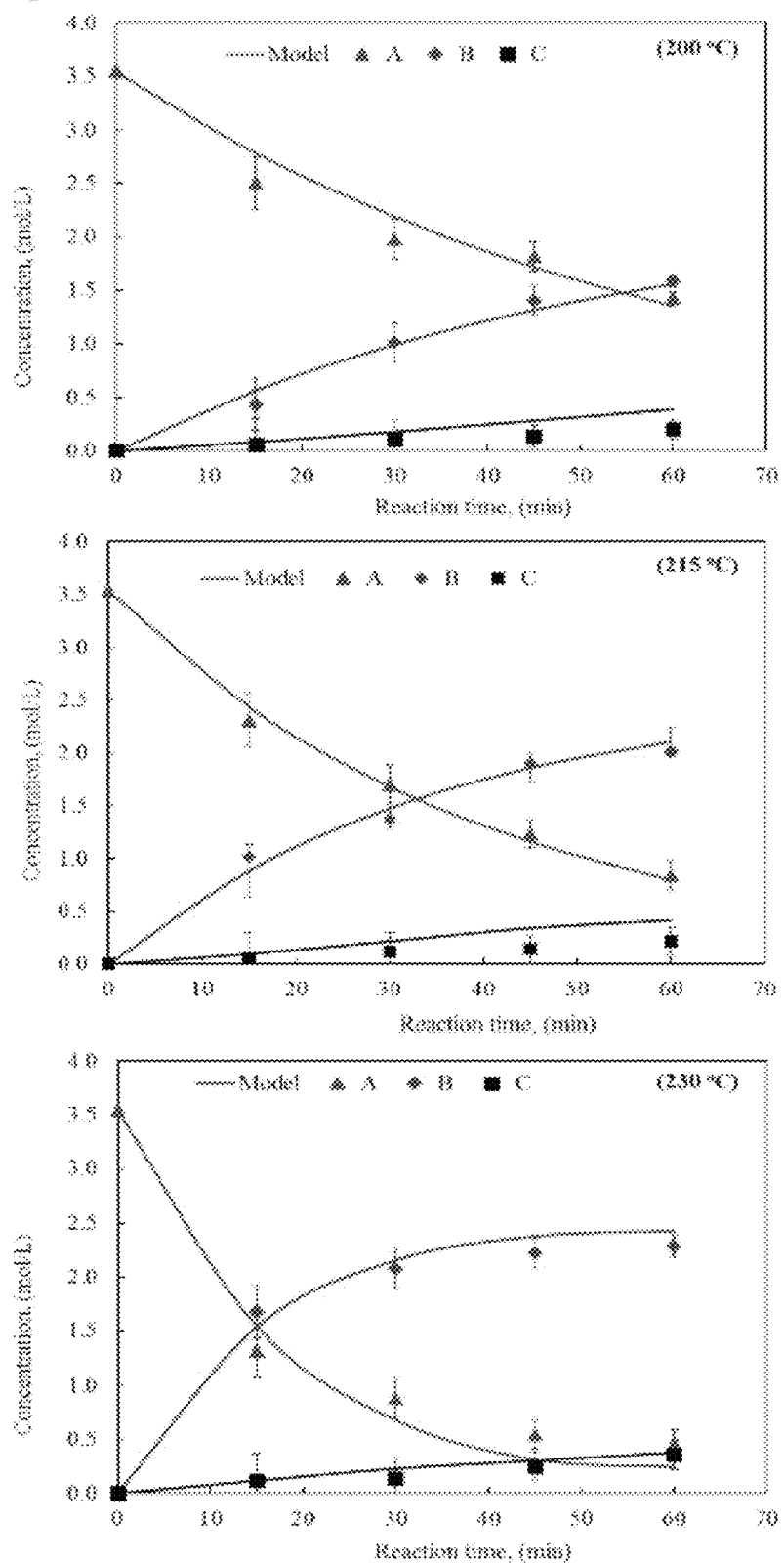
FIG. 2 includes three graphs showing concentrations of A, B, and C as a function of reaction time at different reaction temperature 200° C., 215° C., and 230° C. The symbols represent experimental data, and the solid lines are the kinetics model (Eqs. 12-14).

FIG. 2 compares the experimental data with the kinetic model for concentration profiles of petcoke (A), intermediate compounds (B), and $CO_2$ (C) at three different temperatures of 200, 215, and 230° C. as a function of time. Error bars shown in the figure represent the calculated standard deviation based on the TOC and GC measurements. Noticeably, the kinetic model showed an excellent agreement with the experimental results and described the proposed triangular reaction kinetics scheme accurately. It is clear that the reaction temperature is acting as a key parameter in the oxy-cracking reaction. Thus, at a higher temperature (i.e., 230° C.), the solubilization of oxy-cracked compounds in water is increased and reached to the maximum concentration faster than at lower temperatures. Moreover, at a high reaction temperature, the produced $CO_2$ in the gas phase is detected at the early stage of the reaction. Even at low reaction time, i.e., 15 min, the amount of produced $CO_2$ is determinable by GC. This indicates that a direct reaction may be occurring between oxygen and petcoke to form $CO_2$.

Figure 3:
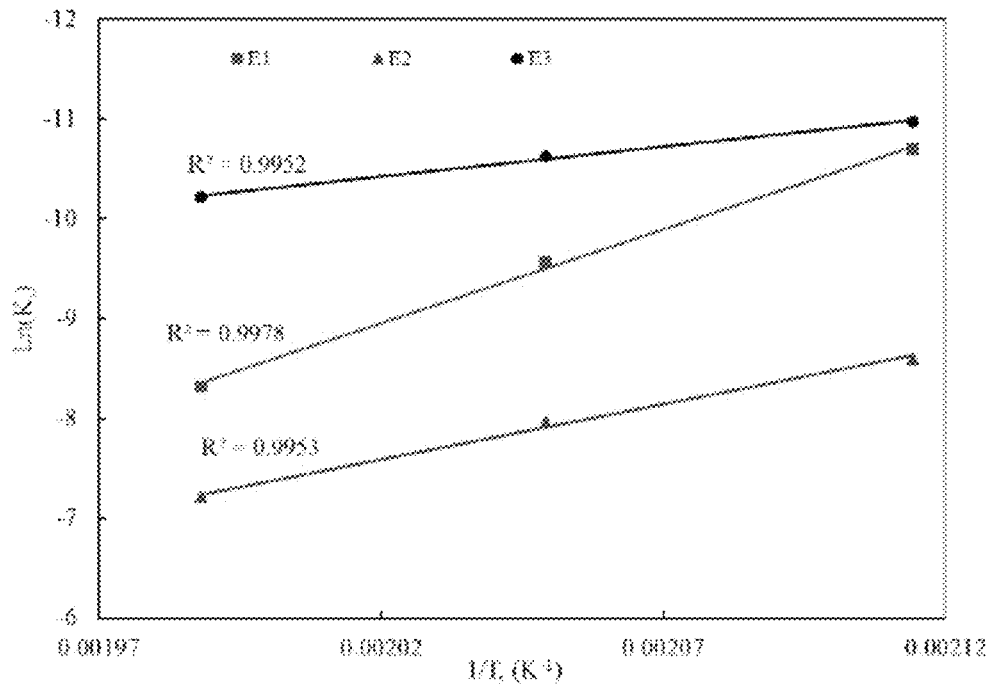
FIG. 3 is a graph showing Arrhenius plots of petcoke oxy-cracking for each reaction pathway.

FIG. 3 shows the Arrhenius plot of petcoke oxy-cracking reaction at three different reaction temperatures. By plotting ln(k) against 1/T, a good fitting was accomplished between Arrhenius equation and the experimental data, indicated by $R^2$ values closed to 1. From the slope and intercept of the best-fit-line at each temperature, the values of activation energies and frequency factors of petcoke oxy-cracking were calculated and summarized in Table 3.

TABLE 3

Estimated activation energies and frequency factors of non-catalyzed petcoke oxy-cracking.

| Activation energy (kcal · mol$^{-1}$) | Frequency factor (s$^{-1}$) |
|---|---|
| $E_1$ 39.46 ± 0.495 | 1.74 × 10$^{12}$ |
| $E_2$ 21.87 ± 0.532 | 2.19 × 10$^{6}$ |
| $E_3$ 11.95 ± 0.981 | 5.75 |

At the beginning of the reaction, an induction period is found in which there is small amount of $CO_2$ released. This small amount of $CO_2$ is consistent with the presence of short alkyl chains in the petcoke structure, as confirmed by FTIR. This is also consistent with the fact that the highest activation energy value ($E_1$=39.46 kcal/mol) in the first reaction pathway. The activation energy value may be attributed to the complexity of aggregated structures in petcoke. As a result, petcoke aggregates require more oxygen penetration during the oxy-cracking reaction to achieve the desired conversion.

These results are indicative of a mechanism whereby petcoke particles are solubilized as oxygenated hydrocarbon analogs of carboxylic acids and the like. These findings are consistent with a second reaction pathway having an activation energy of $E_2$=21.87 kcal/mol and a high value of the frequency factor 2.19×10$^6$ s$^{-1}$. Consequently, $CO_2$ may be produced in the third reaction pathway, $E_3$=11.98 kcal/mol, by further reaction between solubilized aromatic moieties and oxygen. Although the activation energy for deep oxidation of petcoke to produce $CO_2$ in the first reaction pathway (39.46 kcal/mol) is much higher than the one obtained in the third pathway (partial oxidation) (11.98 kcal/mol), the frequency factor in the first pathway (1.74× 10$^{12}$ s$^{-1}$) is also higher than the third pathway (5.75 s$^{-1}$). These findings provide evidence that process conditions may be arranged so that the rate of conversion of petcoke into $CO_2$ at the beginning of the reaction is roughly equivalent to the rate of $CO_2$ production from the oxidation of organic compounds solubilized in water. In effect, surprisingly, conditions may be arranged so that the rate of forming and producing intermediate compounds (desired products) is more favorable than the rate of $CO_2$ production via both reaction pathways. This is evident from the finding that the activation energy $E_2$ was lower than $E_1$ and the frequency factor $k'_2$ is higher than $k'_3$. The overall result is accordingly to provide a process in which the production of $CO_2$ is minimized.

Effects of Operating Conditions on Petcoke Oxy-Cracking Reaction

In this section, the effects of operating conditions such as temperature, residence time, oxygen partial pressure, amount of KOH, petcoke particle size and impeller speed are exemplified. These parameters are optimized not only to maximize the reaction conversion and selectivity to produce the water-solubilized hydrocarbons (desired products) but also to minimize the amount of $CO_2$ produced during the oxy-cracking reaction.

Optimization of the oxygen partial pressure revealed that the reaction was not significantly affected by oxygen partial pressures beyond 750 psi. Within the relevant pressure and temperature range (180-250° C.), the water exists only as a subcritical liquid. In this Example, at the given pressures, oxygen was present in an excess amount.

Figure 4:
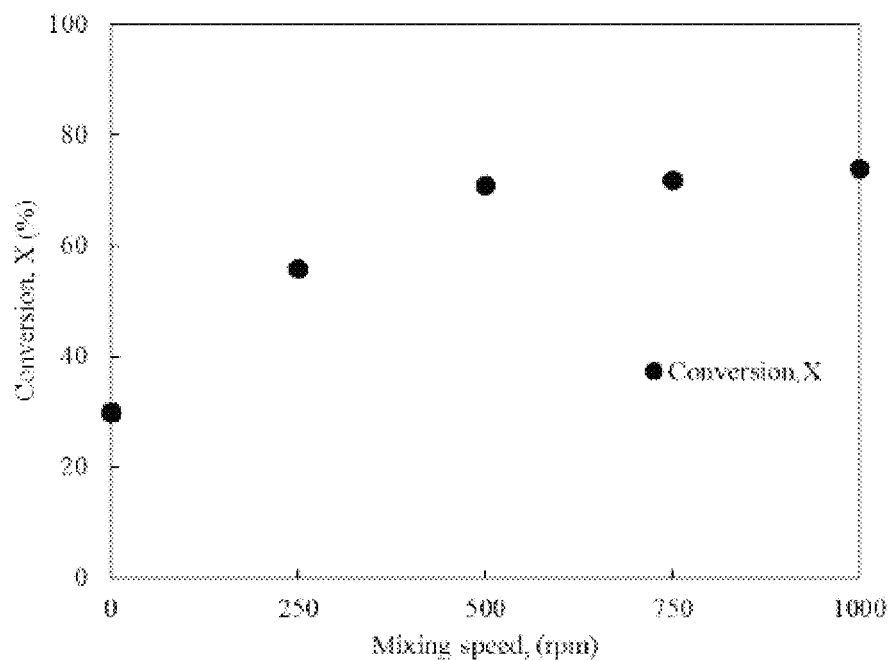
FIG. 4 is a plot illustrating the effect of mixing speed on the conversion of petcoke during oxy-cracking reaction (T=215° C., P=750 psi and t=2 h).

The effect of mixing was investigated during the petcoke oxy-cracking reaction. High mixing speeds may be used to minimize the interfacial mass resistance between the gas and liquid phase, enhancing the transfer of oxygen from the gas phase to the liquid phase. Additionally, mixing helps to maintain relatively uniform temperature and concentration profiles in the liquid phase. The reaction conversion was evaluated by varying the mixing speed from 0 to 1000 rpm while fixing other parameters such as temperature (215° C.), oxygen pressure (750 psi) and reaction time (2 h). As seen in FIG. 4, when the mixing speed is below 500 rpm, a significant reduction in the reaction conversion occurred, evidencing mass transfer as a controlling step. However, above 500 rpm, the effect is drastically reduced and there was practically no effect on the reaction conversion, i.e., the reaction region is the controlling step. Therefore, an appropriately high mixing speed may advantageously be applied to the aqueous phase. For example, to ameliorate mass transfer resistance, the reaction may take place in a turbulent region (i.e., Reynolds numbers, Re>10000).

Figure 5:
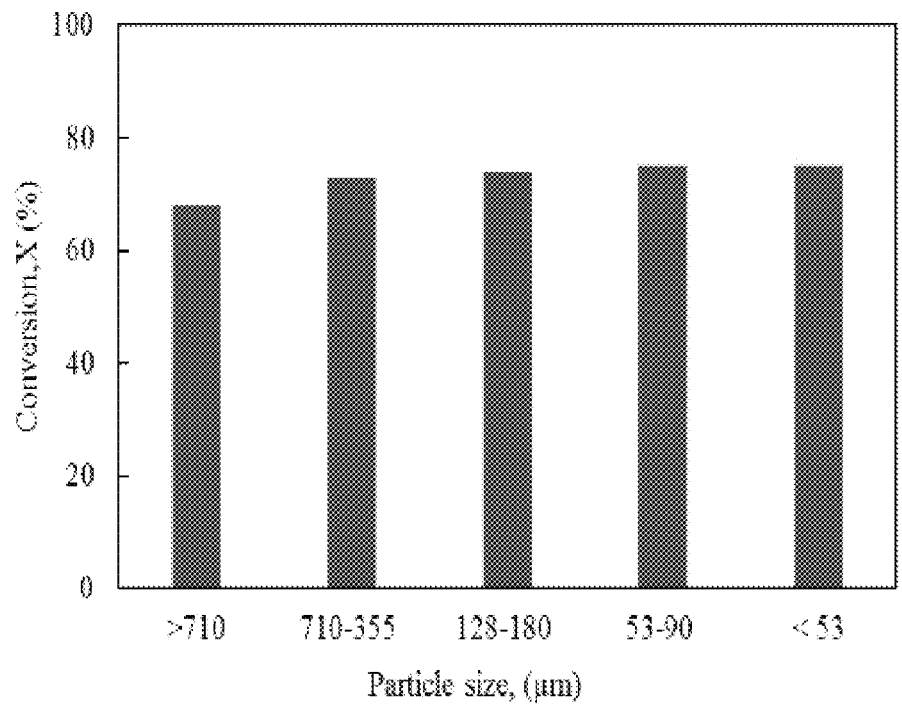
FIG. 5 is a bar graph illustrating the effect of petcoke particle size on reaction conversion of petcoke (T=215° C., P=750 psi and t=2 h).

The effect of petcoke particle size on the oxy-cracking reaction was also demonstrated. Petcoke particle sizes ranging from 53 to 710 μm were exemplified to illustrate the effect on petcoke solubilization or mass transfer limitations. FIG. 5 shows the reaction conversion of petcoke oxy-cracking evaluated at different petcoke particle sizes, constant temperature (215° C.), mixing speed (1000 rpm), oxygen pressure (750 psi) and reaction time (2 h). Effective reactions were demonstrated over a wide range of particle sizes. As exemplified, total petcoke conversion to desired products and $CO_2$ was approximately constant (about 78.5%), and independent of particle size.

Effect of the Temperature

Figure 6:
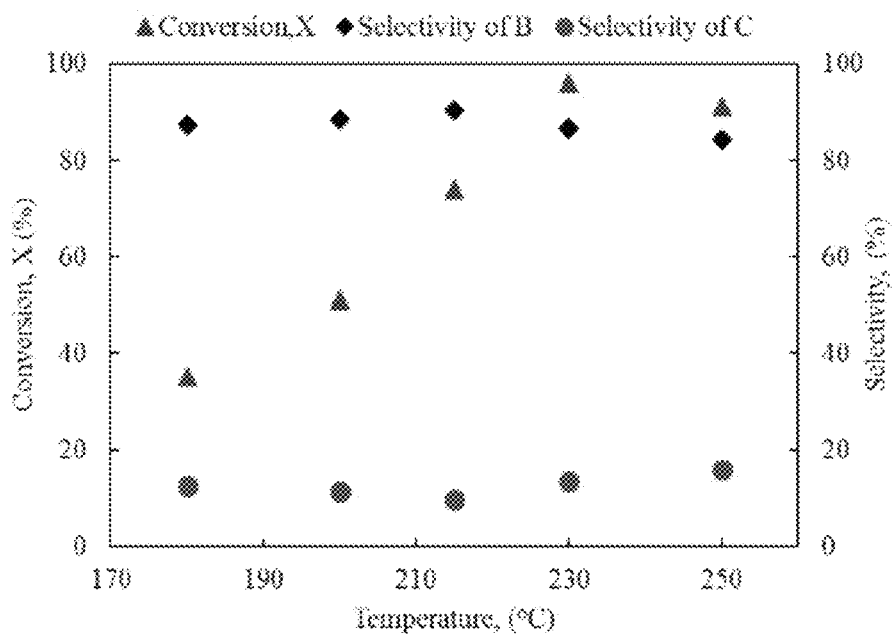
FIG. 6 is a plot illustrating the effect of the reaction temperature on the selectivity and conversion of petcoke oxy-cracking (P=750 psi and t=1 h).

The effect of the temperature on the conversion and selectivity of the oxy-cracking reaction was illustrated between 180 and 250° C. Other parameters were constant, such as the oxygen partial pressure set to 750 psi (to ensure the water was present in a subcritical state), mixing rate was 1000 rpm to prevent liquid phase interfacial mass transfer resistance, and the residence time was 1 h. As demonstrated, the reaction performance improved with increasing temperature. Accordingly, in select embodiments, the reaction temperature may be optimized to facilitate the oxy-cracking reaction. For example, by increasing temperature (i.e., up to 250° C.) the solubilization of oxy-cracked compounds in water is increased. Although the solubilization of oxygenated hydrocarbons is increased at a high temperature, the selectivity of producing $CO_2$ gas is also increased. Hence, under longer reaction times the oxygenated intermediates further decomposed oxidatively to $CO_2$ and $H_2O$. FIG. 6 shows the conversion and selectivity of oxy-cracking reaction at different reaction temperatures. It is clear that as the temperature increased the petcoke conversion to produce solubilized-hydrocarbons (B) is increased with a slight increase in $CO_2$. However, the selectivity to produce the desired products (B) is slightly decreased with a further increase in temperature (250° C.). Moreover, no reaction occurred at temperatures lower than 150° C. with the considered residence time. For instance, the reaction conversion was less than 30% when the temperature ranged from 150 to 180° C. at 1 h residence time. In a select embodiment, the highest conversion was obtained when the temperature ranged from 220 to 240° C. Based on that, in some embodiments, the optimum reaction temperature which provides the highest conversion and selectivity to B synchronized with a minimal amount of $CO_2$ centers around 230° C., as presented in FIG. 6.

These results illustrate that temperature has a significant effect on the overall conversion rate, and a meaningful effect on the selectivity for water solubilized products. Accordingly, the oxy-cracking temperature is an optimizable parameter. The reaction temperature will affect not only the conversion rate and selectivity, but also the acidity of the products formed. Even as reaction rates increase with temperature, the final TOC values of the desired products (B) for temperatures higher than about 230° C. are effectively constant after 1 h. In effect, more acidic functional groups were produced at higher temperatures (200-250° C.), and this is confirmed by lowering the values of pH for neutralization reactions to about 8.5. This evidences the ability to use temperature to select the nature of products produced by the oxy-cracking process.

Effect of Reaction Times

Figure 7:
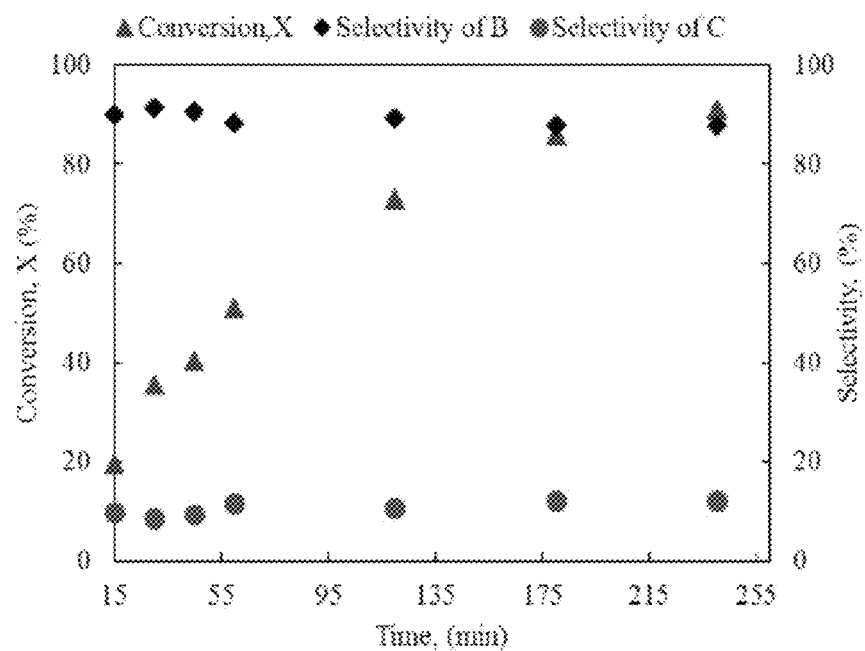
FIG. 7 is a plot illustrating the effect of reaction time on selectivity and conversion of petcoke oxy-cracking (T=180° C. and P=750 psi).

The effect of reaction time was demonstrated by varying the time from 15 min to 4 h under a constant pressure (750 psi), mixing speed (1000 rpm) and operating temperature (180° C.). The effect of reaction time on the conversion and selectivity of the oxy-cracking reaction is shown in FIG. 7. It is evident that the conversion of petcoke to oxy-cracked hydrocarbons (B) and $CO_2$ significantly increases with time. However, beyond an optimum, the selectivity for product B is slightly decreased with further increases in time, and simultaneously the selectivity to product C slightly increased with time. Reaction time is accordingly an optimizable parameter in the context of overall conversion and selectivity for B, in the exemplified embodiment being optimized at a residence time of about 2 h. Moreover, reaction time has an effect on the acidity of products formed. By increasing the reaction time, the pH of the liquid phase decreased, thus more acidic compounds were produced.

Effect of KOH

Figure 8:
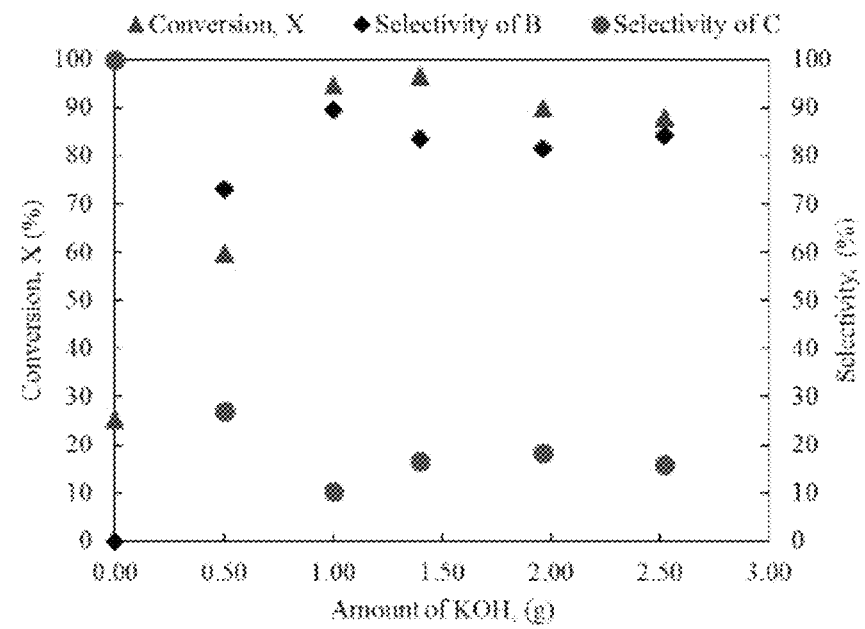
FIG. 8 is a plot illustrating the effect of KOH amounts on the selectivity and conversion of petcoke oxy-cracking reaction (T=230° C. and P=750 psi, time=2 h).

Alternative embodiments of the oxy-cracking reaction were exemplified by changing the dosage of KOH from 0 to 2.5 g at constant temperature (230° C.), oxygen pressure (750 psi), reaction time (2 h) and mixing speed (1000 rpm). FIG. 8 shows the effect of KOH on the reaction conversion and selectivity to both B and C. As illustrated, the conversion as well as the selectivity to B, significantly increased by increasing the amount of KOH and then slightly decreased by further increase of KOH dosage. However, the selectivity to C decreased by increasing the KOH amount. Thus, the optimal amount of KOH was found to be (1 g KOH/1 g petcoke) where the highest values of the reaction conversion and selectivity to B were achieved and the lowest amount of $CO_2$ was produced. KOH also ameliorated corrosion caused by high acidity species generated during the early oxidation stages of the process. These results illustrate that KOH is an optimizable parameter for enhancing the solubilization of oxy-cracked materials, increasing the conversion rate, as well as the selectivity for the desired products.

Characterization of Products

FTIR Analysis for Petcoke and Oxy-Cracking Products

Figure 9:
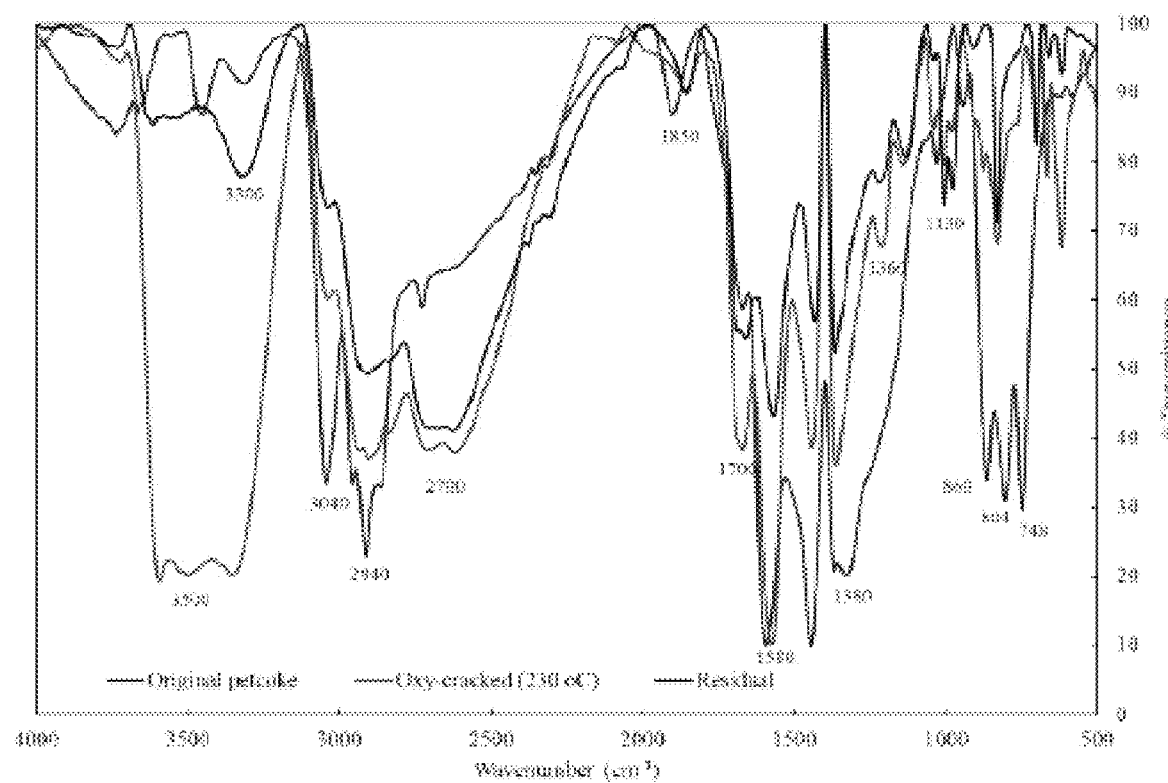
FIG. 9 is an FTIR spectra of the original petcoke, oxy-cracked products and residual petcoke at 230° C. and 2 h residence time.

The FTIR spectrum of the original petcoke was compared with the oxy-cracked product and the non-converted residue as well. FIG. 9 shows the infrared spectra of the original petcoke, residual petcoke (non-soluble solid) and oxy-cracked petcoke solubilized fraction isolated from the reaction carried out at 230° C. and 2 h (i.e., the exemplary optimized conditions). It is evident from the figure that FTIR spectra of original petcoke and the oxy-cracked one are distinctly different.

The spectrum of the original petcoke shows IR bands that can be assigned to the alkyls/aliphatic (2850-3000 $cm^{-1}$) and aromatic (~3040 $cm^{-1}$ and 930-750 $cm^{-1}$) regions. The presence of C—H bonds vibration out-of-plane in aromatics can be assigned to the 748, 804, and 860 $cm^{-1}$ bands. The corresponding C=C aromatic stretching vibration appears near 1580 $cm^{-1}$, slightly below the typical 1600 frequency, thus believed conjugated with other groups such as in the C=C region. However, for the oxy-cracked sample, the noticeable lower contribution from aromatic out plane bands is observed (930-750 $cm^{-1}$). The transmittance at 3040 $cm^{-1}$ due to aromatic C—H stretching vibrations can be found in the spectra for both the original and the oxy-cracked petcoke; however, much less important in the latter.

In the aliphatic region, the presence of alkyl groups in the petcoke sample such as —CH3, =CH2 and —$CH_2CH_3$ is evidenced by the bands around 2940 $cm^{-1}$ and 1380 $cm^{-1}$ which can be assigned to asymmetric and symmetric —C—H stretching and bending vibrations, respectively. The weak band at around 3500 $cm^{-1}$ observed for the original petcoke can be assigned to free O—H stretching vibration mode of hydroxyl functional groups. The broad-band spanning from about 2700 to 2000 $cm^{-1}$ possibly corresponds to hydrogen bonded —OH functionalities. The presence of sulfoxide species in the original petcoke is assigned at the small band ~1031 $cm^{-1}$.

The FTIR spectrum of the insoluble petcoke (solid residue after reaction) is also shown in FIG. 9. The structures of insolubilized solid material (residue) was found to be very similar to the original petcoke according to the IR spectra, with some features changed due to the contribution of oxygenated functions. It is clear from the spectrum that at 3300-3700 $cm^{-1}$ there is a higher contribution of OH groups in the remaining insolubilized solid compared with the original petcoke. Also, the C—O—C contributions (1363 $cm^{-1}$) in the remaining solids was found less intense compared to the original petcoke which showed a broad-band spanning from about 1360-1100 $cm^{-1}$. This later band can also be derived from the contribution of sulfones (centered in 1130 $cm^{-1}$), in addition to other S-oxidized forms (sulfoxide at 1030 $cm^{-1}$) with higher intensity compared with the original and oxy-cracked samples.

The FTIR spectrum of the oxy-cracked petcoke is dramatically different from that of raw petcoke (FIG. 9). It is worth noticing that a new significant band, appearing as an intense and broad peak in the range between 3300 and 3600 $cm^{-1}$ corresponds to —O—H stretching vibration mode of hydroxyl functional groups. This is evidence that the organic species of petcoke are oxy-cracked to oxygenated species bearing alcoholic, carboxylic and phenolic functional groups. Interestingly, the presence of carboxylate anion is observed as a doublet band centered at 1580 $cm^{-1}$, indicating the presence of carboxylic salts. Free acids presence is also evidenced by the C=O band appearing at 1700 $cm^{-1}$, thus some of the —OH observed in 3300-3600 $cm^{-1}$ can be assigned to these free acids. Another important feature is the disappearance of most aromatic moieties in the region of out-of-plane bands (930-750 $cm^{-1}$), together with the important reduction of the aromatic C—H stretching at 3030 $cm^{-1}$. Alkyl groups are visible in the range of 3000-2850 $cm^{-1}$, less contributing to the spectrum in comparison with the original sample and the unreacted solid. Moreover, the presence of esters (~1,850 $cm^{-1}$) and aldehyde functions (~2700 $cm^{-1}$) are also evident. Carboxyl, esters, aromatic esters and ketones C=O functionalities could appear between 1600 and 1800 $cm^{-1}$, thus all are feasible and not easily discriminated by the bands within this region of the spectrum. The C—O—C and/or sulfonic bands (1360-1100 cm$^{-1}$) in the oxy-cracked products are less intense compared to the original sample, as occurred with the insoluble solid. One of the most important features of the oxy-cracked sample is the broad band spanning from about 2300-2800 cm$^{-1}$; this is evidence of a contribution of —CO$_3$ (carbonates) to the sample which was isolated under basic conditions.

From the FTIR results, it is evident that the oxidized organic functional groups such as hydroxyl (—OH), carboxylic salts (O=C—O—), carboxylic acids (R—CO$_2$H) and minor amounts of aldehyde/esters are formed during the oxy-cracking reaction. The functionalities identified by IR spectra of oxy-cracked petcoke are in accordance with the compounds found using XPS and NMR techniques.

$^1$H NMR Analysis of the Oxy-Cracked Petcoke

Figure 10:
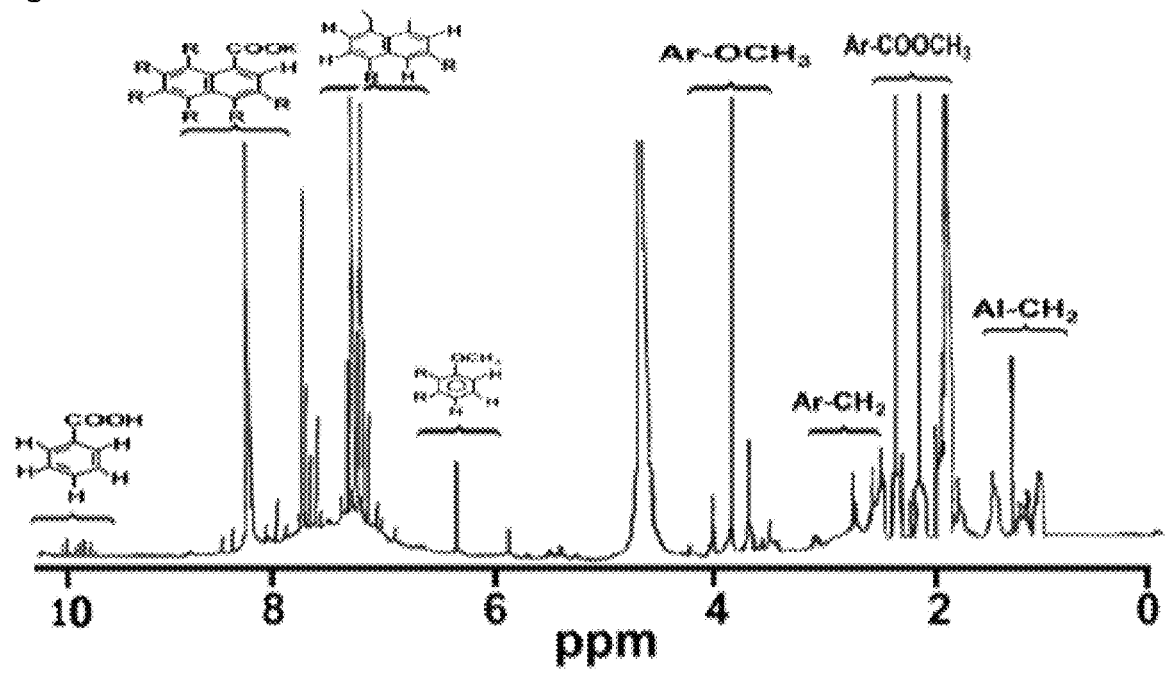
FIG. 10 is an $^1H$ NMR spectra for oxy-cracked petcoke ran with $D_2O$ solvent. Signal frequencies for typical chemical structures are shown.

Nuclear magnetic resonance (NMR) analysis of oxy-cracked product was performed on a Bruker CFI 600 MHz spectrometer by dissolving the sample in deuterated water. The $^1$H NMR spectrum of the oxy-cracked sample produced at 230° C. and 2 h reaction time is shown in FIG. 10. The NMR spectrum indicates that the oxy-cracked sample contains a significant quantity of aliphatic groups with chemical shifts in the range of 0-3 ppm. Methylene moieties (1.8 ppm) and methylenes bonded to the aromatic groups (2-2.7 ppm) can be present in the oxy-cracked sample as also confirmed by the FTIR results. However, terminal methyl groups (at about 0.8 ppm) are not detectable as important signals in the oxy-cracked petcoke. Moreover, the presence of the oxygenated functional groups such as alkoxy groups (probably methoxy, based on the sharp signals determined) are observed in the 3.7-4 ppm region. This is a strong indication, again in agreement with the FTIR and XPS results, that the oxy-cracked products are oxidized, producing typical oxygenated hydrocarbon compounds including ethers, acids and their salts. On the other hand, aromatic protons span chemical shifts in the range 6-9 ppm. These compounds could be diaromatic carboxylate salts molecules as assigned in the strong signal appearing around 8.5 ppm and methoxyphenol type molecules (6.5 ppm) as well. The presence of carboxyl groups from carboxylic acids is supported by the small signals appearing around 10 ppm. From these results, it is evident that carboxyl derivatives and oxygenated hydrocarbons produced during oxy-cracking are the most significant fractions solubilized in water. These findings match well with the ones derived from the FTIR spectroscopy and XPS.

XPS Results of Petcoke Oxy-Cracking

As shown in the FTIR analysis, the chemical functionalities of petcoke before and after the reaction were identified. By XPS analysis, the atomic composition of selected elements and group functionalities on the surface of original and oxy-cracked products was determined. Based on the FTIR and the elemental analysis, the deconvolution of C1s, O1s, N1s and S2p signals along their positions was carried out. Table 4 shows the atomic concentration (%) of the main components, types and quantities of functional groups in both samples (i.e., petcoke after and before reaction).

TABLE 4

| | Before Reaction | | | After Reaction | | |
|---|---|---|---|---|---|---|
| | Atomic Conc. (%) | Bond assignment | Bond Conc. (%) | Atomic Conc. (%) | Bond assignment | Bond Conc. (%) |
| C1s | 88.75 | C=C | 70.66 | | C=C | 16.18 |
| | | C—C/C—H | 16.05 | | C—C/C—H | 43.09 |

TABLE 4-continued

| | Before Reaction | | | After Reaction | | |
|---|---|---|---|---|---|---|
| | Atomic Conc. (%) | Bond assignment | Bond Conc. (%) | Atomic Conc. (%) | Bond assignment | Bond Conc. (%) |
| | | C—O | 8.91 | 28.60 | C—O, O—C=O | 40.5 |
| | | C=O | 2.48 | | | |
| O1s | 8.65 | C—O | 8.91 | 67.70 | C—O, O=C, OH, C=O, C—OH | 40.5 |
| | | C=O | 2.48 | | | |
| N1s | 1.05 | C—N=C | 1.02 | 2.90 | C—N=C | 0.05 |
| S2p | 1.55 | C—S—C | 0.90 | 0.80 | C—S—C | — |
| | | S—O | | | S—O | |

It is evident from the results that the original petcoke is mainly composed of carbon (88.75 at %), and a minor amount of heteroatoms such as oxygen (8.65 at %), nitrogen (1.05 at %) and sulfur (1.55 at %). However, the oxy-cracked sample showed a higher oxygen percentage (67.70 at %) and much lower carbon (28.60 at %) and sulfur percentage (0.80 at %) compared with the original petcoke sample.

Figure 11:
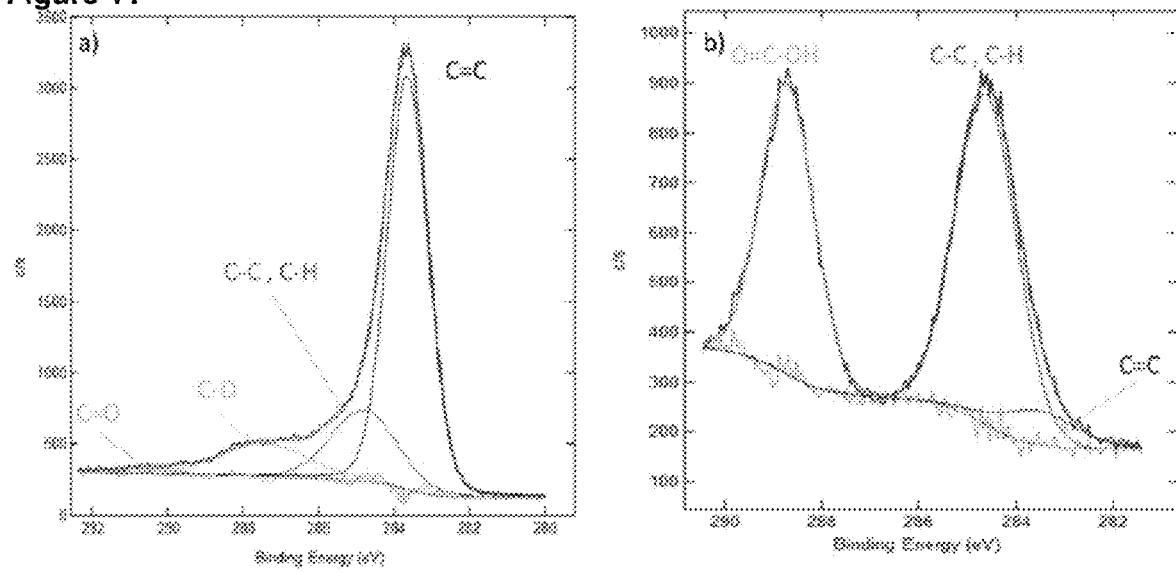
FIG. 11 include two high-resolution XPS spectra of the deconvoluted O1s peak (a) before reaction, (b) after reaction.
Figure 12:
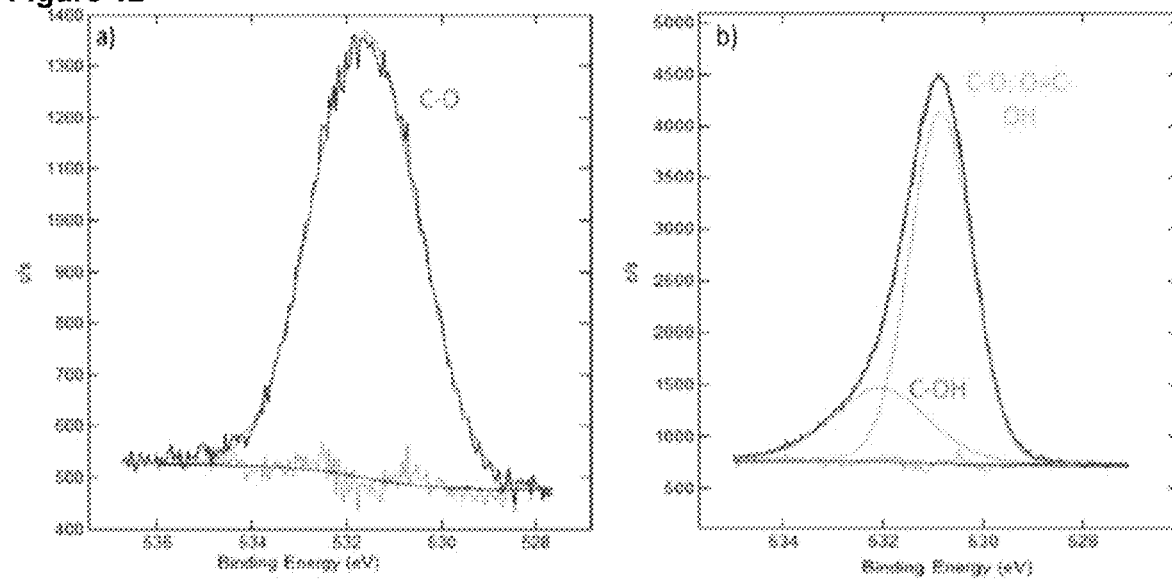
FIG. 12 includes two high-resolution XPS spectra of the deconvoluted O1s peak (a) before reaction, (b) after reaction.
Figure 13:
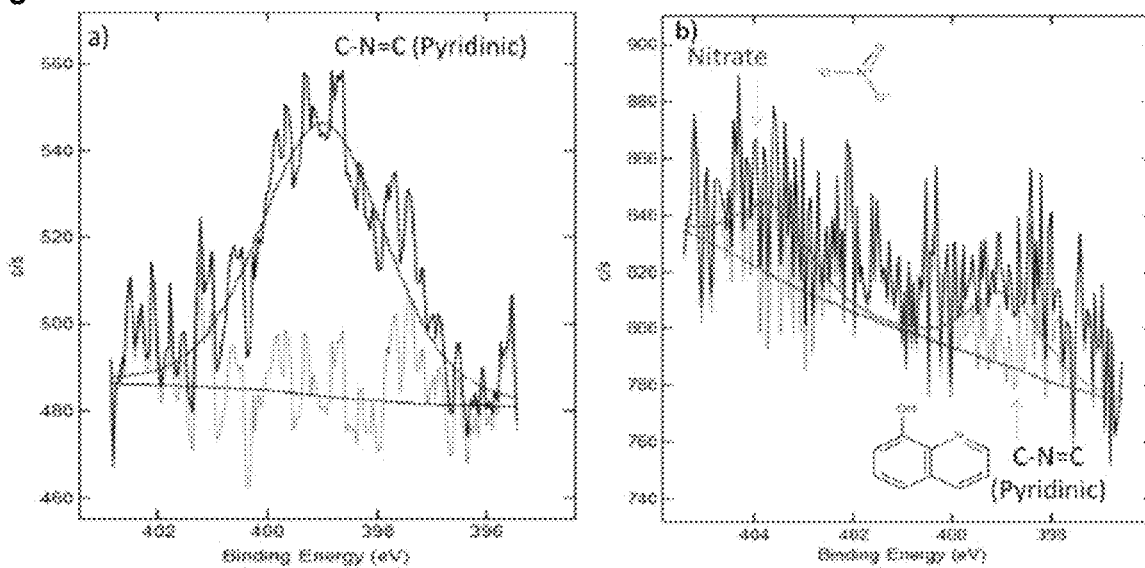
FIG. 13 includes two high-resolution XPS spectra of the deconvoluted N1s peak (a) before reaction, (b) after reaction.
Figure 14:
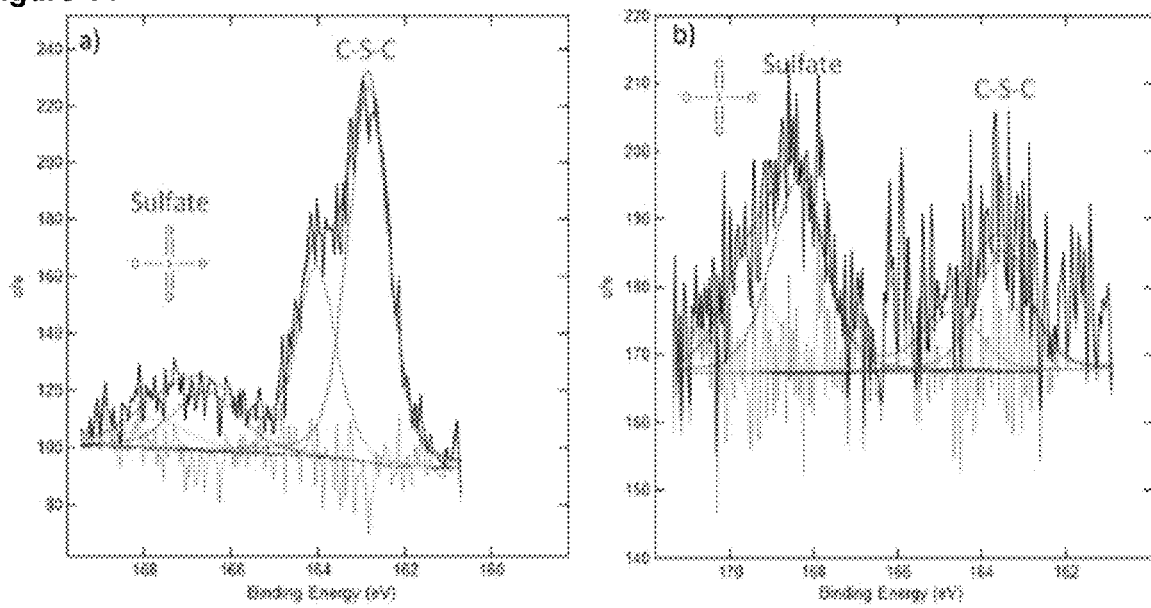
FIG. 14 includes two high-resolution XPS spectra of the deconvoluted S2p peak (a) before reaction, (b) after reaction.

FIGS. 11a and 11b show the deconvoluted C1s spectra of petcoke before and after oxy-cracking. The deconvolution of C1s signals was performed through centering the peaks for different functional groups at specific binding energy levels. It is evident that the distribution of carbon species in the original petcoke is dramatically different than the oxy-cracked sample. The C1s spectrum of original petcoke (FIG. 11a), contains mainly four bond types (C=C), (C—C), (C—O) and (C=O) set to 283.79 eV, 284.80 eV, 286.34 eV, and 289.21 eV, respectively. The abundance of the 283.79 eV band (C=C) evidences that the petcoke sample contained a high amount of aromatic compounds and lower amount of oxygenated functionalities, as revealed by the FTIR and NMR analyses as well. However, the C1s spectrum of oxy-cracked sample (FIG. 11b) shows the presence of similar signals as in the original petcoke with completely different intensities. Hence, the signal intensity attributed to the aromatic bonds (C=C) is much decreased, while the abundance of oxygenated functions (O—C=O) was found very important. FIG. 12 (oxygenates XPS) confirms the presence of carboxyl functions, as well as new C—OH, formed functionalities. The signal at 530.32 eV in both samples (i.e., original and oxy-cracked) attributed to the oxygen in C—O/O—C=O bonds which is higher by almost three times in oxy-cracked sample compared to the original petcoke. A distinctive signal at 532.77 eV in oxy-cracked sample (FIG. 12b) is observed and attributed to oxygen in alcoholic groups (C—OH). This can be explained by the high degree of oxidation in petcoke during the oxy-cracking reaction. These findings are in agreement with the results obtained from the FTIR and NMR analyses (FIGS. 9 and 10). The presence of heteroatoms such as nitrogen and sulfur are evidenced in FIGS. 13 and 14, respectively. FIGS. 13a and b show the N1s spectra for both samples. The spectra indicate the presence of pyridines (C—N=C) at 397.89 eV, which are naturally occurring. Similarly, the S2p doublet of petcoke was observed at 163.68 and 164.28 eV (FIG. 14), indicating the presence of sulfur-containing functional groups such as thiophenics, sulphonic species (166.7 eV) and low contribution of sulphates (168 eV). Lower contributions from thiophenics were evident in the oxy-cracked sample (FIG. 14b) which is indicated by the relatively lower intensity of the S2p doublet. However, the sulphate contribution was found to be higher and particularly sulphonic species (166.7 eV) were found much more important in the oxy-cracked sample. This is evidence that sulfur compounds exist in the oxy-cracked sample, however, with a relatively low contribution (25% reduction), as discussed below.

Sulfur and Metal Analysis

The content of sulfur and metals in petcokes depends on the nature of the crude and the particulars of the coking process, and these constituents may for example be found as a variety of organic and inorganic compounds. The sulfur compounds, for example, one of the most significant impurities in petcoke, may be attached to the carbon skeleton as thiophenes or to aromatic naphthenic molecules or between the aromatic sheets. Metals, mainly nickel and vanadium, may occur as metal chelates or porphyrines as in the asphaltenes. Other metals may not be chemically bonded, but intercalated in the petcoke structure, for example as mineral salts.

In this Example, the elemental analysis of petcoke was undertaken to illustrate the ability of the present process to demineralize the petcoke. Table 5 shows the elemental analysis for the original petcoke sample (1000 mg), water solubilized products (oxy-cracked sample) and the remaining solids (residue) after the reaction that was carried out at 230° C. for 2 h, but before acid precipitation of solids. For comparison, Table 9 shows the chemical composition of the virgin and oxy-cracked petcoke sample after acid treatment to precipitate solids.

metals than the oxy-cracked petcoke (solubilized). These findings illustrate that the oxy-cracking process may be adapted for petcoke demineralization and desulfurization.

Example 2: Nanocrystalline Copper Silicate for Catalytic Oxy-Cracking of Petroleum Coke In this Example, a nanocrystalline copper-silicate ($CaCuSi_4O_{10}$) material belonging to the Gillespite group of minerals was introduced to enhance the selectivity and conversion of the oxy-cracking reaction of petroleum coke. This exemplified embodiment is accordingly demonstrative of the efficacy of the Gillespite group of minerals, or combinations thereof, which in addition to cuprorivaite ($CaCuSi_4O_{10}$), includes wesselsite ($SrCuSi_4O_{10}$) and effenbergerite ($BaCuSi_4O_{10}$). The nanocrystalline material was characterized using BET, SEM, FTIR and XRD techniques. The catalytic activity of the nanocrystalline material was illustrated by cracking the residual feedstock (petcoke) in the liquid phase. The results showed that the catalyst enables the reaction to occur at a lower temperature with higher conversion as compared with the non-catalyzed reaction. An insignificant amount of $CO_2$ was formed in the gas and liquid phases at high temperature as confirmed by GC and TOC analyses, respectively. The triangular lump kinetics model was used to describe the reaction pathways. The oxy-cracked products were found to be humic acid analogs

TABLE 5

Elemental content in the virgin, oxy-cracked and residue petcoke at temperature 230° C., pressure 750 psi and time 2 h.

| Elements | Original (mg) | Residual (mg) | Residual (%) | Liquid (mg) | Liquid (%) | Gas (mg) | Gas (%) | Total mass proportion % |
|---|---|---|---|---|---|---|---|---|
| C | 844.750 | 40.710 | 4.82 | 747.350 | 88.47 | 22.00 | 2.60 | 95.89 |
| H | 38.100 | 2.280 | 5.98 | 33.850 | 88.85 | 0.00 | 0.00 | 94.82 |
| N | 15.500 | 2.850 | 18.39 | 6.650 | 42.90 | 5.00* | 32.26 | 93.54 |
| S | 44.600 | 11.740 | 26.32 | 27.450 | 61.55 | 0.00 | 0.00 | 87.87 |
| V | 0.785 | 0.114 | 14.52 | 0.576 | 73.38 | 0.00 | 0.00 | 87.89 |
| Ni | 0.255 | 0.097 | 38.04 | 0.203** | 79.61 | 0.00 | 0.00 | 117.64 |
| Fe | 0.568 | 1.088 | 191.55 | 0.018** | 3.17 | 0.00 | 0.00 | 194.72 |
| Mo | 0.012 | 0.011 | 91.67 | 0.004 | 33.33 | 0.00 | 0.00 | 125.00 |
| Co | 0.051 | 0.044 | 86.27 | 0.018 | 35.29 | 0.00 | 0.00 | 121.56 |
| Total | 944.621 | 58.934 | 6.249 | 816.119 | 86.39 | 27.00 | 2.86 | 95.49 |

* Some of $N_2$ gas (0.878 vol %) were detected in the gas phase by GC.
**The relatively high value is due to the leaching from the reactor wall and impeller.

These results were obtained under conditions that favoured high reaction conversion rates, with 95% of petcoke being oxy-cracked and solubilized in water. As seen in the Table 5, under these conditions more carbon, hydrogen and nitrogen can be found in the liquid phase compared with residual solid. Moreover, the primary heteroatoms and metals present in the original petcoke sample are sulfur and metals such as vanadium, nickel, iron, cobalt and molybdenum. The liquid phase does contain some amounts of sulfur and metals. However, more iron, nickel, cobalt and molybdenum content can be observed in the residual solid compared with the liquid phase (oxy-cracked products). Also, more iron, and nickel were found in the residual solid compared with original petcoke. Surprisingly, around 26% of sulfur remained in the residual solids, presumably as highly-fused sulfur aromatic rings and possible coprecipitated sulfates. It is evident from these findings that the nonsolublized solids (residue) contain a higher amount of with different contributions of functional groups such as carboxylic, carbonyl, and sulfonic acids as confirmed by FTIR analysis.

The Cu-silicate ($CaCuSi_4O_{10}$) catalyst of the present example was prepared using a co-precipitation synthetic route and thermal treatment. In alternative embodiments, a range of methods, such as co-precipitation-thermal or hydrothermal methods, may be used to obtain one or more nanocrystalline copper silicates of the Gillespite group of minerals for use as a catalyst in methods of the invention ((Cuprorivaite ($CaCuSi_4O_{10}$); Wesselsite ($SrCuSi_4O_{10}$) and Effenbergerite ($BaCuSi_4O_{10}$) or combinations thereof). The prepared catalyst was characterized before and after oxy-cracking reaction using XRD, SEM, BET, and FTIR. The activity of the catalyst was investigated through the oxy-cracking process which was carried out in a batch reactor under aqueous alkaline medium and mild operating conditions for maximum solubility and selectivity of petcoke.

For purposes of this Example, minimal emission of $CO_2$ was an objective for the proposed oxy-cracking process. The oxy-cracking conversion and selectivity were measured using the total organic carbon analysis (TOC) while the gas emissions were characterized using gas chromatography (GC). The catalytic oxy-cracking reaction mechanism was developed based on the radical mechanism. The oxy-cracked products were characterized using the FTIR. The present study illustrates that using the nanocrystalline copper-silicate materials, of the Gillespite group of minerals, for the petcoke oxy-cracking provides an efficient catalyst for converting petcoke into commodity chemicals like humic acid analogs.

Materials and Methods
Chemicals and Reagents

As an example of preparation of the copper-silicate Cuprorivaite ($CaCuSi_4O_{10}$) nanocrystalline material, the following chemicals and reagents were used: 70 wt % purity nitric acid ($HNO_3$, Sigma Aldrich, Ontario, Canada); copper (II) acetate ($Cu(OOCCH_3)_2 \cdot H_2O$, Sigma Aldrich, Ontario, Canada); sodium silicate (27 wt. % $SiO_2$, 10.8 wt. % $Na_2O$, Sigma Aldrich, Ontario, Canada), calcium hydroxide ($Ca(OH)_2$, Sigma Aldrich, Ontario, Canada); 99% purity sodium hydroxide (NaOH, VWR, Ontario, Canada); and sulfuric acid (95-98% purity, Sigma Aldrich, Ontario, Canada) was used for the catalyst regeneration. For the oxy-cracking reaction, green petcoke sample (as in Example 1) was ground and sieved to a particle size of 53 to 710 μm and used as the source of feedstock. Potassium hydroxide (KOH, ACS reagent, ≥85%, Sigma-Aldrich, Ontario, Canada) was used to adjust the pH of the reaction medium. Ultra-high purity oxygen (99.9%, Praxair, Calgary, Canada) was used as the oxidant gas. Potassium bromide (KBr, Sigma-Aldrich, Ontario, Canada) was used for the infrared analysis. Ultra-high purity nitrogen (99.9%, Praxair, Calgary, Canada) was used for the surface area measurements of the prepared material. The carrier gas for the GC was helium (99.9% ultra-high purity, Praxair, Calgary, Canada). Commercial humic acid (53680 humic acid, Sigma-Aldrich, Ontario, Canada) was used and characterized for comparison purposes, with oxy-cracked products. All chemicals and reagents were used as received without any further purification.

Synthesis of Nanocrystalline Copper-Silicate Material

The copper-silicate ($CaCuSi_4O_{10}$) material for the present example was synthesized using a simple co-precipitation method followed by a thermal treatment; however, other methods that produce nanocrystalline materials, such as hydrothermal methods, are suitable. An acidic solution was prepared by dissolving 12 ml of nitric acid into 600 ml deionized water with magnetic stirring (300 rpm) followed by the addition of 10.254 g copper(II) acetate. After complete dissolution of the copper in the acid solution, ~45.492 g of sodium silicate was carefully added to the solution with agitation for 5 min until a homogenized solution was achieved. Subsequently, a blue gel formed when the pH was increased to 8.0-8.5 by the addition of NaOH pellets under magnetic stirring (300 rpm). The blue gel was allowed to stand for 10 min in order to ensure that pH was stable in the range of 8.0-8.5. The solution was then filtered and washed using copious amounts of deionized water under vacuum at room temperature in order to remove excess salts. After thorough washing, the filtered product was allowed to stand at room temperature by passing air through it for ~15 min under vacuum suction. Approximately 3.762 g of calcium hydroxide was added to the wet cake and mixed gently until a homogeneous and pale blue smooth paste was obtained.

The pale blue paste was dried in an oven overnight at 200° C. The dried product was ground using a mortar and pestle, and calcined at 850° C. for 3 h in a muffle furnace with a heating ramp of 10° C./min. The furnace was then cooled down to room temperature, and the powdered Cu-silicate with nanocrystalline domain sizes was obtained.

Catalyst Characterizations

The crystalline phases of the prepared and spent catalysts were characterized using X-ray diffraction (XRD) Ultima III Multi-Purpose Diffraction System (Rigaku Corp., The Woodlands, Tex.) with Cu Kα radiation operating at 40 kV and 44 mA. The scan range was 3-90° 2θ using a 0.05° degree and a counting time of 0.2 degree/min. The crystalline domain sizes of the prepared materials were determined using the Scherrer equation as implemented in the PDXL software. The textural properties and surface areas of the prepared catalyst were measured using the Brunauer-Emmett-Teller (BET) method. This was accomplished by performing nitrogen physisorption at −196° C. using TriStar II 3020, Micromeritics Corporate, Norcross, Ga. The test sample was previously outgassed at 150° C. under $N_2$ flow overnight before analysis to remove the moisture. Scanning electron microscopy (SEM) was used to visualize the surface morphology of the prepared materials. A field emission Quanta 250 SEM manufactured by FEI was used, with an accelerating voltage of 20 kV and a spot size of 3.0 to view the morphology of the samples. The tested sample was prepared by taping a very small quantity of the powder over a carbon tape holder and releasing the excess and loose particles. Finally, the molecular bonds in the prepared catalyst were identified using a Shimadzu IRAffinity-1S FTIR (Mandel, USA).

Catalytic Oxy-Cracking of Petcoke Sample

Petcoke oxy-cracking examples were carried out in a 100 ml stainless steel vessel (model number 4598, Parr Instrumental Company, Moline, Ill., USA). The vessel was equipped with a heating oven connected to a temperature control loop, a pressure gauge and a mechanical stirrer with a speed controller. In a typical experiment, 1.0 g of solid petcoke sample and a predetermined amount of catalyst (0.10 g $CaCuSi_4O_{10}$) were charged into the reactor vessel containing 20.0 g of deionized water and 1.0 g of KOH before heating up the reaction vessel to the required temperature. KOH is required in an amount that is adequate to increase the pH of the solution, and thus enhance the solubility of petcoke (and may also serve to avoid potential corrosion problems). Prior to heating, the reaction vessel was leak tested by sealing and pressurizing the vessel with $O_2$. The reaction solution was then heated to the desired temperature, with the stirring speed set at 1000 rpm. A high mixing speed was used here in order to minimize the interfacial mass transfer resistance between the gas and liquid phase and to ensure uniform temperature and concentration profiles in the liquid phase. Once the set temperature was reached, reaction time zero is defined. The reaction experiments were carried out at different times (15, 30, 60, 90 and 120 min), temperatures (150-250° C.) and at a constant pressure (750 psi).

Characterization of Oxy-Cracking Products and the Spent Catalyst

At the end of the reaction, the reactor was cooled down and connected to the GC (SRI 8610C, Torrance, Calif.) to analyze the released gases. The GC is provided with a thermal conductivity detector (TCD) and two packed columns connected in parallel (3' molecular sieve/6' Hayesep-D columns). Afterwards, the liquid phase was carefully withdrawn and filtered for total organic carbon (TOC) analysis using a Shimadzu Total Organic Carbon Analyzer (TOC-L CPH/CPN). All the measurements in TOC and GC were taken respectively three and five times, and the average was used for the calculations with a 5% relative standard deviation.

The oxy-cracked products were recovered by drying in a vacuum oven overnight at 65° C. and characterized using FTIR. A Shimadzu IRAffinity-1S FTIR (Mandel, USA), provided with a smart diffuse reflectance attachment to carry out diffuse reflectance infrared Fourier transform spectroscopy (DRIFTS) analysis, was used. Initially, the background was defined by analyzing ~500 mg of potassium bromide (KBr), then 5 mg of the sample dispersed into the 500 mg of KBr and analyzed together. The IR spectra were obtained in the wavenumber ranging from 400 to 4000 $cm^{-1}$, then the spectra were acquired as averages of 50 scans with a resolution of 4 $cm^{-1}$. A small amount of presumably unreacted solid residue and the used catalyst were collected at the bottom of the reactor vessel. The residual materials (e.g., spent catalyst, minerals and insolubilized petcoke) were recovered and dried using vacuum oven at 65° C. for XRD analysis. Additionally, the metal analysis was performed for the liquid phase to detect any leaching from the catalyst. The leached metal concentrations in the samples (Cu) was analyzed at ALS Environmental Laboratories (Alberta, Canada) using Inductively Coupled Plasma Mass Spectroscopy (Dissolved Metals in Water method by CRC ICPMS). The carbon, hydrogen, and nitrogen contents after the oxy-cracking reaction were analysed using a PerkinElmer 2400 CHN analyzer (Waltham, Mass., USA). The oxy-cracking reaction conversion and selectivity were determined from the carbon mass using Equations (1) to (5) from Example 1.

Stability Tests

The stability of the copper-silicate catalyst in the heterogeneous oxy-cracking reaction is exemplified as follows. A small amount of the residual material which contains the spent catalyst and the insolubilized petcoke was collected at the bottom of the reactor vessel. The residual materials were recovered by filtering the solution after the catalytic tests and drying at 65° C. overnight in a vacuum oven to remove the residual water. The dried sample was then washed with a diluted sulfuric acid (<3%) solution to remove unwanted metals such as K, Ni, and Fe that remained in residual materials after reaction, and filtered again. The filtrate sample was calcined at 600° C. for 6 h in order to remove any organic species that may have been adsorbed on the material. The spent catalyst was then reused for several cycles of oxy-cracking reaction after further analysis by XRD.

Results and Discussion

Characterization Study of the Prepared Catalyst

Figure 15:
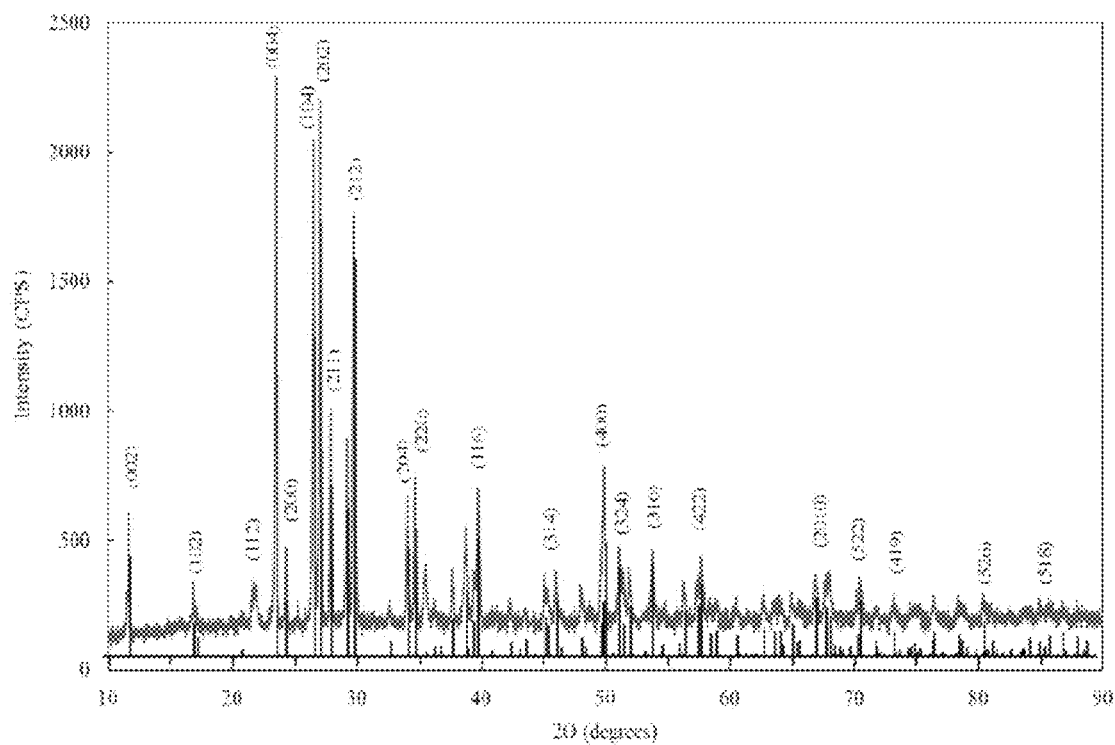
FIG. 15 is a plot of XRD powder patterns of copper-silicate cuprorivaite (blue line), the vertical lines (black) are the reference data for the cuprorivaite from COD database.

The structure of the prepared copper-silicate material was defined by a variety of techniques. XRD was employed to identify the framework structure. As shown in FIG. 15, the good intensity of the signals in the XRD patterns implies a well crystallized material. The XRD pattern of this material was matched perfectly with the pdf card 01-085-0158 (cuproriaite) of the Crystallographic Open Database (COD database) included within the PDXL software (Integrated X-ray powder diffraction software). Additionally, the broad signals clearly indicate the formation of a nanocrystalline copper silicate.

Figure 16:
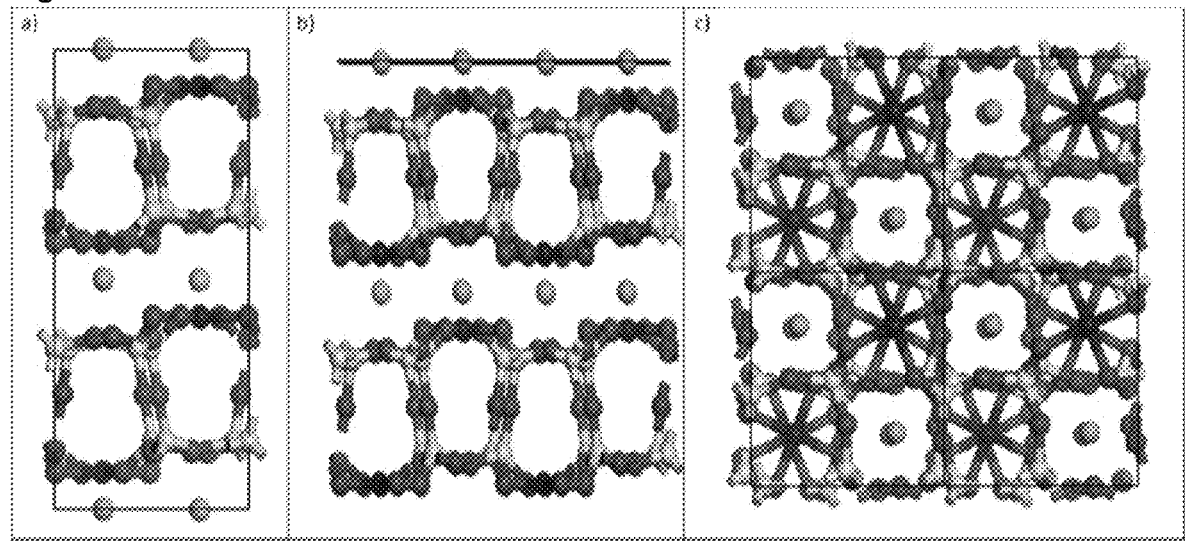
FIG. 16 is a schematic illustration of the unit cell of the copper silicate cuprorivaite framework drawn with BIOVIA structure module, a) Unit cell of $CaCuSi_4O_{10}$ b) Side view of the surface (001) of $CaCuSi_4O_{10}$ and c) Top view of the surface (001) of $CaCuSi_4O_{10}$. Blue spheres represent copper atoms, yellow spheres are silicon atoms, red spheres are oxygen atoms and green spheres are calcium atoms.

As displayed in FIG. 16, the $CuCaSi_4O_{10}$ has a tetragonal crystal structure ($\alpha=\beta=\gamma=90°$) with space group P4/ncc where its lattice constants are: $a=b=7.3017$ A°, $c=15.1303$ A° accordingly with a unit cell volume equal to 806.7 $A^{o3}$. The metal and ligand oxygen atoms lie in the (001) crystal plane (the XY plane) along with the [00I] Z molecular direction. The Si-centered tetrahedra are parallel to (001) and linked to form two $SiO_{20}$ sheets within the height of one cell and each tetrahedron has one unshared corner. The presence of Cu atom sites has a centrosymmetric, planar ligand environment of ($D_{4h}$) symmetry, which is formed by four oxygens from the unshared corners; such coordination is super-stable and characteristic of divalent Cu. On the other hand, the Ca atoms are found to be situated in 8-fold coordination midway between sheets. Moreover, the crystalline domain sizes of the prepared material were estimated from the most intense peaks using Scherrer's equation which is implemented in the PDXL software where the average domain size was ~93 nm. The positions and relative intensities of the diffraction peaks of the synthesized pure-phase sample are in good agreement with previously reported studies on copper silicate, also known as Egyptian blue.

Figure 17:
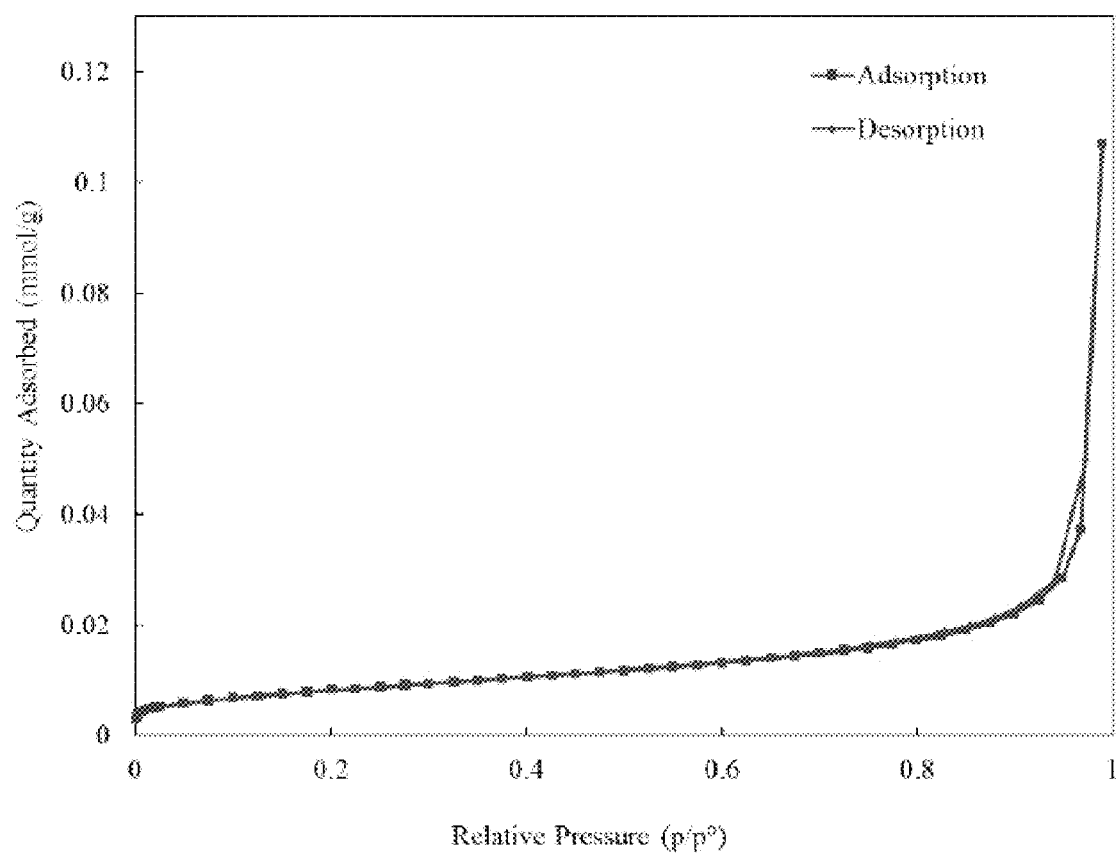
FIG. 17 is a plot illustrating nitrogen physisorption isotherms for copper-silicate.

The textural properties of the prepared catalyst were illustrated by $N_2$ physisorption at -196° C. using the BET analysis. FIG. 17 shows the nitrogen physisorption isotherms of the $CaCuSi_4O_{10}$ which can be classified as Type II curves based on the IUPAC classification. The curve indicates the absence of any microporosity in the prepared materials as the isotherm starts from zero without any sudden jump in the Y-axis at p/p°~0. Additionally, the estimated specific surface area was 0.63 $m^2/g$ by applying the BET method in the range of relative pressures (p/p°) between 0.03 and 0.3 and assuming a value of 0.162 $nm^2$ for the cross-section of adsorbed nitrogen molecules at -196° C.

Figure 18:
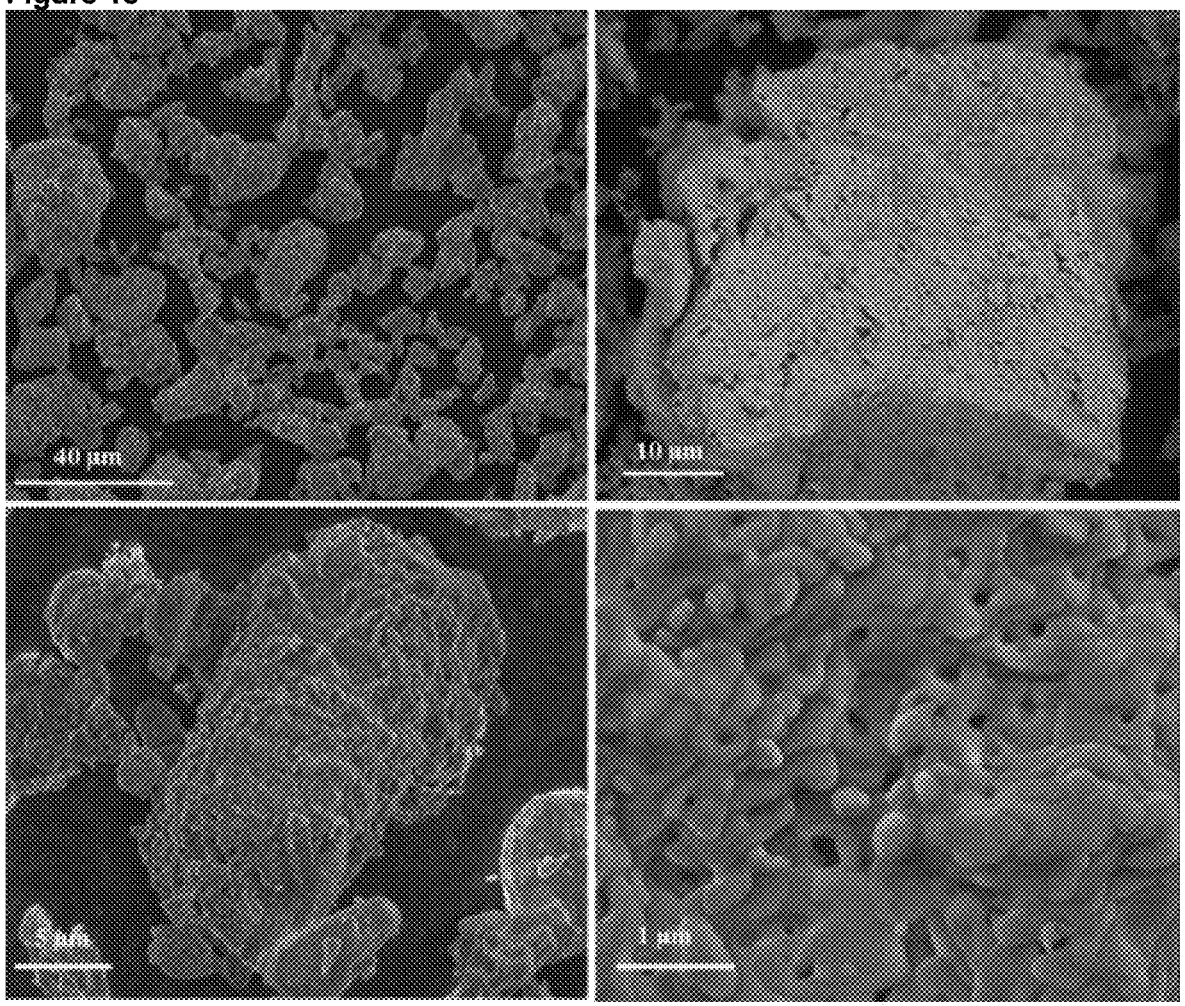
FIG. 18 includes 4 SEM images of copper-silicate material at different magnifications.

SEM was used to analyze the surface morphology of the catalyst. FIG. 18 shows SEM images for the surface of copper-silicates at different magnifications. This analysis indicated that the prepared copper-silicate material has characteristic steps, ridges, and terraces on the surface of the prepared nanocrystalline material. The powders were made up of coarse crystals of cuprorivaite with different shapes and sizes and the size of these particles are in the scale of a few microns (10 and 30 μm). The SEM images revealed that the synthesized $CaCuSi_4O_{10}$ has a nonporous structure with large grains of fused micronic-crystals.

Figure 19:
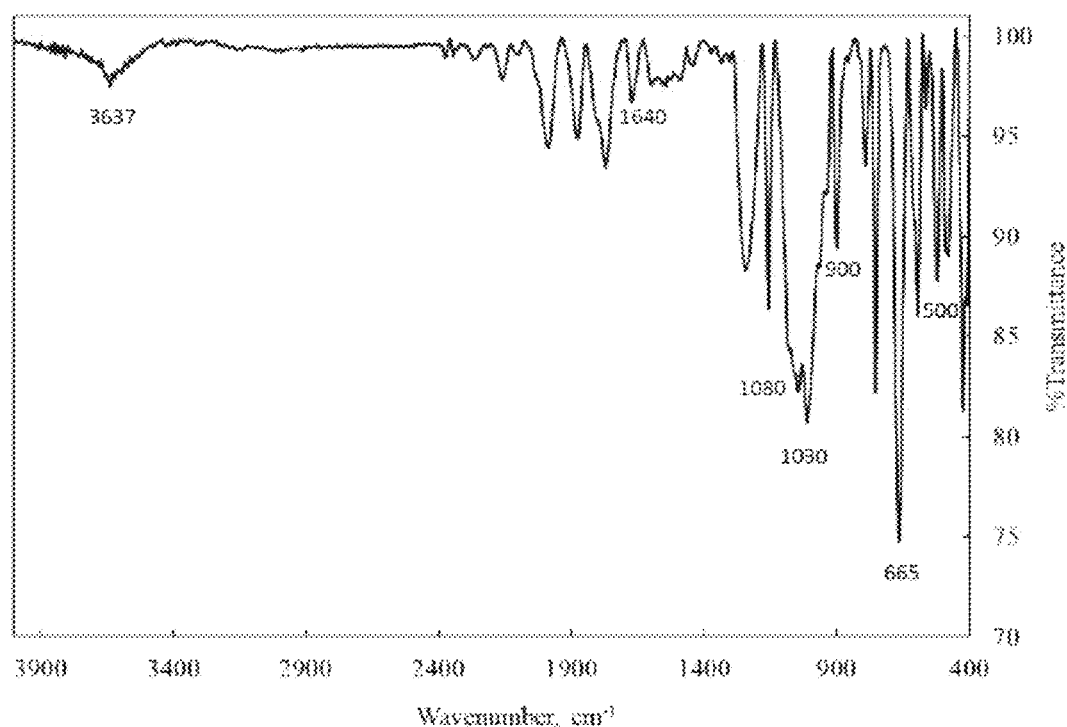
FIG. 19 is a plot illustrating Infrared spectroscopy of the prepared copper-silicate material.

FIG. 19 shows the infrared spectrum of the prepared copper-silicate material. The IR-spectrum displays characteristic bands lying mainly in the region between 1400 and 400 $cm^{-1}$ which are attributed to the asymmetric and symmetric stretching vibrations of Si—O—Si and Si—O—Cu, and the bending vibration of O—Si—O and O—Cu—O. Additionally, the silicate band 1085 $cm^{-1}$ was clearly shifted down which indicates the formation of Si—O—Cu bond and provides evidence for the incorporation of copper metal in the silicate framework structure. The presence of water molecules bound to the surface of copper-silicates is evident here by the —OH stretching bands at 3637 $cm^{-1}$ and —OH bending band at 1640 $cm^{-1}$. However, the small band centered at around 665 $cm^{-1}$ is related to the bending vibration of —OH that may be located in the tetrahedral position shared by four Cu atoms.

Catalytic Activity and Selectivity

Figure 20:
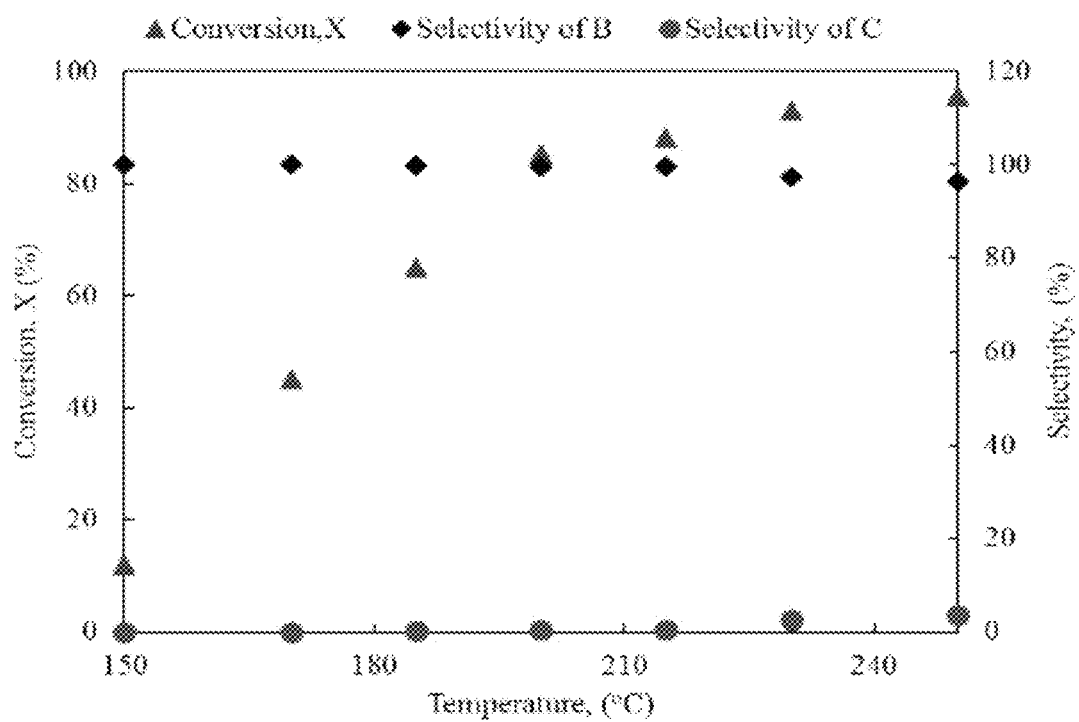
FIG. 20 is a plot illustrating the effect of the reaction temperature on the selectivity and conversion of petcoke oxy-cracking (P=750, t=1 h, 1000 rpm and 0.10 g of catalyst).

The catalytic activity and selectivity for oxy-cracking of petcoke over $CaCuSi_4O_{10}$ catalyst is illustrated in a batch reaction. Based on wet air oxidation studies, the reaction rate depends on many factors such as temperature, catalyst loading and solution pH. The results in terms of petcoke oxy-cracking conversion and selectivity to produce both of intermediates (desired products, B) and $CO_2$ (C) are presented in FIGS. 20 and 21. The batch reactions were carried out by varying the temperature from 150 to 250° C. while keeping the rest of the reaction conditions constant (oxygen partial pressure 750 psi, stirring speed 1000 rpm, residence time 1 h, and 0.10 g of catalyst). As seen in FIG. 20, the rate of the oxy-cracking reaction conversion is significantly increased upon raising the reaction temperature. Thus, at 250° C., ~97% petcoke conversion was reached after 1 h over the $CaCuSi_4O_{10}$ catalyst. The reaction conversion was more than 45% even at low temperatures of 175° C., which is promising when compared to the non-catalytic oxy-cracking of petcoke as no reaction has been observed to occur at that temperature. Although a high reaction temperature (250° C.) may not be optimal in the oxy-cracking process without a catalyst, as illustrated in Example 1, in the presence of the Cu-silicate catalyst no unfavourable amount of $CO_2$ was observed. Surprisingly, the selectivity to produce the desired products (B) was 99% even at the low reaction temperature of 150° C. and reaction time of 15 min.

Figure 21:
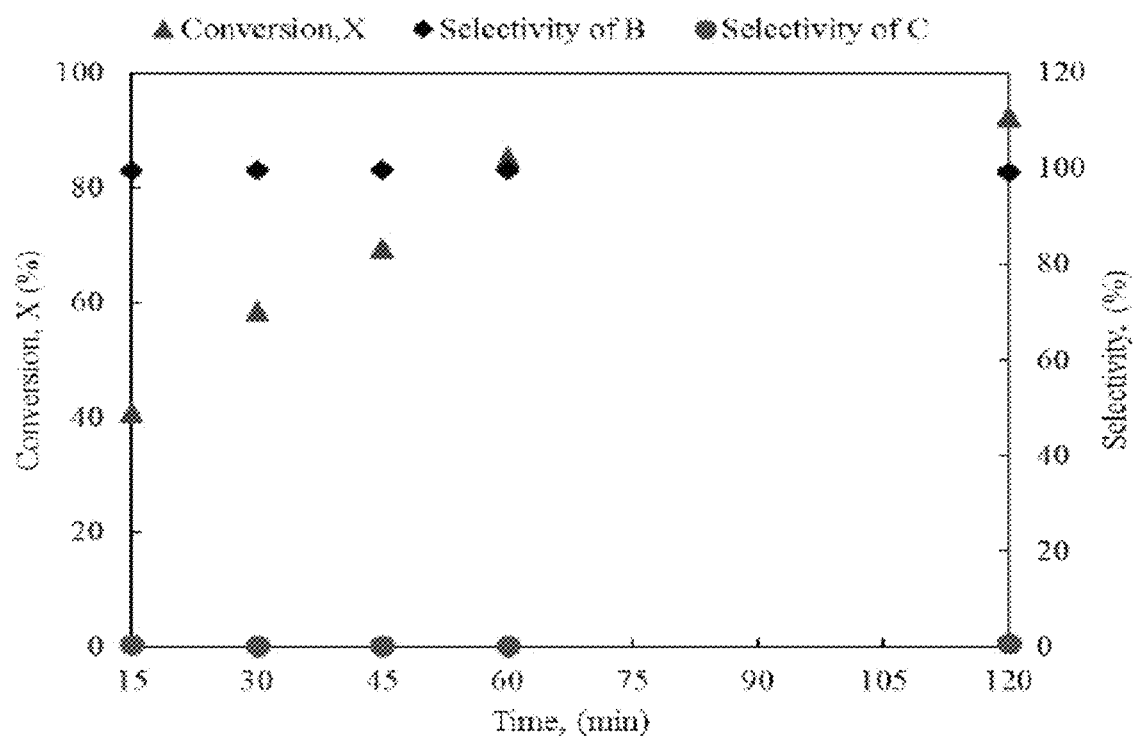
FIG. 21 is a plot illustrating Reaction time effect on selectivity and conversion of petcoke oxy-cracking reaction (T=200° C. and P=750 psi, 1000 rpm and 0.10 g of catalyst).

The effect of reaction times on catalytic activity and selectivity was illustrated by varying the time from 15 to 120 min keeping the temperature at 200° C. as shown in FIG. 21. The rate of reaction conversion is significantly increased with time. Full reaction conversion was obtained after 2 h at 185° C., whereas only 1 h was required at 200° C. and 0.5 h at 250° C. Surprisingly, the selectivity for product B is almost constant and reaches 99% with time. Even at the longest reaction time of 120 min, the amount of $CO_2$ produced was not detectable by GC. Produced $CO_2$ may be present in the aqueous basic solution (pH>8) in the form of carbonates and bicarbonates. This Example illustrates that the Cu-silicate catalyst, used under the exemplified conditions, possesses superior activity and selectivity compared with other catalysts that might be considered for wet oxidation reactions such as $MnO_2/CeO_2$, Ru, Pt and $Ru/TiO_2$, Mn—Ce-oxide and Perovskite catalysts $LaBO_3$ (B=Cu, Fe, Mn, Co, Ni).

Figure 22:
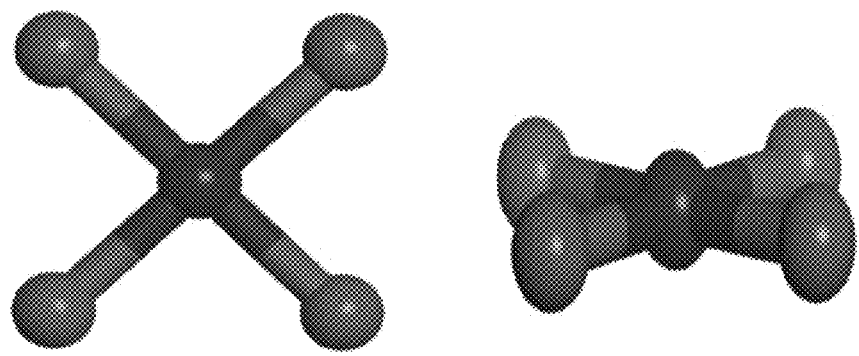
FIG. 22 is a schematic illustration of the square planar configuration of the copper atoms in the structure of $CaCuSi_4O_{10}$, the blue spheres are copper atoms and red ones are oxygen atoms.

The activity of Cu-silicates in the oxy-cracking reaction is indicative of activity provided by catalysts having analogous $Cu^{+2}$ characteristic, for example in silicate frameworks. As shown in FIG. 22, the Cu atom in the silicate catalyst has four coordinated atoms of oxygen as for Si. Thus, the square planar configuration allows d-orbitals to take part in the reaction. Hence, anchoring $Cu^{+2}$ in the silicate framework the present synthetic method leads to a material with nanocrystalline domain size, and thereby increases the number of active sites which have a benefit in activating the petcoke. Surprisingly, the activity of oxy-cracking reaction over $CaCuSi_4O_{10}$ was shown to be higher than the activity of alternative high surface area catalysts for wet air oxidation. This indicates that beyond surface area, the types of active site on the surface of present catalyst contribute to the catalytic activity in oxy-cracking. In some embodiments, involvement of a calcium ion in the cuproravite structure may act as a basic aid to assist the active site of the catalyst surface, for example by attracting reactant molecules, thus enhancing the performance of catalyst.

The influence of pH on the conversion and selectivity of oxy-cracking reaction is illustrated in Example 1, which evidenced embodiments in which an elevated pH is advantageous for high reaction rates. An aspect of such embodiments may be that, under alkaline conditions (pH>8), hydroxyl radical formation is increased, and more produced $CO_2$ will be dissolved in solution. In embodiments of Example 1, 1.0 g of KOH per 1.0 g of petcoke was shown to be an optimum value for select embodiments. Collectively, the present Examples illustrate embodiments in which pH can have a significant effect not only on the catalytic activity but also on the stability and leaching of the active phase from the catalyst.

Reaction Kinetics and Mechanism

The catalytic performance of the Cu-silicate material on the petcoke oxy-cracking was illustrated in the presence of oxygen as an oxidant. The kinetic experimental data was collected at temperatures of 185° C., 200° C., and 230° C. and reaction times varying from 0 to 2 h. It was shown in Example 1 that under relatively severe reaction conditions (i.e., temperatures >250° C. and residence times >2 h), the complete oxidation reaction may be favoured over partial oxy-cracking, so that the production of $CO_2$ may be significant. Additionally, in Example 1, the reaction conversions were found to be low at temperatures less than 185° C. In a typical oxy-cracking reaction, the solubility of oxygen in the aqueous solution is increased with pressure, which favors oxy-cracking. However, oxygen partial pressure beyond 750 psi did not significantly affect the reaction; and hence was kept constant at that value for a range of exemplary embodiments. In select embodiments, stirring was shown to be important, for example to favor the interaction between oxygen and petcoke. In the present Example, no mass transfer limitation was observed when the impeller speed operated above 500 rpm. Therefore, the impeller speed was fixed to 1000 rpm during all the reaction runs. The mass ratio of petcoke to KOH was fixed to 1:1, this is where the highest conversion and selectivity were obtained in embodiments of Example 1.

Figure 23:
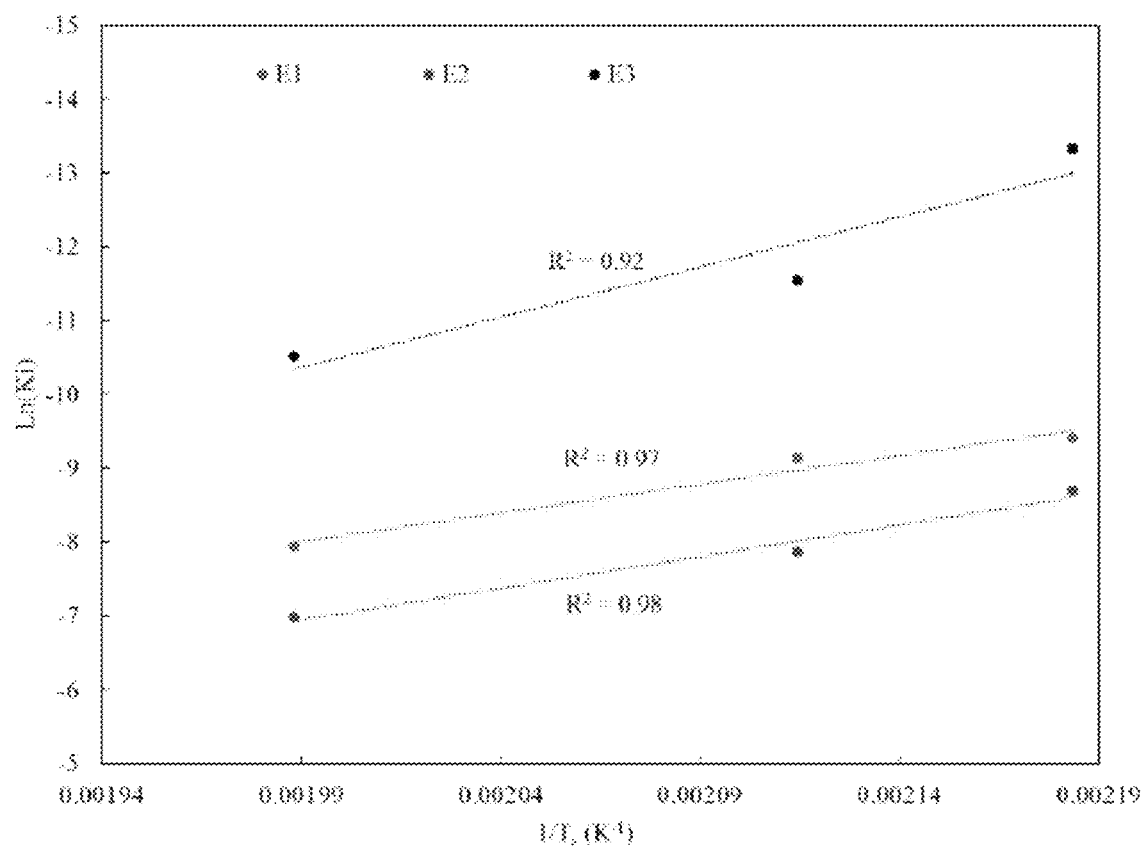
FIG. 23 is a graph showing Arrhenius plots of catalyzed petcoke oxy-cracking for each reaction pathway.

The triangular reaction pathway, as depicted in FIG. 1, and as described in Example 1, may similarly be used to describe the mechanism of a catalyzed reaction. For the catalyzed reaction, FIG. 23 represents the Arrhenius plot of a catalyzed petcoke oxy-cracking reaction at the three reaction temperatures. The three curves are approximately linear with the correlation coefficient values close to 1. Table 6 sets out determined values of catalyzed oxy-cracking reaction constants, and Table 7 set out estimated activation energies and frequency factors of catalyzed petcoke oxy-cracking.

Figure 24:
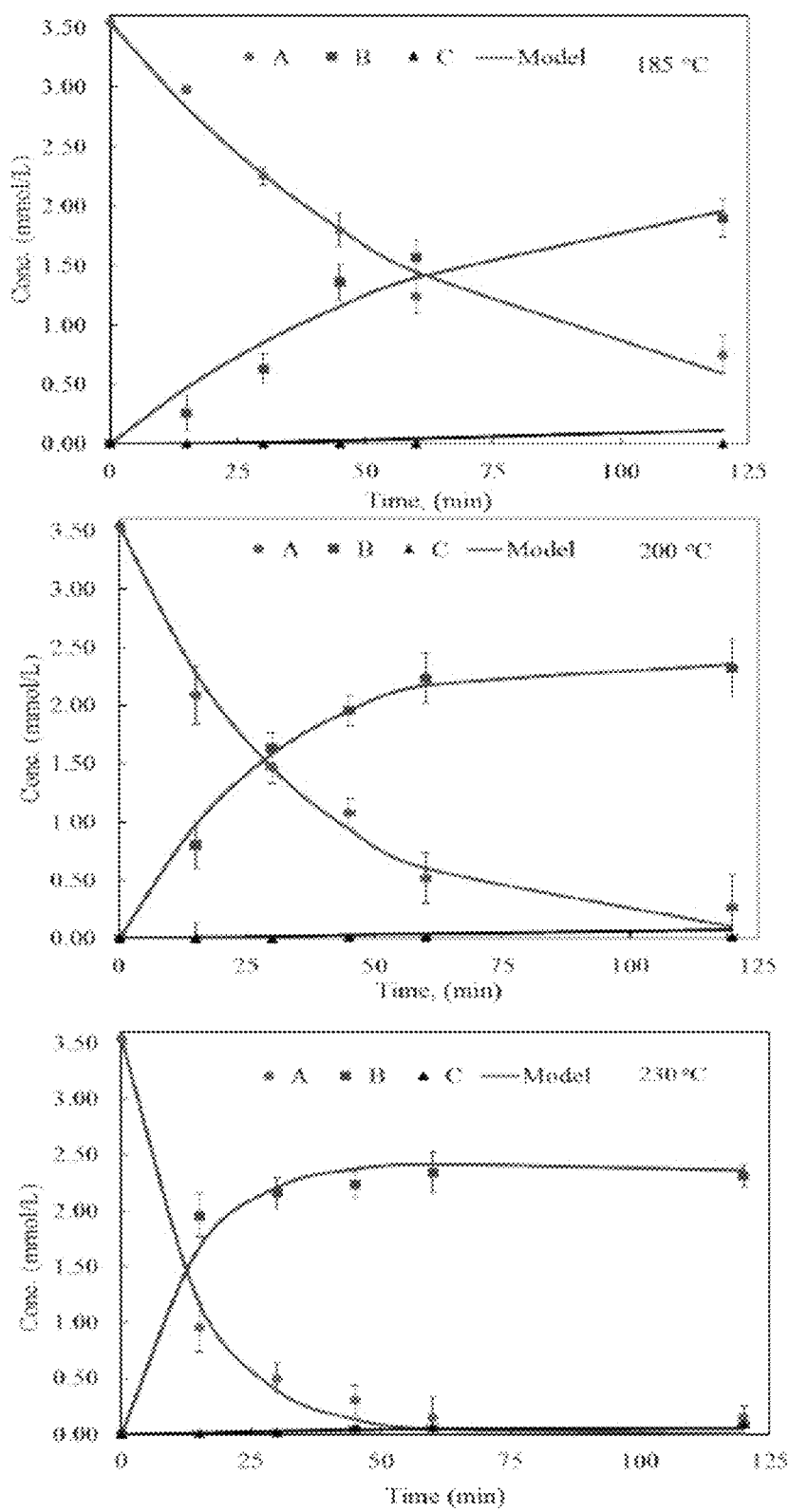
FIG. 24 includes three graphs, illustrating concentration profiles of A, B, and C as a function of reaction time at different reaction temperatures 185, 200, and 230° C. under the presence of the Cu-silicate catalyst. The symbols represent experimental data, and the solid lines are the kinetics model.

Comparisons between kinetic results from Example 1, without a catalyst, and Example 2, with a catalyst, indicate that the reaction rate in the second pathway proceeds favorably towards the intermediates which are the desired products (oxy-cracked products). Using the catalyst, this rate is much faster than without a catalyst. This is also reflected in the low value of activation energy in the presence of a catalyst which is 25% less than that in the absence of a catalyst. Surprisingly, the reaction rate for forming $CO_2$ in either reaction pathways (1 or 3) with presence of catalyst is lower than that without it. As shown in FIG. 24, the concentration profiles of petcoke (A), oxy-cracked compounds (B), and $CO_2$ (C) at the three reaction temperatures as a function of time fit well with the exemplified kinetic model. The error bars in FIG. 24 represent the calculated standard deviation based on the TOC and GC measurements. Petcoke was not directly oxidized to $CO_2$ but partially oxidized to intermediates as phenolic and carboxylic substances produced through hydroxyl radical (*OH) attacks. Insignificant amounts of $CO_2$ were detected at the beginning of the reaction, presumably due to the deep oxidation of the short alkyl chains left over on the petcoke structures after the coking process. Thus, a low activation energy ($E_1$=15.40 kcal/mol) in the first reaction pathway is accounted for. The insignificant amount of $CO_2$ may be related to a short induction period, which may in some embodiments be required to reach a sufficiently high concentration of catalyst in the liquid phase in order to incorporate oxygen into the hydrocarbon molecules.

The oxidation of the hydrocarbons over copper-silicate catalyst demonstrates that a complex reaction takes place in the liquid phase, which can be attributed to the complexity of petcoke aggregates. In select embodiments, the dissociation of the carbon bonds adjacent to heteroatoms such as sulfur, oxygen and nitrogen may take place. This is supported by the low value of the activation energy in the second reaction pathway ($E_2$=17.00 kcal/mol) and high value of frequency factor ($2.36 \times 10^4$ s$^{-1}$). The low activation energy ($E_2$) value supports an understanding that polymerization reactions may in some embodiments be involved, and that the formation of (.OH) radicals over the catalyst may be a rate limiting step. In some embodiments, an insignificant amount of $CO_2$ as carbonates and bicarbonates (pH~8.5-9.8) may be formed in the third reaction pathway, for example due to the further reaction between the solubilized hydrocarbons and oxygen. However, this reaction pathway would generally require higher activation energy ($E_3$=28.10 kcal/mol) for producing the $CO_2$ compared to the first reaction pathway.

These findings suggest that the path of conversion of petcoke into $CO_2$ is favored at the beginning of the reaction, which is associated with a higher rate of reaction compared with the oxidation of solubilized organic compounds in water. Moreover, these results also show that, in some embodiments, even though the reaction rates are increased with temperature, the final TOC values of oxy-cracked compounds (B) for a temperature higher than 200° C. are practically constant after 1 h. The reason for this is putatively due to the ability of these formed short-chain organic species to resist the oxidation process. Another explanation for this observation is the relatively short life of free radicals in some embodiments (due to scavenging effects), for example where the presence of strong basic solution, e.g. KOH, destroys some of the free radicals which would otherwise directly attack organic compounds.

TABLE 6

Determined values of catalyzed oxy-cracking reaction constants.

| T (° C.) | $K_1$ (s$^{-1}$) | $K_2$ (s$^{-1}$) | $K_3$ (s$^{-1}$) |
|---|---|---|---|
| 185 | $8.21 \times 10^{-5}$ | $1.67 \times 10^{-4}$ | $1.63 \times 10^{-6}$ |
| 200 | $1.07 \times 10^{-4}$ | $3.85 \times 10^{-4}$ | $9.61 \times 10^{-6}$ |
| 230 | $3.56 \times 10^{-4}$ | $9.25 \times 10^{-4}$ | $2.69 \times 10^{-5}$ |

TABLE 7

Estimated activation energies and frequency factors of catalyzed petcoke oxy-cracking.

| Activation energy (kcal · mol$^{-1}$) | | Frequency factor (s$^{-1}$) |
|---|---|---|
| $E_1$ | 15.40 ± 0.235 | $1.65 \times 10^3$ |
| $E_2$ | 17.01 ± 0.632 | $2.36 \times 10^4$ |
| $E_3$ | 28.10 ± 0.781 | $4.56 \times 10^7$ |

Without being bound to a particular theory, the mechanism of oxy-cracking reaction over the produced Cu-silicate catalyst may be understood to follow a wet air oxidation mechanism, undergoing several mechanistic steps. In this context, it is relevant that solid petcoke particles generally float in water as chunks and masses due to hydrophobicity effects. KOH in the aqueous medium plays a role in dispersing the petcoke particles through a saponification-like reaction. After the petcoke particles are dispersed in the alkaline medium, and in the presence of oxygen, the oxy-cracking reaction takes place in several steps on the catalyst surface. Oxygen molecules may diffuse to the surface of the catalyst suspended in the liquid phase. The role of the catalyst is accordingly to activate the reactants, and thus transfer electrons to initiate free radicals. Subsequently, adsorbed oxygen may oxy-crack the petcoke at an active site and convert it to oxygenated hydrocarbons that are soluble in water, due to the polar functionalization of aromatic edges and paraffinic terminal carbons via oxygen incorporation. In select embodiments, copper in the prepared nanocrystalline $CaCuSi_4O_{10}$ may have a buffering capacity for the oxygen on its surface in which the alternation between oxidation states ($Cu^{+2}/Cu^{+1}$) and formation of oxygen vacancies can occur under select reaction conditions. These oxygen vacancies have the potential to transfer more oxygen through the lattice. Eventually, reaction termination takes place when the generated radicals are consumed by reacting with K ions from bicarbonate/carbonate (~110 ppm at 230° C.) that are formed during the reaction or by recombining themselves. In the result, at the end of the reaction, three phases are obtained. The gas phase remained as predominantly oxygen, with an insignificant amount of $CO_2$, while the liquid phase contained oxygenated hydrocarbons, such as humic analogs. Finally, the residue (solid phase) consisted of minerals, spent catalyst and some unreacted residue.

Leaching and Stability Tests of Copper Silicate

Metal analysis for copper before and after the reaction is presented in Table 8. The data is reported in terms of the percentage and concentration of copper leached with respect to the initial amount present in the catalyst ($CaCuSi_4O_{10}$) at various reaction temperatures.

TABLE 8

Estimated leached active metal (Cu) from the catalyst at different oxy-cracking reaction temperatures. Experimental conditions: catalyst dose, 0.10 g; reaction time, 1 h.

| Active metals | Metal (%) in the catalyst | Leaching at reaction temperature (° C.) | | | | | |
|---|---|---|---|---|---|---|---|
| | | 170 | | 200 | | 230 | |
| | | wt % | ppm | wt % | ppm | wt % | ppm |
| Cu | 16.90 | 1.75 | 15.30 | 2.45 | 21.50 | 2.98 | 26.14 |

The percentage of active metal (Cu) leached to the aqueous solution increased with reaction temperature. The leaching of copper from the catalyst was detected in the range 2 to 3 wt % of the original total amount of Cu, during the oxy-cracking reaction. This illustrates the stability of the $CaCuSi_4O_{10}$ catalyst in the aqueous leaching solution, in that the maximum leaching percentage was less than 3% (26 ppm) from the original Cu amount at elevated temperatures. In an exemplary embodiment, an excess of KOH (i.e., pH>10) was added to the aqueous solution at the beginning of the reaction. In this embodiment, even at the end of the reaction, the pH was still >8.5, with the reduction being due to the formation of acidic functional groups that consume a portion of the original KOH. In select embodiments, the effect of KOH is not only to enhance the solubility of oxy-cracked materials, but also to maintain the basic pH of the solution, thus, preventing the leaching of copper.

Figure 25:
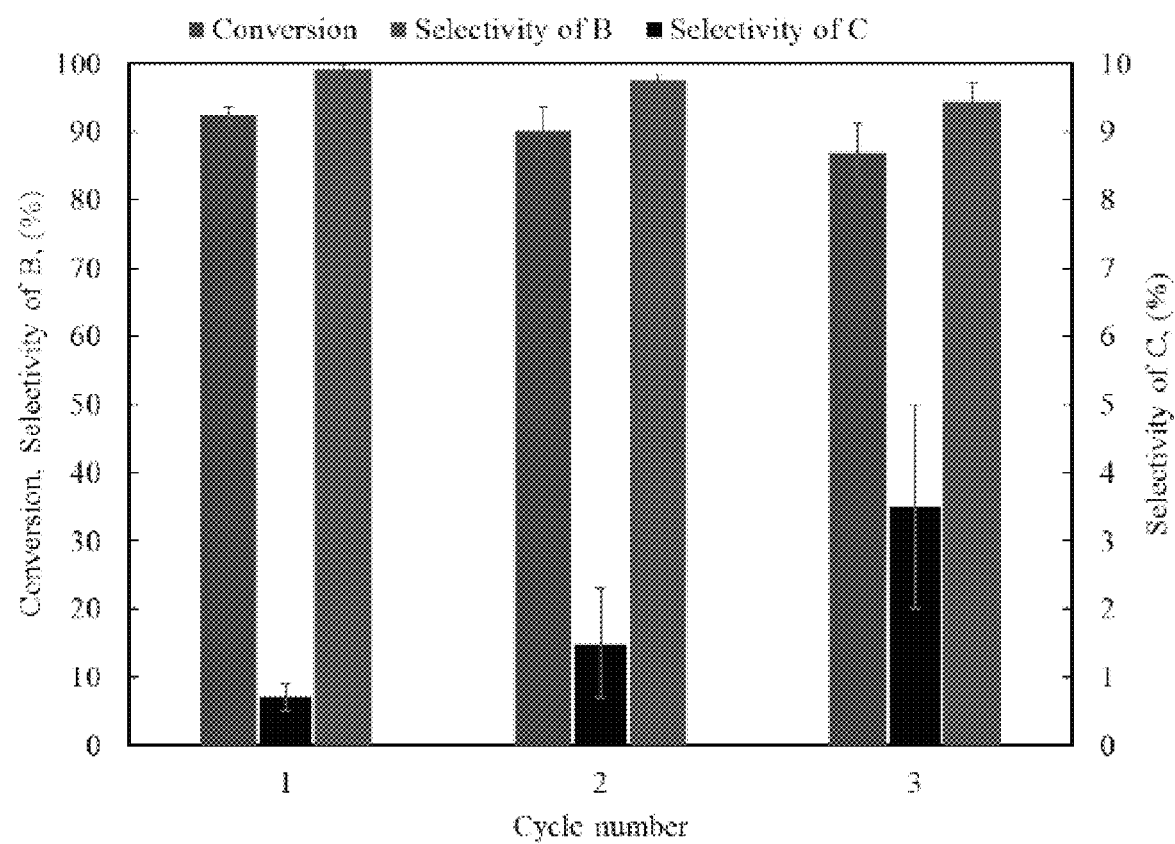
FIG. 25 is a bar graph illustrating the conversion and selectivity of B and C for three repeated cycles of Cu-silicates, 2 h, 200° C., 750 psi and 0.10 g of catalyst.

The stability and reusability of the present catalyst are exemplified herein. To illustrate the long-term stability of the catalyst, a number of successive cycles of petcoke oxy-cracking were conducted. The catalyst was separated from the reaction mixture at the end of the reaction and washed. The activity of the recycled catalyst was determined by carrying out oxy-cracking at a temperature of 200° C. with a residence time of 2 h. Other operating conditions were kept constant. The catalyst activity in terms of reaction conversion and selectivity for both B and C for the three consecutive experiments is presented in FIG. 25. As shown, the selectivity to produce B reached nearly 98% after three cycles of reaction, with the third cycle showing an insignificant downward trend as compared with the first run, within the experimental error. The selectivity for C is slightly increased with each run; however, the trend is within the range of experimental error. Surprisingly, even after three runs, the reaction conversion was stable and maintained at 92%, 90% and 87% for three consecutive runs, respectively, which evidences the successful reusability and stability of the $CaCuSi_4O_{10}$ catalyst (Egyptian Blue, which shows resistance to fading even under strong light and can still be observed in Egyptian historical relics which have been exposed for thousands of years without losing their color).

Figure 26:
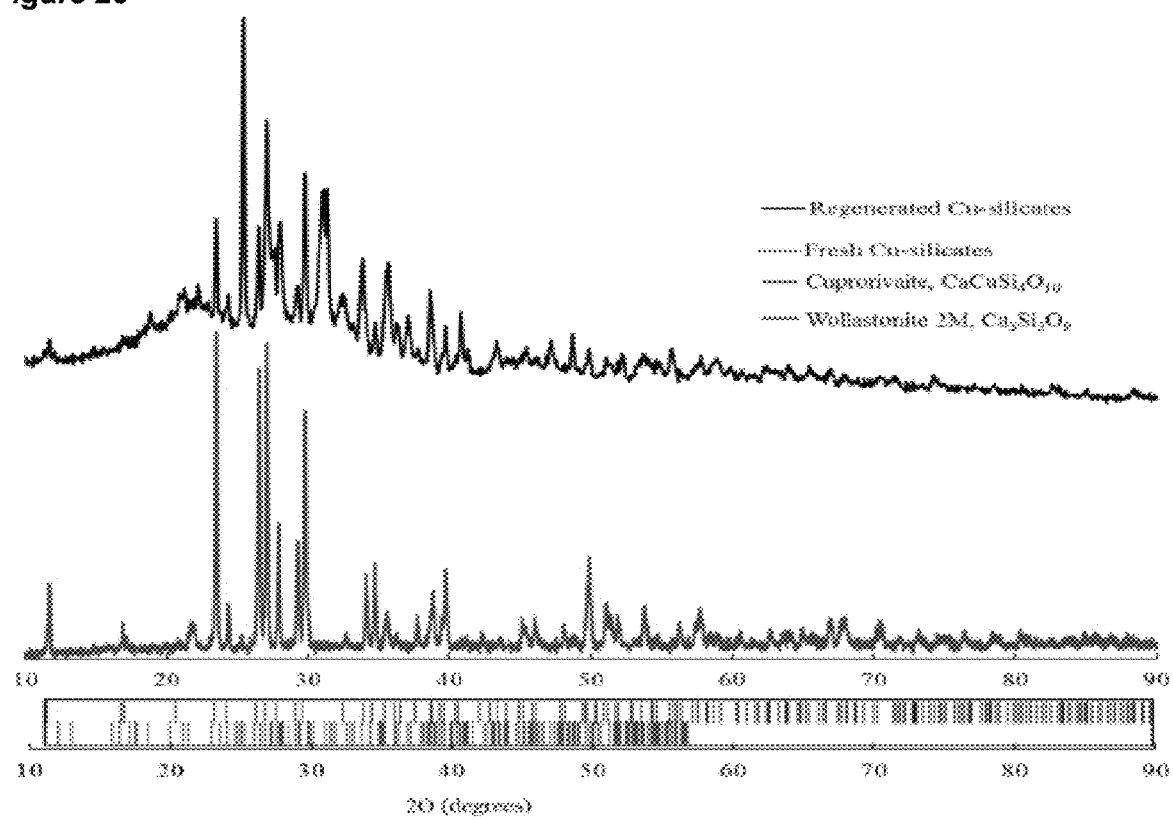
FIG. 26 is a plot illustrating overlays of the X-ray diffraction patterns of fresh and regenerated catalysts. The top pattern is the regenerated catalyst, over the fresh catalyst, above cuprorivaite and lastly wollastonite at the bottom.

These findings were confirmed by XRD analysis of the spent catalyst as shown in FIG. 26. The figure shows that the XRD patterns following regeneration after the first cycle and the fresh catalyst (compared to cuprorivaite and wollastonite). The main catalyst structure remained unchanged; however, amorphous material can be observed together with traces of wollastonite. The XRD pattern of the regenerated catalyst matches perfectly with the pdf card no. 01-085-0158 (cuprorivaite) of the Crystallographic Open Database (COD). However, some small traces of wollastonite ($Ca_3Si_3O_9$) was present based on the pdf card no. 1011227. Egyptian Blue pigment is understood to consist of $CaCuSi_4O_{10}$ with variable amounts of wollastonite ($CaSiO_3$), high amounts of Cu oxides and cuprite ($Cu_2O$). A difference in crystalline domain sizes were observed between the fresh (93 nm) and regenerated (44 nm) catalyst, which may be due to the disaggregation of some crystallites and/or a new ordering of crystalline matrix under the reaction conditions. Additionally, the intensities of the crystallographic phase in the regenerated catalyst are lower than for the fresh catalyst.

FTIR Analysis of the Oxy-Cracking Products

Figure 27:
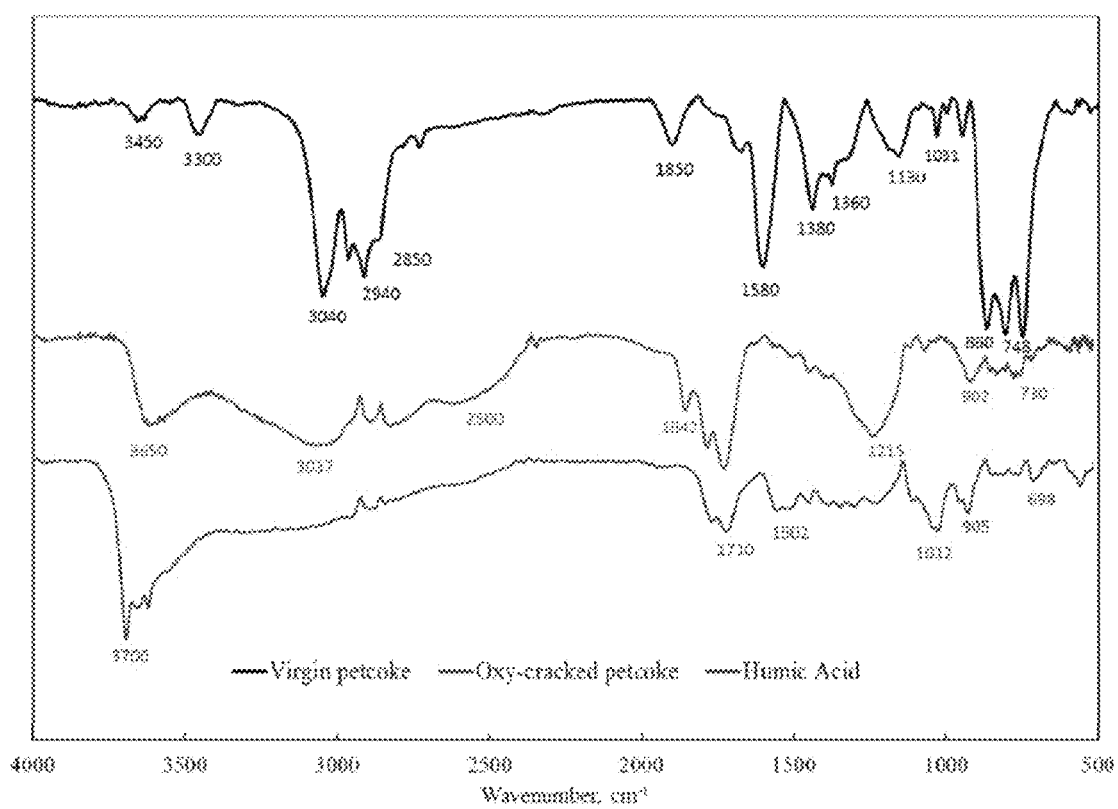
FIG. 27 is a plot showing FTIR spectra of the virgin petcoke, oxy-cracked products and the humic acid at 200° C. and 2 h residence time.

The infrared spectra of the original petcoke and the oxy-cracked compounds (i.e., solubilized fractions) isolated from a reaction that was carried out at 200° C. for 2 h are shown in FIG. 27. As seen, for the original petcoke spectrum, the alkyls/aliphatic and aromatic regions assigned at (2850-3000 $cm^{-1}$) and (~3040 $cm^{-1}$ and 930-742 $cm^{-1}$), respectively. The aromatic stretching vibration of C=C appears at around 1600 $cm^{-1}$, which could be conjugated with other groups. The out-of-plane C—H bonds vibration in the aromatic range is assigned at 804, and 860 $cm^{-1}$ bands. The C—H stretching vibration due to the aromatic appears at 3040 $cm^{-1}$. Moreover, the presence of alkyl groups such as —$CH_3$, =$CH_2$ and —$CH_2CH_3$ is evidenced by the bands around 2910 $cm^{-1}$ and 1380 $cm^{-1}$ which can be assigned to asymmetric and symmetric —C—H stretching and bending vibrations, respectively. The possibility of —OH functionalities (3500 $cm^{-1}$) is present, which seems to be interacting through hydrogen bonding as the signals are very broad spanning from about 2700 to 2000 $cm^{-1}$. The presence of heteroatoms such as sulfur in form of sulfoxide species can be assigned to the small band ~1031 $cm^{-1}$. It can be concluded that the petcoke has a high contribution of polynuclear aromatic hydrocarbons and a relatively small contribution of aliphatic chains with some heteroatoms such as sulfur, nitrogen and oxygen.

The FTIR spectrum of the oxy-cracked products is dramatically different than the original petcoke. The oxy-cracked products obtained at 200° C. were compared with a sample of commercial humic acid as shown in FIG. 27. As seen, the IR spectrum of oxy-cracked products with the presence of the catalyst resembles the one obtained for the commercial humic acids. The broad band spanning from 3700 to 2500 $cm^{-1}$ indicates the presence of OH groups in both samples (i.e., oxy-cracked and commercial humic acid). An important feature is the intense and broad peak appearing between 3318 and 3503 $cm^{-1}$ which correspond to —O—H stretching vibration mode of hydroxyl functional groups. These functionality groups are formed due to the presence of oxygen in the aqueous phase and are related to oxygenated species such as carboxylic functional groups. The presence of carboxylic acids (C=O) are evident as indicated by the double band centred at 1710 $cm^{-1}$ in both samples; however, they are more observed in the oxy-cracked products as compared with the commercial humic acid. Interestingly, a complete cracking in the aromatic species is evidenced in the oxy-cracked sample not only by the disappearance of aromatic moieties in the region of out-of-plane bands (930-750 $cm^{-1}$) but also the reduction of the aromatic C—H stretching at 3030 $cm^{-1}$. On the other hand, the alkyl groups are no longer visible in the range of 3000-2850 $cm^{-1}$ in the oxy-cracked sample indicating the complete oxy-cracking of petcoke at that reaction temperature. Moreover, another important feature present in the oxy-cracked sample is the sharp band at ~1842 $cm^{-1}$ indicating a possibility of carbonyl compounds such as lactones and esters; this band did not appear in the commercial humic acid sample. Another difference between the oxy-cracked sample and the commercial humic acid is the band at 1215 $cm^{-1}$ corresponding to the presence of sulfur as sulfone compounds, this is due to the high concentration of sulfur in the sample (~6% sulfur). These results illustrate that the oxy-cracking product characteristics are similar to humic analogs, but with some sulfur content. The product consists of primarily oxidized organic functional groups such as hydroxyl (—OH), carboxylic salts (O=C—O—), carboxylic acids (R—$CO_2H$) and minor amounts of esters. These functionalities identified by IR spectra over the catalyst are in accordance with the compounds found in Example 1, derived from processes carried out without a catalyst, although no humic acids analogs were found in the absence of the catalyst. These findings illustrate that the copper-silicate catalyst is more selective toward producing humic acid analogs under the exemplified conditions, than reactions carried out without a catalyst.

Example 3: Comparative Thermal Properties and Heating Values of Oxy-Cracked, Virgin Petroleum Coke and Blends Thereof This Example compares the heating value and thermo-oxidative behaviour of the oxy-cracked and virgin petcoke using thermogravimetric analysis (TGA). For this purpose, a sample of petcoke was oxy-cracked at 200° C. and 750 psi in a Parr reactor, in keeping with the description set out in Example 1. TGA analysis illustrated that the oxy-cracked petcoke is oxidized with improved kinetics compared to virgin petcoke. There was also a significant improvement in the combustion performance parameters of the oxy-cracked petcoke such as ignition, peak and burnout temperatures. In the result, the heating value of oxy-cracked petcoke is similar to virgin petcoke, whereas the nitrogen and sulfur content in the oxy-cracked petcoke is much lower than that of virgin petcoke.

A sample of oxy-cracked petcoke, was prepared as generally described in Example 1, to provide solubilized organic species, collected from the alkaline solubilization solution and solidified after washing with acid and drying in a vacuum oven overnight at 65° C. HCl (37%, ACS reagent, Sigma Aldrich, Ontario, Canada) was used for washing the oxy-cracked sample. In brief, the reaction was carried out in a PARR batch reactor by mixing 1.0 g of original petcoke with 20 ml of deionized water under alkaline conditions (pH~13). The petcoke sample was oxy-cracked at 200° C., with oxygen pressure of 750 psi, for 120 min. The mixer speed was set at 1000 rpm. At the end of the reaction, the liquid effluent was discharged and filtered in a centrifuge (Eppendorf centrifuge 5804) at 5000 rpm for 15 min to separate the remaining solid (i.e., unreacted and/or insolubilized species). The pH of the obtained liquid solution after reaction ranged between 8 and 10 depending on reaction conditions. The pH was measured using a Mettler Toledo pH meter (Mississauga, Canada). Afterwards, few drops of HCl (37%) was added to the black liquid solution (solubilized petcoke in water) until the pH of the solution decreased to ~6. Following acidification, the solid particles were allowed to settle for 3 h and then separated by centrifuging and decanting the supernatant solution. The settled black solid contained most of the organic products based on TOC measurements (~90% of total TOC). However, small amount of hydrocarbons (<10% of total TOC) remained soluble in the supernatant. Remaining solubilized hydrocarbons could be recovered by allowing the solution to settle for 48 h. The settled-solid hydrocarbons were centrifuged and washed twice with 5% HCl solution to remove the excess K left over after the oxy-cracking reaction. The collected solidified organic species were dried in a vacuum oven overnight at 65° C. for TGA analysis. The elemental analysis for this sample (after acid treatment) was measured and compared with virgin petcoke and the chemical composition summarized in Table 9.

TABLE 9

The chemical composition of the virgin and oxy-cracked petcoke samples.

| Composition (wt %) | Virgin petcoke | Oxy-cracked petcoke |
|---|---|---|
| C | 84.48 | 62.31 |
| H | 3.81 | 2.68 |

TABLE 9-continued

The chemical composition of the virgin and oxy-cracked petcoke samples.

| Composition (wt %) | Virgin petcoke | Oxy-cracked petcoke |
|---|---|---|
| N | 1.55 | 1.10 |
| S | 4.46 | 1.32 |
| V | 0.08 | 0.04 |
| Fe | 0.06 | 0.01 |
| Ni | 0.03 | 0.01 |
| Mo | 0.01 | 0.00 |
| Co | 0.051 | 0.00 |
| K | 0.00 | 3.54 |
| O* | 5.47 | 28.99 |

*Estimated by the difference

The washed oxy-cracked petcoke was mixed with virgin petcoke at blend ratios of 25 and 50 wt % to illustrate the effects of oxy-cracked petcoke on enhancing the thermal reactivity of virgin petcoke.

Thermogravimetric Analysis

The virgin petcoke and the washed oxy-cracked petcoke and blends thereof were subjected to thermal oxidation using a thermogravimetric TGA/DSC analyzer (SDT Q600, TA Instruments, Inc., New Castle, Del.). As for the oxidation study, samples of ~5 mg of both materials were heated up from room temperature to 800° C. with a heating rate of 10° C./min under the air flow of 100 cm$^3$/min. The TGA results, weight loss (TG) and weight loss rate (DTG) profiles, were analyzed to determine the combustion performance parameters (i.e., ignition, peak, and burnout temperatures). These parameters can be calculated by the intersection method. The ignition temperature is calculated at the point where the TG peak, which is the point of initial devolatilization after the sample was dried, and the tangent line of the mass loss profile are intersected. The peak temperature is determined at the maximum DTG peak. Eventually, the burnout temperature is calculated at the intersection point between the two tangent lines; the first line is tangent to the mass loss profile at the point where the DTG peak occurs and the second line is tangent to the point where the weight loss is unchanged. It is also approximated by the temperature where weight loss of the sample reaches to ~1%/min at the terminal phase of the DTG profile.

Heating Value Measurements

The high heating value (HHV) of virgin and oxy-cracked petcoke was determined by proximate analysis using TGA. The moisture (M) content and volatile matter (VM) were estimated by heating up the sample from room temperature to 500° C. under nitrogen atmosphere flowing at a rate of 100 ml/min. The fixed carbon (FC) and the ash (A) content (residue) were obtained by continuing heating the sample from 500 to 800° C. at a heating rate of 10° C./min under air flow, passing at a flow rate of 100 ml/min over the sample. The change in the sample weight was monitored until there was no further change in weight. After estimating the values for of the aforementioned properties (i.e., M, VM, FC, and A), the heating value was calculated using alternative correlations (Schuster et al., Brennst Chem, 32 (1951) 19-20; Küçükbayrak et al., Fuel, 70 (1991) 979-981; Cordero et al., Fuel, 80 (2001) 1567-1571; Parikh et al., Fuel, 84 (2005) 487-494; Majumder et al., Fuel, 87 (2008) 3077-3081).

Elemental Analysis

Figure 28:
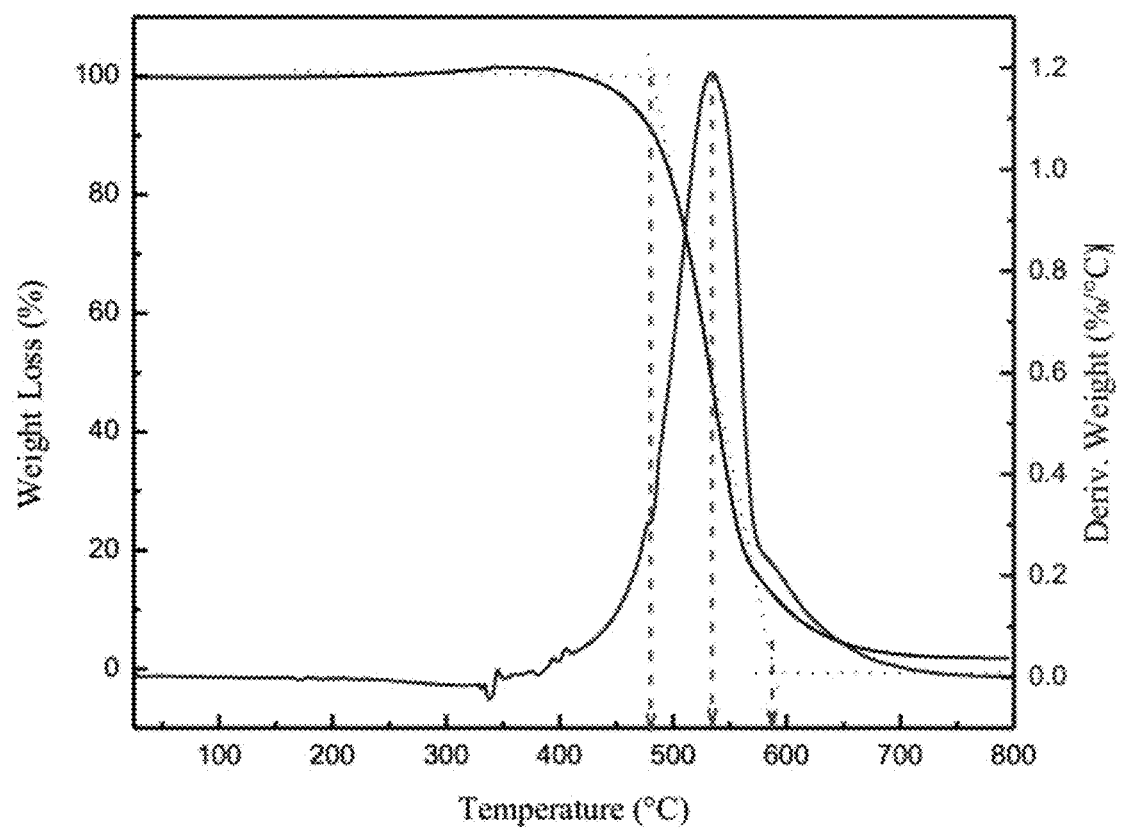
FIG. 28 is a plot showing the TG-DTA curve for the virgin petcoke, showing the ignition, peak and burnout temperatures.
Figure 29:
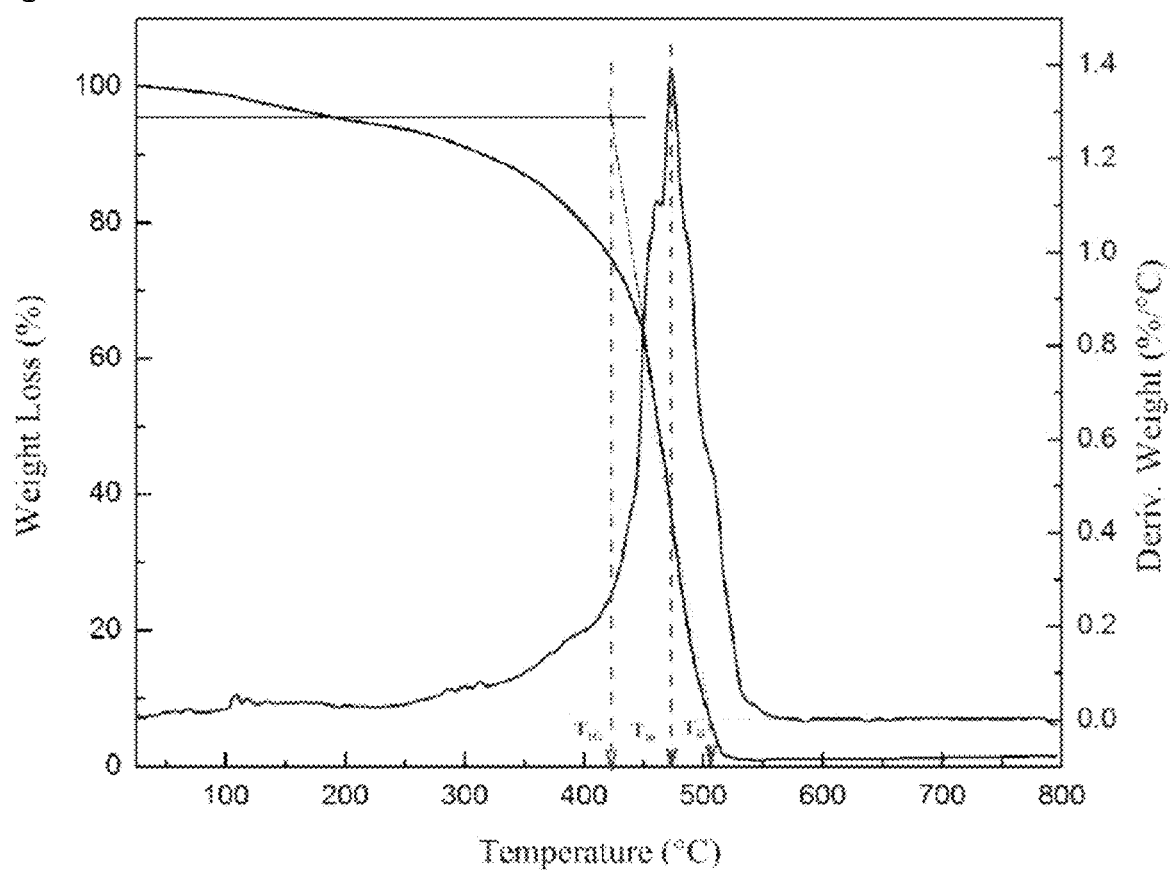
FIG. 29 is a plot showing the TG-DTA curve for oxy-cracked petcoke under air, showing the ignition, peak and burnout temperatures.
Figure 30:
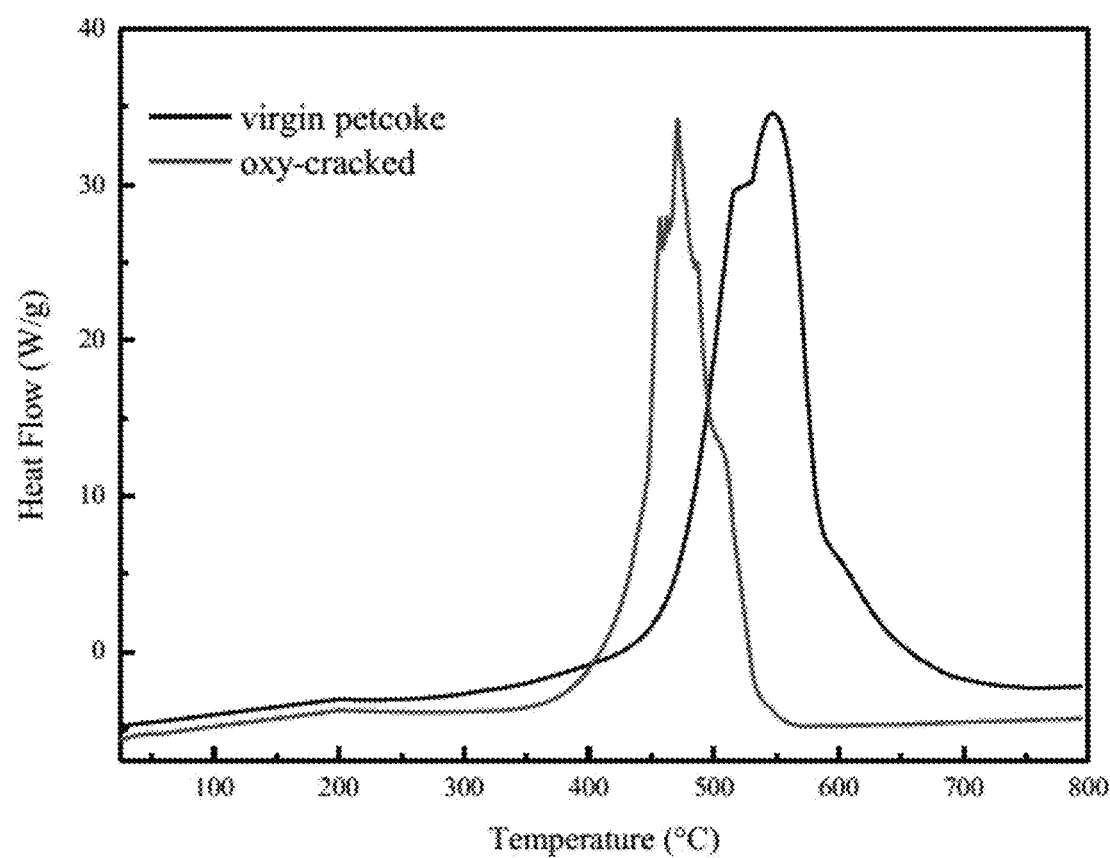
FIG. 30 is a plot showing the heat flow of virgin and oxy-cracked petcoke with temperature.

A PerkinElmer 2400 CHN analyzer (Waltham, Mass., USA) was used for analyzing carbon, hydrogen, and nitrogen contents for virgin and oxy-cracked petcoke samples using combustion method. The sulfur content was determined with an Antek 9000 system (Houston, Tex., USA)

calibrated with Accustandard SCO-500× (S) standards and running toluene solutions (10 wt. %/vol.). The metal contents in the virgin and oxy-cracked petcoke samples were analyzed at ALS Environmental Laboratories (Alberta, Canada) using Inductively Coupled Plasma Mass Spectroscopy (Dissolved Metals in Water method by CRC ICPMS).
Results and Discussion
Thermo-Oxidative Decomposition of Virgin and Oxy-Cracked Petcoke Thermo-oxidative decomposition of virgin and oxy-cracked petcoke was performed to illustrate the thermal degradation behavior under air. FIGS. 28 and 29 show the rate of mass loss (TG) and the derivative of rate of mass loss (DTG) profiles under oxidation by air from room temperature to 800° C. at a heating rate of 10° C./min for the virgin and oxy-cracked petcoke, respectively. It is evident from the profiles (FIG. 28) that the oxidation of petcoke sample occurs at a temperature around 540° C. which is evidenced by the presence of an exothermic symmetric peak beyond 540° C. as shown in FIG. 30. There is an initial increase in mass loss for the virgin petcoke sample (FIG. 28) which may be due to the adsorption of oxygen. The oxy-cracked sample lost a higher percentage of its original weight and more quickly than the virgin petcoke sample at the early oxidation stage, which may be explained by the high content of volatile matter present in the oxy-cracked sample. As shown in FIG. 29, the oxy-cracked sample is completely oxidized with maximum rate at 475° C., which is lower than that of the virgin petocke. This shows that the oxy-cracked petcoke can be oxidized earlier than the virgin petcoke under similar oxidation conditions. This is also evident in the heat flow profiles of the two samples shown in FIG. 30, from which it is evident that the oxidation of the oxy-cracked sample occurs earlier than the virgin petcoke. This shift to lower oxidation temperatures in oxy-cracked petcoke may be related to the presence of low molecular weight compounds, present as volatile matter formed during the oxy-cracking reaction. This is evidence of an enhanced reactivity of the oxy-cracked petcoke, whereas the virgin petcoke has a relatively low reactivity.

Figure 31:
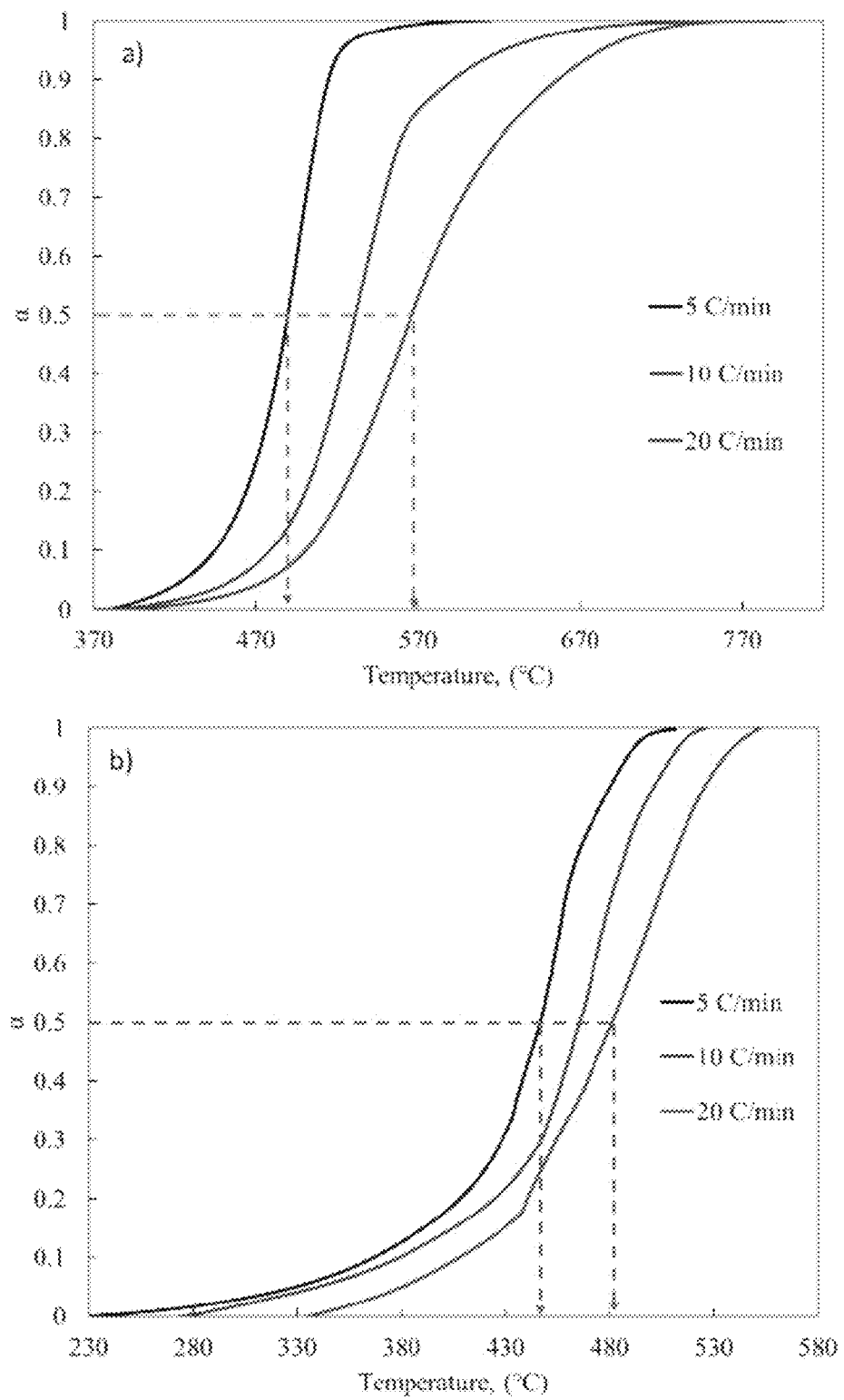
FIG. 31 includes two plots, showing the conversion percent (a) with temperature at heating rates of 5, 10 and 20° C./min for a) virgin petcoke and b) oxy-cracked petcoke.

FIG. 31 shows the plot of conversion degree (a) against temperature for non-isothermal oxidation at three heating rates (5, 10, and 20° C./min). The degree of conversion (a) is the fraction of reactant decomposed at a specific temperature and is defined in terms of the mass change or the mass of volatile generated. The conversion percent ratio or the extent of reaction of petcoke and oxy-cracked samples was estimated by Eq. (15):

$$\alpha = \frac{m_0 - m_t}{m_0 - m_\infty} \quad (15)$$

where $m_0$ is the initial sample mass, $m_t$ is the sample mass at any time and $m_\infty$ is the final sample mass.

FIG. 31 illustrate that as the heating rate decreased, the thermo-oxidative decomposition is shifted gradually to the lower temperature for both samples. Surprisingly, the decomposition temperature of the oxy-cracked sample is much lower than virgin petcoke at any heating rate. At low heating rate (5° C./min), for example, to obtain a 50% conversion of virgin petcoke a temperature of 498° C. is required while a temperature of 445° C. is needed for oxy-cracked one to obtain the same conversion. This significant decrease in reaction temperature again shows that the oxy-cracked sample is more easily oxidized as compared to the virgin petcoke. At a temperature lower than 430° C., about 30% conversion is obtained for the oxy-cracked sample whereas no conversion is observed in petcoke at that temperature. This high conversion in the oxy-cracked sample at that temperature may for example be attributed to vaporization of volatile matter that was formed during the oxy-cracking reaction, in select embodiments.

The slope of the oxy-cracked sample changes during the first half of the reaction process, as shown in FIG. 31b, indicating that multiple reaction mechanisms are taken place during the oxidation reaction. This is in contrast to the slope profile of the virgin petcoke which shows that the oxidation is happening by one mechanism.

The ignition ($T_{IG}$), peak ($T_m$) and burnout ($T_B$) temperatures for a fuel are important parameters related to combustion performance. The ignition temperature, the temperature at which a sudden decrease in mass loss on the DTG curves, indicates how easily the fuel is ignited. The peak temperature and its corresponding rate of mass loss are determined at the maximum rate of mass loss. These parameters (i.e., Tm and its mass loss) indicate the combustibility and reactivity of the fuel, where fuel with low value of Tm temperature can easily ignite and react. Burnout temperature, on the other hand, is defined as the temperature at which the mass of the sample remains constant without any change during the combustion process. Table 10 shows the determined values of these key combustion parameters extracted from FIGS. 29 and 30 for both virgin and oxy-cracked samples, respectively.

TABLE 10

Thermal properties of the virgin, oxy-cracked petcoke and blends thereof.

| | Ignition Temp., (TIG), ° C. | Peak Temp., (Tm), ° C. | Burnout Temp., (TB), ° C. |
|---|---|---|---|
| Virgin petcoke (green) | 480 | 535 | 590 |
| 25 wt % oxy-cracked | 442 | 510 | 555 |
| 50 wt % oxy-cracked | 430 | 490 | 530 |
| Oxy-cracked petcoke | 420 | 475 | 508 |

The exemplified combustion parameters were shown to be low in the case of oxy-cracked sample. In particular, the initial degradation temperature (ignition temperature) of the oxy-cracked sample is significantly reduced by 13% as compared to the virgin petcoke. This is putatively due to the high content of the volatile matters in the oxy-cracked sample. The higher ignition temperature of petcoke sample can putatively be attributed to the higher nitrogen content, which retards ignition of volatiles and reactions at the material surface. The reactivity of a fuel is usually evaluated by the peak temperature; the higher the temperature indicating the lower the reactivity. Interestingly, the peak temperature was found to be low for the oxy-cracked sample, thus exhibiting the presence of more reactive compounds. A significant difference was observed in burnout temperature between virgin petcoke and oxy-cracked, one reducing the burnout times of the fuel.

Based on these results, it is evident that the oxy-cracked products are more reactive, efficient, less pollutant and more easily oxidized than the virgin petcoke. This can be ascribed to the high content of volatile matter (VM) formed in the oxy-cracked sample.

Figure 32:
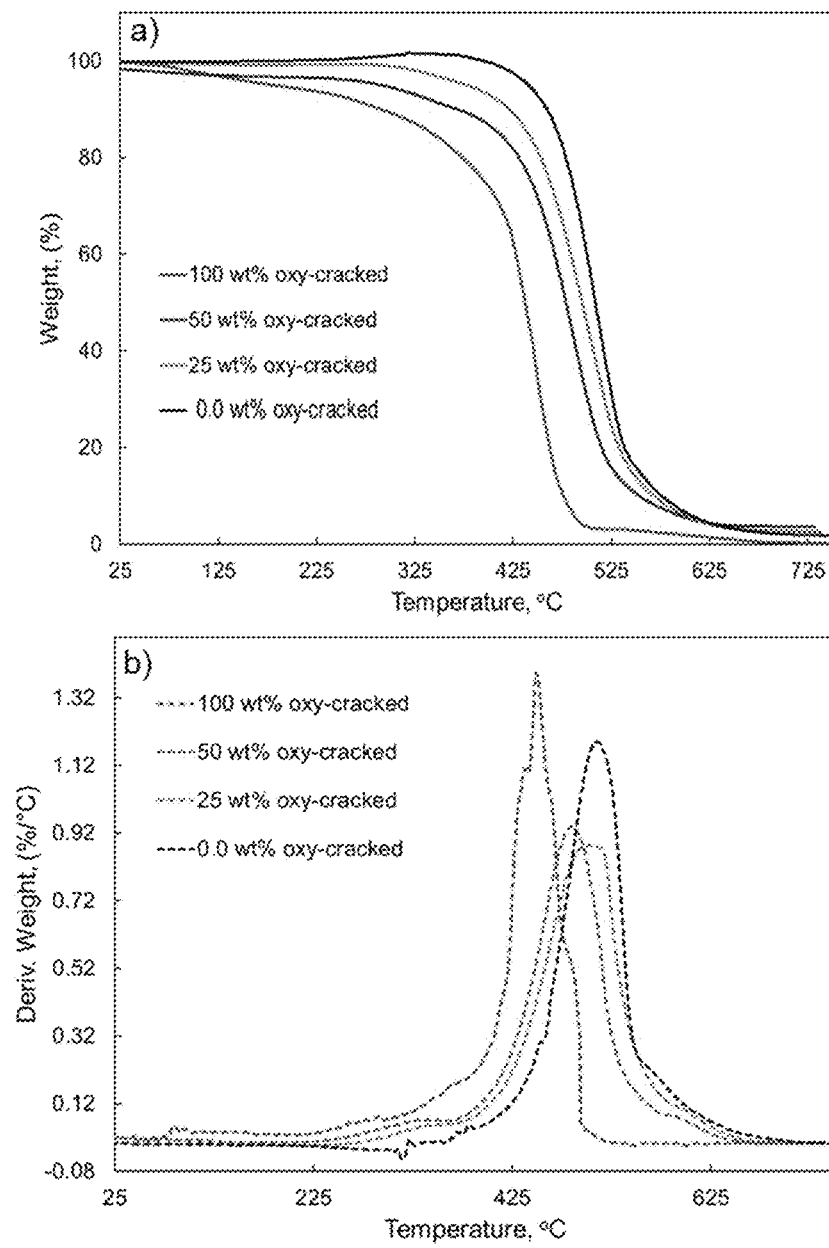
FIG. 32 includes two plots, showing the results of thermogravimetric analysis of virgin and oxy-cracked petcoke, and various blends thereof, at a heating rate of 10° C./min.

In these examples, two mixtures of 25 and 50 wt % of oxy-cracked petcoke were mixed with virgin petcoke and oxidized in the TGA under similar previously described conditions. FIGS. 32a and b show the rate of mass loss and the derivative mass loss profiles under oxidation by air from room temperature to 800° C. at a heating rate of 10° C./min for 0, 25, 50, and 100 wt % of the oxy-cracked petcoke blend with virgin petcoke. As shown, the profiles of the blend samples are illustrative of a significant dependence on the degree of the oxy-cracked content. The curve of each blend lies between the curves of the virgin and oxy-cracked petcoke, and the contributions of the oxy-cracked content to these profiles is clearly evident. For example, the 50 wt % blend behaves similarly to the oxy-cracked sample, but with differences in the oxidation peak and the volatile content. Interestingly, a clear shift to the left is observed in the mass loss profiles as the amount of oxy-cracked petcoke is increased. Also, the oxidation temperature of the blend is decreased with increasing mass of oxy-cracking content in the blend. These results putatively reflect the relatively high content of low molecular weight oxygenated compounds that form in the oxy-cracked material, which has a significant effect on the chemical reactivity of the blends. The combustion characteristics of petcoke blends of 25 and 50 wt % oxy-cracked material were extracted from FIG. 32 and tabulated in Table 10. There is a clear difference in combustion characteristics between virgin petcoke and blends thereof with oxy-cracked material, which is putatively due to the combustion of the volatile components. As shown, the ignition, peak and burnout temperatures showed a decreasing trend with increasing mass of oxy-cracked petcoke in the blend. This reduction in the ignition temperature is putatively attributed to the amount of volatile matter, an attribution which is substantiated by the corresponding faster oxidation rate.

Heating Values of Virgin and Oxy-Cracked Petcoke

Figure 33:
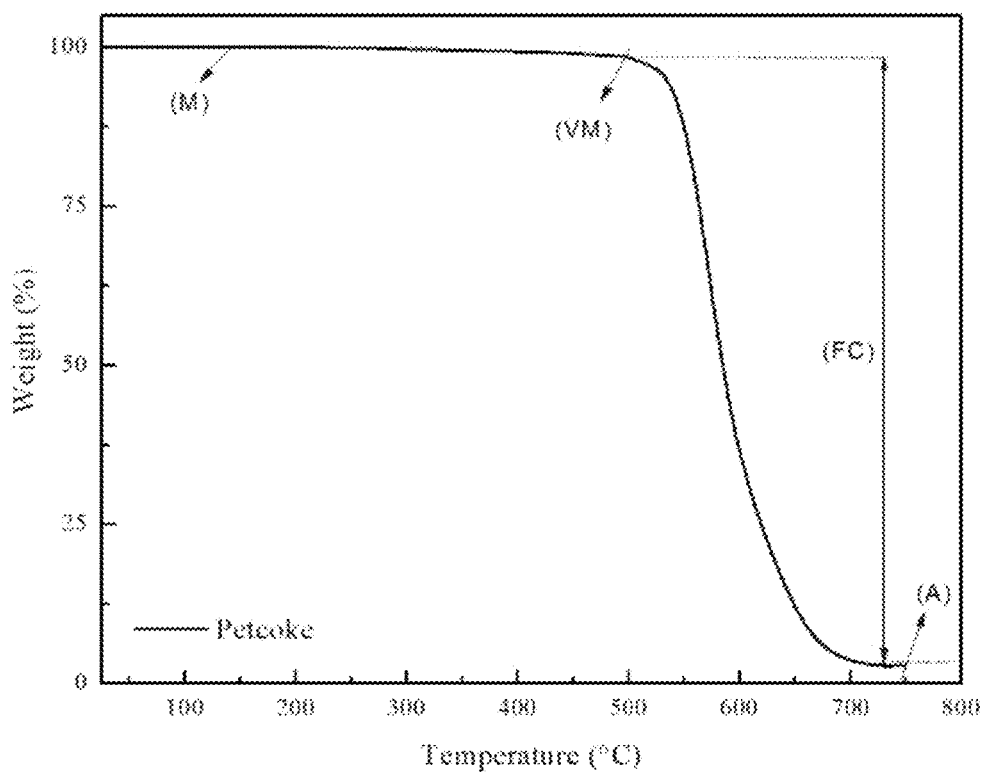
FIG. 33 includes two plots, showing thermogravimetric analysis of the virgin and oxy-cracked petcoke at a heating rate of 10° C./min, showing representative ultimate characteristics, such as M, MV, FC, and A.
Figure 33:
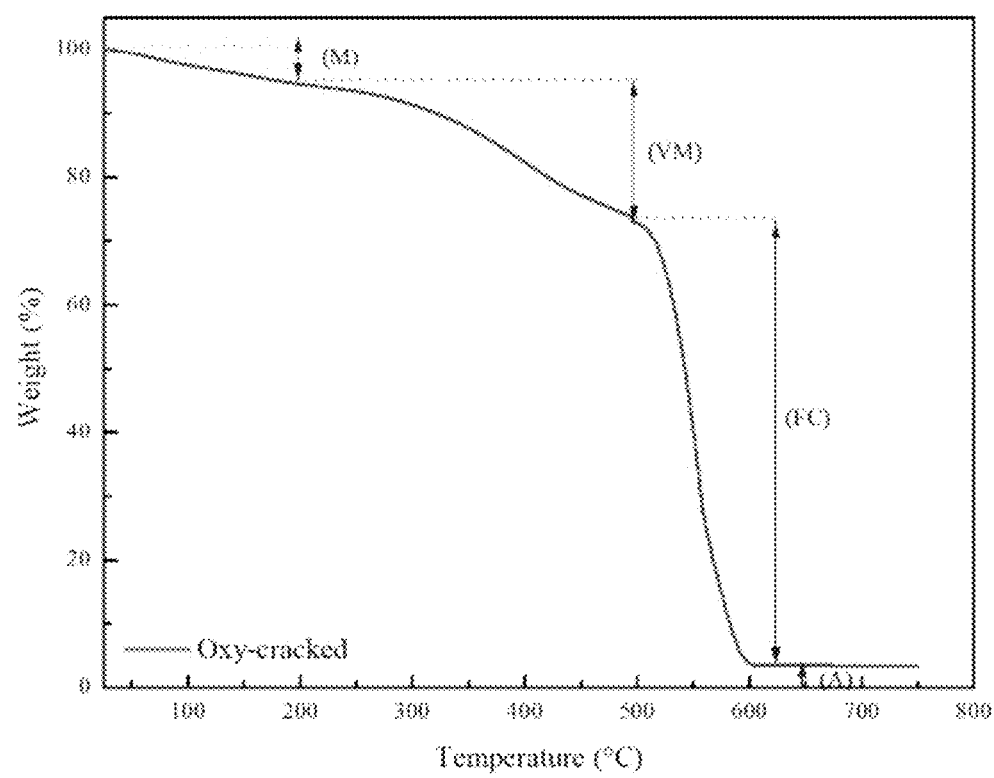

Heating values (HHV) were experimentally determined based on the amount of volatile matter (VM), moisture (M), ash (A) and fixed carbon (FC) contents in oxy-cracked and virgin petcoke samples extracted from FIG. 33. FIG. 33 shows the profiles for the % mass loss with the increase in the temperature for virgin petcoke as well as for oxy-cracked petcoke obtained up to 750° C. As shown in the Figure, during the heating of the samples, the first stage in mass loss corresponds to the drying step (~200° C.) where the moisture is evaporated from the samples. The second region is the devolatilization stage (200-500° C.) where the volatiles are removed. It is worth noting that the first two stages are obtained under pyrolysis process where the (M) and (VM) contents are determined. Moreover, the combustion stage is taking place between 500-630° C., where the loss of heavier hydrocarbons (total carbon) occurs. The final stage relates to the residual combustion stage (ash, >630° C.) where the combustion process has nearly ended. The combustion and residual combustion stages were obtained under oxidation with air where the total fixed carbon (FC) and ash (A) content are estimated.

Typical proximate and ultimate analysis of petcoke and oxy-cracked samples are summarized in Table 11.

TABLE 11

Proximate and ultimate analysis of samples

| Proximate analysis (wt %) | Virgin (green) petcoke | Oxy-cracked petcoke |
|---|---|---|
| Volatile material (VM) | 1.99 | 20.79 |
| Moisture (M) | 0.007 | 5.38 |
| Ash (A) | 2.68 | 3.60 |
| Fixed Carbon (FC) | 95.32 | 70.23 |
| VM/FC ratio | 0.021 | 0.29 |

TABLE 11-continued

Proximate and ultimate analysis of samples

| Proximate analysis (wt %) | Virgin (green) petcoke | Oxy-cracked petcoke |
|---|---|---|
| Ultimate analysis (wt %) | | |
| C | 84.40 | 62.31 |
| H | 3.81 | 2.68 |
| N | 1.55 | 1.10 |
| S | 4.46 | 1.32 |

The VM content of the oxy-cracked sample is significantly higher than the virgin petcoke sample. The ash content (A) was found to be less than 4% in oxy-cracked sample which was found to contain mainly potassium (K) left over after reaction while the ash content in the virgin petcoke contained metals such as iron, nickel, vanadium and cobalt. The high ratio of VM/FC observed in the oxy-cracked sample indicates high availability of energy in the fuel. As for the ultimate analysis, the oxy-cracked sample compared to virgin petcoke has a lower than average carbon, sulfur, hydrogen and nitrogen content and a higher content of oxygen.

The HHV for the samples was estimated using proximate correlations (Equations 16-20) and presented in Table 12. Schuster et al., op cit.:

$$HHV=4.183\times10^{-3}\times(800+V_m\times(70-1.65\times V_m)) \quad (16);$$

Küçükbayrak et al., op. cit.:

$$HHV=76.56-1.3(V_m+A)+7.03\times10^{-3}(V_m+A)^2 \quad (17);$$

Cordero et al., op. cit.:

$$HHV=354.3F_c+170.8V_m \quad (18);$$

Parikh et al., op. cit.:

$$HHV=0.3536F_c+0.1559V_m-0.0078A \quad (19);$$

Majumder et al., op. cit.:

$$HHV=0.35F_c+0.33V_m-0.11M-0.03A \quad (20).$$

TABLE 12

The heating values (HHV) for virgin and oxy-cracked petcoke samples.

| | Heating value (MJ/kg) | |
|---|---|---|
| Correlation | Virgin (green) petcoke | Oxy-cracked petcoke |
| Equation 16 | 34.02 | 36.57 |
| Equation 17 | 32.80 | 27.88 |
| Equation 18 | 34.11 | 28.43 |
| Equation 19 | 34.00 | 28.05 |
| Equation 20 | 33.94 | 30.74 |

The estimated HHV of the virgin petcoke sample is in range of (30-37 MJ/kg) using any of these correlations which are in good agreement with the reported values of petcoke. The HHV values of oxy-cracked products are in the range of (28-31 MJ/kg; ignoring a very high value by Schuster equation (16) which represents an emphasis on the value of VM). The reduction in HHV of oxy-cracked petcoke reflects a relatively high oxygen content, in the form of carboxyl and phenolic compounds. A higher FC content and lower VM content were observed in the virgin petcoke sample as compared to the oxy-cracked sample. Even though the HHV of petcoke is higher than the oxy-cracked sample, the nitrogen and sulfur content of the oxy-cracked sample is much lower. This represents the potential for a fuel relatively low in NOX and SOX emissions. Surprisingly, the HHVs of the oxy-cracked products were found to be higher than that for ranked-coals (9.50-27 MJ/kg). These results reflect the potential for the oxy-cracked products to be used as fuel, for example for power generation, for example by co-firing, pyrolysis or gasification.

The invention claimed is:

1. A method of processing petroleum cokes, comprising:
providing a solid green petroleum coke comprising a carbonaceous component and a transition metal component, the carbonaceous component comprising polycyclic aromatic hydrocarbons, wherein the solid green petroleum coke has an elemental composition in wt % of: ≥80 carbon ≤98; ≥1 hydrogen ≤8; ≥2.5 oxygen ≤10; nitrogen ≥0.5; ≥1 sulfur ≤10; ≥0.001 vanadium ≤0.8; ≥0.001 iron ≤0.5; ≥0.001 nickel ≤0.5; ≥0.001 molybdenum ≤0.1; and, ≥0.01 cobalt ≤1;
solubilizing a soluble portion of the solid green petroleum coke in a basic subcritical aqueous solubilization liquid under solubilization conditions that comprise a solubilization pressure of at least 500 psi, a solubilization temperature of from 220° C. to 240° C., and an added solubilization base concentration effective to maintain a solubilization pH≥8, for an effective solubilization time of not more than 2 hours, in the presence of an oxidizing atmosphere comprising more than 21% oxygen, with agitation to generate a stirred reaction region in the solubilization liquid having a Reynolds number of ≥10,000, so as to solubilize at least 75% of the solid green petroleum coke leaving a leached solid residue and producing a pregnant solubilization solution comprising a solubilized organics fraction, wherein the solubilization conditions and effective solubilization time are selected so that the solubilization reaction has a selectivity for production of the solubilized organics fraction over a carbon dioxide gas fraction of at least 80%, and at least 25% of the sulfur in the solid green petroleum coke reports to the leached solid residue, and no more than 60% of the transition metal component of the solid green petroleum coke reports to the pregnant solubilization solution as a dissolved transition metallic component; and,
precipitating a recovered solids fraction from the pregnant solubilization solution by lowering the pH to ≤6, wherein the recovered solids fraction comprises ≥80% of total organic carbon (TOC) present in the pregnant solubilization solution as the solubilized organics fraction, and the recovered solids fraction comprises an acid precipitated transition metal component, wherein the precipitated transition metal component makes up a smaller weight percent fraction of the recovered solids fraction than the weight percent fraction of the transition metal component in the solid green petroleum coke.

2. The method of claim 1, wherein the solubilization pressure is ≤1000 psi.

3. The method of claim 1, wherein the added solubilization base is a hydroxide.

4. The method of claim 3, wherein the added solubilization base is KOH or NaOH.

5. The method of claim 1, wherein the solubilization pH is ≤13.

6. The method of claim 1, wherein the effective solubilization time is not more than 1 hour.

7. The method of claim 1, wherein the oxidizing atmosphere comprises at least 50% oxygen.

8. The method of claim 7, wherein the oxidizing atmosphere comprises at least 90% oxygen.

9. The method of claim 1, wherein no more than 50% of the transition metal component of the solid green petroleum coke reports to the pregnant solubilization solution as the dissolved transition metal component.

10. The method of claim 1, wherein the precipitated transition metal component comprises ≤1% of the recovered solids fraction.

11. The method of claim 1, wherein the added solubilization base is KOH, and the solubilization conditions comprise a mass ratio of solid green petroleum coke to KOH is from about 0.5:1 to about 5:1.

12. The method of claim 11, wherein the mass ratio of solid green petroleum coke to KOH is about 1:1.

13. The method of claim 1, wherein the agitation comprises stirring at ≥500 rpm.

14. The method of claim 1, wherein the recovered solids fraction has an ignition temperature of not more than 450° C.

15. The method of claim 1, wherein the recovered solids fraction has volatile material content of more than 15 wt %.

16. The method of claim 1, wherein the recovered solids fraction has a volatile material to fixed carbon ratio of at least 0.2.

17. The method of claim 1, wherein the recovered solids fraction has a heating value of at least 25 MJ/kg.

18. A method of catalytically processing petroleum cokes, comprising:
providing a solid green petroleum coke comprising a carbonaceous component and a transition metal component, the carbonaceous component comprising polycyclic aromatic hydrocarbons;
solubilizing a soluble portion of the solid green petroleum coke in a basic subcritical aqueous solubilization liquid under solubilization conditions that comprise a solubilization pressure of at least 500 psi, a solubilization temperature of from 150° C. to 230° C., and an added solubilization base concentration effective to maintain a solubilization pH≥8, for an effective solubilization time of less than 2, 3, 4, 5 or 6 hours, in the presence of an oxidizing atmosphere comprising more than 21% oxygen, and in the presence of a copper tetrasilicate catalyst, with agitation to generate a stirred reaction region in the solubilization liquid, so as to solubilize at least 90% of the solid green petroleum coke leaving a leached solid residue and producing a pregnant solubilization solution comprising a solubilized organics fraction, wherein the solubilization conditions and effective solubilization time are selected so that the solubilization reaction has a selectivity for production of the solubilized organics fraction over a carbon dioxide gas fraction of at least 85%; and,
precipitating a recovered solids fraction from the pregnant solubilization solution by lowering the pH to ≤6, wherein the recovered solids fraction comprises ≥80% of total organic carbon (TOC) present in the pregnant solubilization solution as the solubilized organics fraction.

19. The method of claim 18, wherein the recovered solids fraction comprises humic acid analog compounds.

20. The method of claim 18, wherein the copper tetrasilicate catalyst comprises a Gillespite group-type solid catalyst.

21. The method of claim 20, wherein the solid catalyst is characterized by nanocrystalline domain sizes.

22. The method of claim 18, wherein the copper tetrasilicate catalyst is one or more of cuprorivaite ($CaCuSi_4O_{10}$), wesselsite ($SrCuSi_4O_{10}$) and/or effenbergerite ($BaCuSi_4O_{10}$) or combinations thereof.

23. The method of claim 22, wherein the copper tetrasilicate catalyst is prepared by co-precipitation-thermal treatment or hydrothermal treatment.

24. The method of claim 18, wherein the solubilization pressure is ≤1000 psi.

25. The method of claim 24, wherein the added solubilization base is KOH or NaOH.

26. The method of claim 25, wherein the solubilization pH is ≤13.

27. The method of claim 26, wherein the effective solubilization time is not more than 2 hours.

28. The method of claim 27, wherein the oxidizing atmosphere comprises at least 50% oxygen.

29. The method of claim 28, wherein no more than 50% of the transition metal component of the solid green petroleum coke reports to the pregnant solubilization solution as a dissolved transition metal component.

30. The method of claim 29, wherein the recovered solids fraction comprises an acid precipitated transition metal component that comprises ≤1% of the recovered solids fraction.

31. The method of claim 30, wherein the recovered solids fraction has an ignition temperature of not more than 450° C.

32. The method of claim 31, wherein the recovered solids fraction has volatile material content of more than 15 wt %.

33. The method of claim 32, wherein the recovered solids fraction has a volatile material to fixed carbon ratio of at least 0.2.

34. The method of claim 33, wherein the recovered solids fraction has a heating value of at least 25 MJ/kg.

35. The method claim 1, further comprising blending the recovered solids fraction with a virgin petcoke.

36. The method of claim 34, further comprising blending the recovered solids fraction with a virgin petcoke.

* * * * *